United States Patent
Snydacker et al.

(10) Patent No.: US 11,279,627 B2
(45) Date of Patent: Mar. 22, 2022

(54) LITHIUM EXTRACTION IN THE PRESENCE OF SCALANTS

(71) Applicant: Lilac Solutions, Inc., Oakland, CA (US)

(72) Inventors: David Henry Snydacker, San Francisco, CA (US); Amos Indranada, Emeryville, CA (US); Alysia Lukito, Emeryville, CA (US)

(73) Assignee: LILAC SOLUTIONS, INC., Oakland, CA (US)

( * ) Notice: Subject to any disclaimer, the term of this patent is extended or adjusted under 35 U.S.C. 154(b) by 0 days.

(21) Appl. No.: 17/364,530

(22) Filed: Jun. 30, 2021

(65) Prior Publication Data

US 2021/0380429 A1    Dec. 9, 2021

Related U.S. Application Data

(63) Continuation of application No. PCT/US2021/036227, filed on Jun. 7, 2021.

(60) Provisional application No. 63/036,896, filed on Jun. 9, 2020.

(51) Int. Cl.
| | |
|---|---|
| *C01D 15/06* | (2006.01) |
| *B01J 39/05* | (2017.01) |
| *B01J 39/20* | (2006.01) |
| *B01J 47/04* | (2006.01) |
| *B01J 39/10* | (2006.01) |
| *B01J 49/53* | (2017.01) |
| *B01J 47/011* | (2017.01) |
| *B01J 39/02* | (2006.01) |

(52) U.S. Cl.
CPC .............. *C01D 15/06* (2013.01); *B01J 39/02* (2013.01); *B01J 39/05* (2017.01); *B01J 39/10* (2013.01); *B01J 39/20* (2013.01); *B01J 47/011* (2017.01); *B01J 47/04* (2013.01); *B01J 49/53* (2017.01)

(58) Field of Classification Search
None
See application file for complete search history.

(56) References Cited

U.S. PATENT DOCUMENTS

| | | |
|---|---|---|
| 3,793,433 A | 2/1974 | Seeley et al. |
| 4,116,858 A | 9/1978 | Lee et al. |
| 4,159,311 A | 6/1979 | Bauman et al. |
| 4,382,124 A | 5/1983 | Meitzner et al. |
| 4,747,949 A | 5/1988 | Barkey |
| 5,039,382 A | 8/1991 | Suzuki et al. |

(Continued)

FOREIGN PATENT DOCUMENTS

| | | |
|---|---|---|
| CN | 101961634 A | 2/2011 |
| CN | 102872792 A | 1/2013 |

(Continued)

OTHER PUBLICATIONS

Chitrakar et al. Lithium recovery from salt lake brine by H2TiO3. Dalton Trans 43:8933-8939 (2014).

(Continued)

*Primary Examiner* — Chester T Barry
(74) *Attorney, Agent, or Firm* — Wilson Sonsini Goodrich & Rosati

(57) ABSTRACT

The present invention relates to recovery of lithium from liquid resources to produce lithium solutions while limiting impurity precipitation in the lithium solutions.

20 Claims, 2 Drawing Sheets

(56) References Cited

U.S. PATENT DOCUMENTS

| | | |
|---|---|---|
| 5,639,861 A | 6/1997 | Steffier |
| 6,171,489 B1 | 1/2001 | Ballard et al. |
| 7,435,477 B2 | 10/2008 | Adachi et al. |
| 7,541,016 B2 | 6/2009 | Gorshkov et al. |
| 7,820,327 B2 | 10/2010 | Yumoto et al. |
| 8,454,816 B1 | 6/2013 | Harrison et al. |
| 8,506,851 B2 | 8/2013 | Ravet et al. |
| 8,679,224 B2 | 3/2014 | Brown et al. |
| 8,741,150 B2 | 6/2014 | Chung et al. |
| 8,778,289 B2 | 7/2014 | Chon et al. |
| 9,034,294 B1 | 5/2015 | Harrison |
| 9,677,181 B2 | 6/2017 | Bourassa et al. |
| 10,150,056 B2 | 12/2018 | Snydacker |
| 10,439,200 B2 | 10/2019 | Snydacker et al. |
| 10,505,178 B2 | 12/2019 | Snydacker et al. |
| 10,648,090 B2 | 5/2020 | Snydacker et al. |
| 10,695,694 B2 | 6/2020 | Snydacker |
| 2004/0005267 A1 | 1/2004 | Boryta et al. |
| 2007/0138020 A1 | 6/2007 | Balagopal et al. |
| 2010/0116748 A1 | 5/2010 | Rasmussen et al. |
| 2011/0044882 A1 | 2/2011 | Buckley et al. |
| 2011/0067230 A1 | 3/2011 | Tan et al. |
| 2011/0174739 A1 | 7/2011 | Chung et al. |
| 2013/0001168 A1 | 1/2013 | Kim et al. |
| 2013/0306565 A1 | 11/2013 | Davis |
| 2014/0113197 A1 | 4/2014 | Xiao et al. |
| 2014/0239221 A1 | 8/2014 | Harrison et al. |
| 2015/0013499 A1 | 1/2015 | Asano et al. |
| 2015/0083667 A1 | 3/2015 | Stouffer |
| 2015/0152523 A1 | 6/2015 | Sharma |
| 2015/0197830 A1 | 7/2015 | Chon et al. |
| 2015/0203542 A1 | 7/2015 | Bagnoli et al. |
| 2016/0115040 A1 | 4/2016 | Yi et al. |
| 2016/0230250 A1 | 8/2016 | Chung et al. |
| 2017/0022617 A1 | 1/2017 | Magnan et al. |
| 2017/0028395 A1 | 2/2017 | Bewsey |
| 2017/0189855 A1 | 7/2017 | Xiang et al. |
| 2017/0217796 A1 | 8/2017 | Snydacker et al. |
| 2018/0016153 A1 | 1/2018 | Sharma |
| 2018/0080133 A1 | 3/2018 | Smith et al. |
| 2018/0133619 A1 | 5/2018 | Snydacker |
| 2018/0245180 A1 | 8/2018 | Cheng et al. |
| 2019/0276327 A1* | 9/2019 | Brown .................. C01D 15/04 |
| 2020/0165699 A1 | 5/2020 | Snydacker et al. |
| 2020/0230591 A1 | 7/2020 | Snydacker |
| 2020/0232105 A1 | 7/2020 | Snydacker et al. |
| 2020/0289958 A1 | 9/2020 | Snydacker |
| 2021/0077990 A1 | 3/2021 | Snydacker et al. |

FOREIGN PATENT DOCUMENTS

| | | |
|---|---|---|
| CN | 103794779 A | 5/2014 |
| CN | 105238927 A | 1/2016 |
| CN | 105251436 A | 1/2016 |
| CN | 105289455 A | 2/2016 |
| CN | 106311190 A | 1/2017 |
| EP | 2945211 B1 | 11/2018 |
| FR | 3034781 A1 | 10/2016 |
| JP | H08236114 A | 9/1996 |
| JP | 2003500318 A | 1/2003 |
| JP | 2005296811 A | 10/2005 |
| JP | 2009507839 A | 2/2009 |
| JP | 2010042395 A | 2/2010 |
| JP | 2015020090 A | 2/2015 |
| JP | 5898021 B2 | 4/2016 |
| JP | 2019099874 A | 6/2019 |
| KR | 20120063424 A | 6/2012 |
| KR | 20140082065 A | 7/2014 |
| WO | WO-2010056322 A1 | 5/2010 |
| WO | WO-2010103173 A1 | 9/2010 |
| WO | WO-2012005545 A2 | 1/2012 |
| WO | WO-2015171109 A1 | 11/2015 |
| WO | WO-2016064689 A2 | 4/2016 |
| WO | WO-2016172017 A1 | 10/2016 |
| WO | WO-2017005113 A1 | 1/2017 |
| WO | WO-2017020090 A1 | 2/2017 |
| WO | WO-2017137885 A1 | 8/2017 |
| WO | WO-2018089932 A1 | 5/2018 |
| WO | WO-2019000095 A1 | 1/2019 |
| WO | WO-2019028148 A1 | 2/2019 |
| WO | WO-2019028174 A2 | 2/2019 |
| WO | WO-2019126862 A1 | 7/2019 |
| WO | WO-2019160982 A1 | 8/2019 |
| WO | WO-2019168941 A1 | 9/2019 |
| WO | WO-2021142147 A1 | 7/2021 |
| WO | WO-2021252381 A1 | 12/2021 |

OTHER PUBLICATIONS

Chitrakar et al. Selective Uptake of Lithium Ion from Brine by H1.33Mn1.67O4 and H1.6Mn1.6O4. Chem Lett 41:1647-1649 (2012).

Cho et al. High-Performance ZrO02-Coated LiNiO2 Cathode Material. Electrochem Solid-State Lett 4(10):A159-A161 (2001).

Co-pending U.S. Appl. No. 17/169,251, inventor Snydacker; David Henry, filed Feb. 5, 2021.

Department of Energy. Ion Exchange Materials for Lithium Extraction (Topic: 15, Subtopic:e)—Abstract. Available at https://www.sbir.gov/sbirsearch/detail/1307793 (3 pgs.) (2017).

Larumbe et al. Effect of a SiO2 coating on the magnetic properties of Fe3O4 nanoparticles. JPhys: Condens Matter 24(26):266007 (2012).

Miyai et al. Bench scale studies on lithium recovery from sea water. Nippon Kaisui Gakkai-Shi—Bulletin Of The Society Of Sea Waterscience, Japan 49(4):226-230 (1995) (English Abstract).

Nishihama et al. Selective recovery process of lithium from seawater using integrated ion exchange methods. Solvent Extraction and Ion Exchange 29:421-431 (2011).

Oh et al. Double Carbon Coating of LiFePO4 as High Rate Electrode for Rechargeable Lithium Batteries. Adv. Mater. 22:4842-4845 (2010).

Pareja et al. Corrosion behaviour of zirconia barrier coatings on galvanized steel. Surface and Coatings Technology 200(22-23):6606-6610 (2006).

Patel et al. Ionic and electronic conductivities of atomic layer deposition thin film coated lithium ion battery cathode particles. RSC Advances 6:98768-98776 (2016).

PCT/US2017/061384 International Search Report and Written Opinion dated Feb. 14, 2018.

PCT/US2018/044821 International Search Report and Written Opinion dated Oct. 12, 2018.

PCT/US2018/044868 International Search Report and Written Opinion dated Mar. 6, 2019.

PCT/US2019/017885 International Search Report and Written Opinion dated Jun. 14, 2019.

PCT/US2019/019780 International Search Report and Written Opinion dated Jun. 14, 2019.

PCT/US2021/012534 International Search Report and Written Opinion dated Apr. 27, 2021.

Tarakina et al. Defect crystal structure of new TiO(OH)2 hydroxide and related lithium salt Li2TiO3. Dalton Trans 39:8168-8176 (2010).

Umeno et al. Preparation and Adsorptive Properties of Membrane-Type Adsorbents for Lithium Recovery from Seawater. Ind Eng Chern Res 41(17):4281-4287 (2002).

Xiao et al. Lithium ion recovery from brine using granulated polyacrylamide-MnO 2 ion-sieve. Chemical Engineering Journal 279:659-666 (2015).

Zandvakili et al. Preparation and characterisation of lithium ion exchange composite for the recovery of lithium from brine. Mineral Processing and Extractive Metallurgy 127(3):176-181 (2017).

Xiao et al. Adsorption and desorption behavior of lithium ion in spherical PVC-MnO2 ion sieve. Industrial & engineering chemistry research, 51 (33):10921-10929 (2012).

PCT/US2021/036227 International Search Report and Written Opinion dated Nov. 2, 2021.

Co-pending U.S. Appl. No. 17/590,223, inventors Snydacker; David Henry et al., filed Feb. 1, 2022.

* cited by examiner

LITHIUM EXTRACTION IN THE PRESENCE OF SCALANTS

CROSS-REFERENCE

This application is a continuation of PCT/US2021/036227, filed Jun. 7, 2021, which claims the benefit of U.S. Provisional Application No. 63/036,896, filed Jun. 9, 2020, which is incorporated by reference herein in its entirety.

BACKGROUND OF THE INVENTION

Ion exchange materials can be used to extraction lithium ions from liquid resources and release the lithium ions into an acidic solution accompanied by impurities, and concentrations of the impurities in the eluate solution can be reduced to limit or eliminate formation of precipitates.

SUMMARY OF THE INVENTION

Lithium can be recovered from liquid resources through absorption into ion exchange materials followed by elution using protons to form a lithium salt solution. In certain cases, the lithium salt solution may contain dissolved compounds which may precipitate and form solids that may interfere with process equipment. This invention includes methods of limiting and eliminating the precipitation of compounds in the lithium salt solution.

Disclosed herein, in one aspect, is a process for extracting lithium from a liquid resource comprising: a) contacting a lithium-selective ion exchange material with a liquid resource comprising lithium to allow said lithium-selective ion exchange material to absorb lithium from said liquid resource thereby forming a lithium-enriched ion exchange material; b) optionally contacting said lithium-enriched ion exchange material with a wash solution to remove said liquid resource from said lithium-enriched ion exchange material; c) contacting said lithium-enriched ion exchange material with an acidic solution such that lithium and impurities are eluted from said lithium-enriched ion exchange material to form a first impurities-enriched lithiated (IEL) acidic solution and a partially-eluted ion exchange material; and d) removing at least some of the impurities from said first impurities-enriched lithiated acidic solution to form a lithium-enriched acidic solution. In some embodiments, the lithium-enriched acidic solution is contacted with the partially-eluted ion exchange material such that lithium and impurities are further eluted from the partially-eluted ion exchange material to form a second impurities-enriched lithiated acidic solution having an accumulated amount of lithium. In some embodiments, removing at least some of the impurities at step (d) of claim 1 and contacting the lithium-enriched acidic solution with the partially-eluted ion exchange material at claim 2 are repeated in an iterative manner, thereby accumulating the lithium concentration with each iteration of forming a subsequent lithium-enriched acidic solution.

Disclosed herein, in another aspect, is a process for extracting lithium from a liquid resource into an acidic solution, comprising: a) contacting a first lithium-selective ion exchange material with the liquid resource comprising lithium to allow said first lithium-selective ion exchange material to absorb lithium from said liquid resource, thereby forming a first lithium-enriched ion exchange material; b) optionally contacting said first lithium-enriched ion exchange material with a wash solution to remove said liquid resource from said first lithium-enriched ion exchange material; c) contacting said first lithium-enriched ion exchange material with an acidic solution such that lithium and impurities are eluted from said first lithium-enriched ion exchange material, to form a first impurities-enriched lithiated (IEL) acidic solution and a first partially-eluted ion exchange material; d) removing at least some of the impurities from said first impurities-enriched lithiated acidic solution to form a lithium-enriched acidic solution; and e) contacting said lithium-enriched acidic solution with a second lithium-enriched ion exchange material such that lithium and impurities are eluted from said second lithium-enriched ion exchange material to form 1) a second impurities-enriched lithiated acidic solution having an accumulated amount of lithium, and 2) a second partially-eluted ion exchange material.

In some embodiments, for any process described herein, the impurities comprise multivalent cations. In some embodiments, for any process described herein, protons are added to the lithium-enriched acidic solution after removing the at least some of the impurities. In some embodiments, for any process described herein, the acidic solution comprises an acidic sulfate solution. In some embodiments, for any process described herein, the impurities removed comprise calcium, barium, strontium, or combinations thereof. In some embodiments, for any process described herein, the impurities are removed using a nanofiltration membrane.

In some embodiments, for any process described herein, the impurities are removed through precipitation using an anion precipitant. In some embodiments, the process further comprises removing the anion precipitant from the lithium-enriched acidic solution after step (d) through precipitation with a cation precipitant. In some embodiments, said anion precipitant is oxalate or citrate.

In some embodiments, for any process described herein, the impurities are removed using a multivalent-cation-selective ion exchange resin. In some embodiments, said multivalent-cation-selective ion exchange resin comprises a strong acidic cation exchange material. In some embodiments, said multivalent-cation-selective ion exchange resin comprises a styrene divinylbenzene copolymer. In some embodiments, said multivalent-cation-selective ion exchange resin comprises a sulfonic-acid-functionalized styrene divinylbenzene copolymer. In some embodiments, said multivalent-cation-selective ion exchange resin comprises a phosphonic-acid-functionalized styrene divinylbenzene copolymer. In some embodiments, said multivalent-cation-selective ion exchange resin comprises a styrene divinylbenzene copolymer and said impurities comprise calcium. In some embodiments, said multivalent-cation-selective ion exchange resin comprises a sulfonic-acid-functionalized styrene divinylbenzene copolymer and said impurities comprise calcium. In some embodiments, said multivalent-cation-selective ion exchange resin comprises a phosphonic-acid-functionalized styrene divinylbenzene copolymer and said impurities comprise calcium. In some embodiments, said multivalent-cation-selective ion exchange resin comprise a sulfonic-acid-functionalized styrene divinylbenzene polymer, said impurities comprise calcium, and said precipitates comprise calcium sulfate. In some embodiments, said multivalent-cation-selective ion exchange resin comprises a phosphonic-acid-functionalized styrene divinylbenzene polymer, said impurities comprise calcium, and precipitates avoided being formed in each lithium-enriched acidic solution comprise calcium sulfate. In some embodiments, said multivalent-cation-selective ion exchange resin comprises a copolymer of styrene, divinylbenzene, butadiene, vinylbenzene chloride, acrylonitrile, or a combination thereof. In some embodiments, said multivalent-cation-selective ion exchange resin comprises a copolymer of styrene, divinylbenzene, butadiene, vinylbenzene chloride, acrylonitrile, or combinations thereof functionalized with sulfonic acid, phosphonic acid, phosphinic acid, phosphoric acid, or a combinations thereof.

In some embodiments, for any process described herein, said impurities comprise calcium. In some embodiments, for any process described herein, the precipitates avoided being formed in each lithium-enriched acidic solution comprises calcium sulfate.

In some embodiments, for any process described herein, an anti-scalant or chelating agent is used to limit formation of precipitates. In some embodiments, for any process described herein, the lithium-selective ion exchange material is loaded into a network of vessels. In some embodiments, for any process described herein, the pH of said liquid resource is increased before, during, or after contact with a lithium-selective ion exchange material. In some embodiments, for any process described herein, the pH of said liquid resource is increased by addition of sodium hydroxide before, during, or after contact with a lithium-selective ion exchange material. In some embodiments, for any process described herein, the accumulated amount of lithium is converted into lithium hydroxide using membrane electrolysis. In some embodiments, for any process described herein, the accumulated amount of lithium is converted into lithium hydroxide by addition of sodium hydroxide. In some embodiments, for any process described herein, the accumulated amount of lithium is converted into lithium carbonate by addition of sodium carbonate.

In some embodiments, for any process described herein, said lithium-selective ion exchange material is contacted with said liquid resource in a fluidized bed. In some embodiments, for any process described herein, said lithium-selective ion exchange material is contacted with said liquid resource in a packed bed.

In some embodiments, for any process described herein, said lithium selective-ion exchange material comprises $LiFePO_4$, $LiMnPO_4$, $Li_2MO_3$ (M=Ti, Mn, Sn), $Li_4Ti_5O_{12}$, $Li_4Mn_5O_{12}$, $LiMn_2O_4$, $Li_{1.6}Mn_{1.6}O_4$, $LiMO_2$ (M=Al, Cu, Ti), $Li_4TiO_4$, $Li_7Ti_{11}O_{24}$, $Li_3VO_4$, $Li_2Si_3O_7$, $Li_2CuP_2O_7$, modifications thereof, solid solutions thereof, or a combination thereof. In some embodiments, for any process described herein, said lithium selective-ion exchange material comprises a coated lithium selective-ion exchange material with a coating that comprises an oxide, a polymer, or a combination thereof. In some embodiments, for any process described herein, said lithium selective-ion exchange material comprises a coated lithium selective-ion exchange material with a coating comprising $SiO_2$, $TiO_2$, $ZrO_2$, polyvinylidene difluoride, polyvinyl chloride, polystyrene, polybutadiene, polydivinylbenzene, or a combination thereof.

INCORPORATION BY REFERENCE

All publications, patents, and patent applications mentioned in this specification are herein incorporated by reference to the same extent as if each individual publication, patent, or patent application was specifically and individually indicated to be incorporated by reference.

BRIEF DESCRIPTION OF THE DRAWINGS

The novel features of the invention are set forth with particularity in the appended claims. A better understanding of the features and advantages of the present invention will be obtained by reference to the following detailed description that sets forth illustrative embodiments, in which the principles of the invention are utilized, and the accompanying drawings of which:

DETAILED DESCRIPTION OF THE INVENTION

Figure 1:
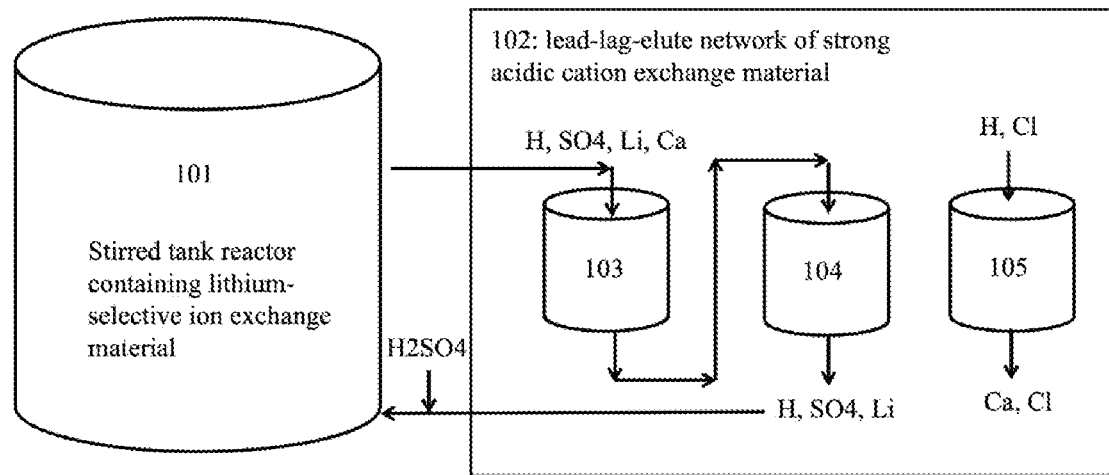
FIG. 1 illustrates a non-limiting example of a system for eluting lithium from a lithium-selective ion exchange material into an acidic sulfate solution using a stirred tank reactor with circulation of the acidic sulfate solution through a strong acidic cation exchange material for selective removal of multivalent cations to avoid formation of precipitates in the acidic sulfate solution.

The terms "lithium", "lithium ion", "Li", and "$Li^+$" are used interchangeably in the present specification and these terms are synonymous unless specifically noted to the contrary. The terms "hydrogen", "hydrogen ion", "proton", "H", and "$H^+$" are used interchangeably in the present specification and these terms are synonymous unless specifically noted to the contrary. The terms "liquid resource" and "brine" are used interchangeably in the present specification and these terms are synonymous unless specifically noted to the contrary.

The terms "acidic solution", "acidic lithium solution", "eluate", "eluate solution", "impurities-enriched lithiated (IEL) acidic solution", and "impurities-enriched lithiated (IEL) eluate" are sometimes used interchangeably in the present specification, and as used herein, refer to an acidic solution that has eluted impurities and lithium from lithium-enriched ion exchange material, as described herein. The term "lithium enriched acidic solution" and "lithium enriched acidic eluate" are sometimes used interchangeably in the present specification, and, as used herein, refer to an aforementioned "acidic solution" (including IEL acidic solution) wherein all or at least some impurities are removed therefrom using a system and/or process described herein. The term "a second IEL acidic solution" and "a new IEL acidic solution" are sometimes used interchangeably in the present specification, and refer to a lithium enriched acidic solution having further eluted impurities and lithium from lithium-enriched ion exchange material, as described in a system and/or process described herein.

Lithium can be absorbed into a lithium-selective ion exchange material and then eluted to form an eluate solution comprising lithium ions and impurities. Concentrations of the impurities can be decreased before, during, and/or after elution to limit or eliminate formation of solid precipitates in the eluate solution. Concentrations of the impurities in the eluate solution can be decreased using nanofiltration, ion exchange, precipitation and/or other methods of selective impurity removal.

Disclosed herein are systems and processes for extracting lithium from a liquid resource using a lithium-selective ion exchange material, wherein lithium and one or more impurities are progressively eluted from one or more lithium-enriched ion exchange materials, and the eluted impurities are at least partially progressively removed to reduce or eliminate the formation of precipitate from a lithium enriched eluate.

In some embodiments, a process for extracting lithium from a liquid resource comprises a) contacting a lithium-selective ion exchange material with a liquid resource comprising lithium to allow said lithium-selective ion exchange material to absorb lithium from said liquid resource thereby forming a lithium-enriched ion exchange material; b) optionally contacting said lithium-enriched ion exchange material with a wash solution to remove said liquid resource from said lithium-enriched ion exchange material; c) contacting said lithium-enriched ion exchange material with an acidic solution such that lithium and impurities are eluted from said lithium-enriched ion exchange material to form a first impurities-enriched lithiated (IEL) acidic solution and a partially-eluted ion exchange material; and d) removing at least some of the impurities from said first impurities-enriched lithiated acidic solution to form a lithium-enriched acidic solution. In some embodiments, the lithium-enriched acidic solution is contacted with the partially-eluted ion exchange material such that lithium and impurities are further eluted from the partially-eluted ion exchange material to form a second impurities-enriched lithiated acidic solution having an accumulated amount of lithium. In some embodiments, removing at least some of the impurities at step (d) of claim 1 and contacting the lithium-enriched acidic solution with the partially-eluted ion exchange material at claim 2 are repeated in an iterative manner, thereby accumulating the lithium concentration with each iteration of forming a subsequent lithium-enriched acidic solution.

Alternatively, or in addition to, in some embodiments, the process comprises: a) contacting a first lithium-selective ion exchange material with the liquid resource comprising lithium to allow said first lithium-selective ion exchange material to absorb lithium from said liquid resource, thereby forming a first lithium-enriched ion exchange material; b) optionally contacting said first lithium-enriched ion exchange material with a wash solution to remove said liquid resource from said first lithium-enriched ion exchange material; c) contacting said first lithium-enriched ion exchange material with an acidic solution such that lithium and impurities are eluted from said first lithium-enriched ion exchange material, to form a first impurities-enriched lithiated (IEL) acidic solution and a first partially-eluted ion exchange material; d) removing at least some of the impurities from said first impurities-enriched lithiated acidic solution to form a lithium-enriched acidic solution; and e) contacting said lithium-enriched acidic solution with a second lithium-enriched ion exchange material such that lithium and impurities are eluted from said second lithium-enriched ion exchange material to form 1) a second impurities-enriched lithiated acidic solution (e.g., a subsequent IEL acidic solution) having an accumulated amount of lithium, and 2) a second partially-eluted ion exchange material.

In some embodiments, the removing impurities from an aforementioned lithium-enriched acidic solution comprises contacting with an impurities-selective ion exchange material, through nanofiltration, precipitation with an anion precipitant, electrochemical precipitation, precipitation with temperature reduction, or any combination thereof.

In some embodiments, the removing impurities from an aforementioned lithium-enriched acidic solution comprises using a multivalent-cation-selective ion exchange resin. In some embodiments, said multivalent-cation-selective ion exchange resin comprises a strong acidic cation exchange material.

In some embodiments, the pH of an aforementioned lithium-enriched acidic solution is adjusted prior to contacting with the partially-eluted ion exchange material or the second lithium-enriched ion exchange material. In some embodiments, the pH of an impurities-enriched lithiated acidic solution is adjusted prior to removing impurities therefrom.

In some embodiments, the lithium-selective ion exchange material comprises coated ion exchange particles, uncoated ion exchange particles, or both. In some embodiments, the coated ion exchange particles comprise uncoated exchange particles and a coating material.

In some embodiments, the system and method for lithium extraction comprises a plurality of vessels each comprising lithium-enriched ion exchange material that has been contacted with a liquid resource, and thereby has absorbed lithium and one or more impurities from the liquid resource. In some embodiments, the acidic solution, each intermediary lithium-enriched eluate, the IEL acidic solution, and/or a subsequent IEL acidic solution (e.g., a second or new IEL acidic solution as described herein) flow through the plurality of vessels for eluting lithium from the plurality of vessels.

In some embodiments, the pH of the liquid resource is adjusted before, during, and/or after contact with the lithium-selective ion exchange material.

The Liquid Resource

In one embodiment, the liquid resource is a natural brine, a dissolved salt flat, seawater, concentrated seawater, a geothermal brine, a desalination effluent, a concentrated brine, a processed brine, an oilfield brine, a liquid from an ion exchange process, a liquid from a solvent extraction process, a synthetic brine, a leachate from an ore or combination of ores, a leachate from a mineral or combination of minerals, a leachate from a clay or combination of clays, a leachate from recycled products, a leachate from recycled materials, or combinations thereof.

In one embodiment, the brine is at a temperature of −20 to 20 C, 20 to 50 C, 50 to 100 C, 100 to 200 C, or 200 to 400 C. In one embodiment, the brine is heated or cooled to precipitate or dissolve species in the brine, or to facilitate removal of metals from the brine.

In one embodiment, the brine contains lithium at a concentration of less than 1 mg/L, 1 to 50 mg/L, 50 to 200 mg/L, 200 to 500 mg/L, 500 to 2,000 mg/L, 2,000 to 5,000 mg/L, 5,000 to 10,000 mg/L, 10,000 to 20,000 mg/L, 20,000 to 80,000 mg/L, or greater than 80,000 mg/L.

In one embodiment, the brine contains magnesium at a concentration of 0.01 to 0.1 mg/L, 0.1 to 1 mg/L, 1 to 10 mg/L, 10 to 100 mg/L, 100 to 1,000 mg/L, 1,000 to 10,000 mg/L, 10,000 to 50,000 mg/L, 50,000 to 100,000 mg/L, 100,000 to 150,000 mg/L, or greater than 150,000 mg/L. In one embodiment, the brine contains calcium at a concentration of 0.01 to 0.1 mg/L, 0.1 to 1 mg/L, 1 to 10 mg/L, 10 to 100 mg/L, 100 to 1,000 mg/L, 1,000 to 10,000 mg/L, 10,000 to 50,000 mg/L, 50,000 to 100,000 mg/L, 100,000 to 150,000 mg/L, or greater than 150,000 mg/L. In one embodiment, the brine contains strontium at a concentration of 0.01 to 0.1 mg/L, 0.1 to 1 mg/L, 1 to 10 mg/L, 10 to 100 mg/L, 100 to 1,000 mg/L, 1,000 to 10,000 mg/L, 10,000 to 50,000 mg/L, 50,000 to 100,000 mg/L, 100,000 to 150,000 mg/L, or greater than 150,000 mg/L. In one embodiment, the brine contains barium at a concentration of 0.01 to 0.1 mg/L, 0.1 to 1 mg/L, 1 to 10 mg/L, 10 to 100 mg/L, 100 to 1,000 mg/L, 1,000 to 10,000 mg/L, 10,000 to 50,000 mg/L, 50,000 to 100,000 mg/L, 100,000 to 150,000 mg/L, or greater than 150,000 mg/L.

In one embodiment, the brine contains multivalent cations at a concentration of 0.01 to 0.1 mg/L, 0.1 to 1 mg/L, 1 to 10 mg/L, 10 to 100 mg/L, 100 to 1,000 mg/L, 1,000 to 10,000 mg/L, 10,000 to 50,000 mg/L, 50,000 to 100,000 mg/L, 100,000 to 150,000 mg/L, or greater than 150,000 mg/L. In one embodiment, the brine contains multivalent ions at a concentration of 0.01 to 0.1 mg/L, 0.1 to 1 mg/L, 1 to 10 mg/L, 10 to 100 mg/L, 100 to 1,000 mg/L, 1,000 to 10,000 mg/L, 10,000 to 50,000 mg/L, 50,000 to 100,000 mg/L, 100,000 to 150,000 mg/L, or greater than 150,000 mg/L. In one embodiment, the brine contains non-lithium impurities at a concentration of 0.01 to 0.1 mg/L, 0.1 to 1 mg/L, 1 to 10 mg/L, 10 to 100 mg/L, 100 to 1,000 mg/L, 1,000 to 10,000 mg/L, 10,000 to 50,000 mg/L, 50,000 to 100,000 mg/L, 100,000 to 150,000 mg/L, or greater than 150,000 mg/L. In one embodiment, the brine contains transition metals at a concentration of 0.01 to 0.1 mg/L, 0.1 to 1 mg/L, 1 to 10 mg/L, 10 to 100 mg/L, 100 to 1,000 mg/L, 1,000 to 10,000 mg/L, 10,000 to 50,000 mg/L, 50,000 to 100,000 mg/L, 100,000 to 150,000 mg/L, or greater than 150,000 mg/L. In one embodiment, the brine contains iron at a concentration of 0.01 to 0.1 mg/L, 0.1 to 1 mg/L, 1 to 10 mg/L, 10 to 100 mg/L, 100 to 1,000 mg/L, 1,000 to 10,000 mg/L, 10,000 to 50,000 mg/L, 50,000 to 100,000 mg/L, 100,000 to 150,000 mg/L, or greater than 150,000 mg/L. In one embodiment, the brine contains manganese at a concentration of 0.01 to 0.1 mg/L, 0.1 to 1 mg/L, 1 to 10 mg/L, 10 to 100 mg/L, 100 to 1,000 mg/L, 1,000 to 10,000 mg/L, 10,000 to 50,000 mg/L, 50,000 to 100,000 mg/L, 100,000 to 150,000 mg/L, or greater than 150,000 mg/L.

In one embodiment, the brine is treated to produce a feed brine which has certain metals removed. In one embodiment, the feed brine contains iron at a concentration of less than 0.01, 0.01 to 0.1 mg/L, mg/L, 0.1 to 1.0 mg/L, 1.0 to 10 mg/L, 10 to 100 mg/L, or 100 to 1,000 mg/L.

In one embodiment, the feed brine contains manganese at a concentration of less than 0.01, 0.01 to 0.1 mg/L, mg/L, 0.1 to 1.0 mg/L, 1.0 to 10 mg/L, 10 to 100 mg/L, or 100 to 1,000 mg/L. In one embodiment, the feed brine contains lead at a concentration of less than 0.01, 0.01 to 0.1 mg/L, mg/L, 0.1 to 1.0 mg/L, 1.0 to 10 mg/L, 10 to 100 mg/L, or 100 to 1,000 mg/L. In one embodiment, the feed brine contains zinc at a concentration of less than 0.01, 0.01 to 0.1 mg/L, 0.1 to 1.0 mg/L, 1.0 to 10 mg/L, 10 to 100 mg/L, or 100 to 1,000 mg/L. In one embodiment, the feed brine contains lithium at a concentration of 1 to 50 mg/L, 50 to 200 mg/L, 200 to 500 mg/L, 500 to 2,000 mg/L, or greater than 2,000 mg/L.

In one embodiment, the feed brine is processed to recover metals such as lithium and yield a spent brine or raffinate. In one embodiment, the raffinate contains residual quantities of the recovered metals at a concentration of less than 0.01, 0.01 to 0.1 mg/L, mg/L, 0.1 to 1.0 mg/L, 1.0 to 10 mg/L, 10 to 100 mg/L, 100 to 1,000 mg/L, or 1,000 to 10,000 mg/L.

In one embodiment, the pH of the brine is corrected to less than 0, 0 to 1, 1 to 2, 2 to 4, 4 to 6, 6 to 8, 4 to 8, 8 to 9, 9 to 10, 9 to 11, or 10 to 12. In one embodiment, the pH of the brine is corrected to 2 to 4, 4 to 6, 6 to 8, 4 to 8, 8 to 9, 9 to 10, 9 to 11, or 10 to 12. In one embodiment, the pH of the brine is corrected to precipitate or dissolve metals.

In one embodiment, metals are precipitated from the brine to form precipitates. In one embodiment, precipitates include transition metal hydroxides, oxy-hydroxides, sulfide, flocculants, aggregate, agglomerates, or combinations thereof. In one embodiment, the precipitates include Li, Na, K, Rb, Cs, Fr, Be, Mg, Ca, Sr, Ba, Ra, Sc, Y, Ti, Zr, Hf, V, Nb, Ta, Cr, Mo, W, Mn, Tc, Fe, Fe, Ru, Os, Co, Rh, Ir, Ni, Pd Pt, Cu, Ag, Au, Zn, Cd, Hg, B, Al, Ga, In, Si, Ge, Sn, Pb, As, Sb, Bi, Se, Te, Po, Br, I, At, other metals, or a combination thereof. In one embodiment, the precipitates may be concentrated into a slurry, a filter cake, a wet filter cake, a dry filter cake, a dense slurry, or a dilute slurry.

In one embodiment, the precipitates contain iron at a concentration of less than 0.01 mg/kg, 0.01 to 1 mg/kg, 1 to 100 mg/kg, 100 to 10,000 mg/kg, or 10,000 to 800,000 mg/kg. In one embodiment, the precipitates contain manganese at a concentration of less than 0.01 mg/kg, 0.01 to 1 mg/kg, 1 to 100 mg/kg, 100 to 10,000 mg/kg, or 10,000 to 800,000 mg/kg. In one embodiment, the precipitates contain lead at a concentration of less than 0.01 mg/kg, 0.01 to 1 mg/kg, 1 to 100 mg/kg, 100 to 10,000 mg/kg, or 10,000 to 800,000 mg/kg. In one embodiment, the precipitates contain arsenic at a concentration of less than 0.01 mg/kg, 0.01 to 1 mg/kg, 1 to 100 mg/kg, 100 to 10,000 mg/kg, or 10,000 to 800,000 mg/kg. In one embodiment, the precipitates contain magnesium at a concentration of less than 0.01 mg/kg, 0.01 to 1 mg/kg, 1 to 100 mg/kg, 100 to 10,000 mg/kg, or 10,000 to 800,000 mg/kg. In one embodiment, the precipitates contain Li, Na, K, Rb, Cs, Fr, Be, Mg, Ca, Sr, Ba, Ra, Sc, Y, Ti, Zr, Hf, V, Nb, Ta, Cr, Mo, W, Mn, Tc, Fe, Fe, Ru, Os, Co, Rh, Ir, Ni, Pd Pt, Cu, Ag, Au, Zn, Cd, Hg, B, Al, Ga, In, Si, Ge, Sn, Pb, As, Sb, Bi, Se, Te, Po, Br, I, At, or other metals at a concentration of less than 0.01 mg/kg, 0.01 to 1 mg/kg, 1 to 100 mg/kg, 100 to 10,000 mg/kg, or 10,000 to 800,000 mg/kg. In one embodiment, the precipitates are toxic and/or radioactive.

In one embodiment, precipitates are redissolved by combining the precipitates with acid. In one embodiment, precipitates are redissolved by combining the precipitates with acid in a mixing apparatus. In one embodiment, precipitates are redissolved by combining the precipitates with acid using a high-shear mixer.

Lithium is an essential element for batteries and other technologies. Lithium is found in a variety of liquid resources, including natural and synthetic brines and leachate solutions from minerals, clays, and recycled products. Lithium is optionally extracted from such liquid resources using an ion exchange process based on inorganic ion exchange materials. These inorganic ion exchange materials absorb lithium from a liquid resource while releasing hydrogen, and then elute lithium into an acidic solution while absorbing hydrogen. This ion exchange process is optionally repeated to extract lithium from a liquid resource and yield a concentrated lithium solution. The concentrated lithium solution is optionally further processed into chemicals for the battery industry or other industries.

Ion exchange materials are optionally formed into beads and the beads are optionally loaded into ion exchange columns, stirred tank reactors, other reactors, or other systems for lithium extraction. Alternating flows or aliquots of brine, acidic solution, and optionally other solutions are flowed through or flowed into an ion exchange column, reactors, or reactor system to extract lithium from the brine and produce a lithium concentrate, which is eluted from the column using the acidic solution. As brine flows through the ion exchange column, reactors, or reactor system, the ion exchange material absorbs lithium while releasing hydrogen, where both the lithium and hydrogen are cations. The release of hydrogen during lithium uptake will acidify the brine and limit lithium uptake unless the pH of the brine is optionally maintained in a suitable range to facilitate thermodynamically favorable lithium uptake and concomitant hydrogen release. In one embodiment, pH of the liquid resource is maintained near a set-point through addition of base to neutralized protons released from the ion exchange material into the liquid resource.

In some embodiments, the pH of the liquid resource is adjusted before, during and/or after contact with the lithium-selective ion exchange material to maintain the pH in range that is suitable for lithium uptake.

To control the pH of the brine and maintain the pH in a range that is suitable for lithium uptake in an ion exchange column, bases such as NaOH, Ca(OH)$_2$, CaO, KOH, or NH$_3$ are optionally added to the brine as solids, aqueous solutions, or in other forms. For brines that contain divalent ions such as Mg, Ca, Sr, or Ba, addition of base to the brine can cause precipitation of solids, such as Mg(OH)$_2$ or Ca(OH)$_2$, which can cause problems for the ion exchange reaction. These precipitates cause problems in at least three ways. First, precipitation can remove base from solution, leaving less base available in solution to neutralize protons and maintain pH in a suitable range for lithium uptake in the ion exchange column. Second, precipitates that form due to base addition can clog the ion exchange column, including clogging the surfaces and pores of ion exchange beads and the voids between ion exchange beads. This clogging can prevent lithium from entering the beads and being absorbed by the ion exchange material. The clogging can also cause large pressure heads in the column. Third, precipitates in the column dissolve during acid elution and thereby contaminate the lithium concentrate produced by the ion exchange system. For ion exchange beads to absorb lithium from brine, an ideal pH range for the brine is optionally 5 to 7, a preferred pH range is optionally 4 to 8, and an acceptable pH range is optionally 1 to 9. In one embodiment, an pH range for the brine is optionally about 1 to about 14, about 2 to about 13, about 3 to about 12, about 4 to about 12, about 4.5 to about 11, about 5 to about 10, about 5 to about 9, about 2 to about 5, about 2 to about 4, about 2 to about 3, about 3 to about 8, about 3 to about 7, about 3 to about 6, about 3 to about 5, about 3 to about 4, about 4 to about 10, about 4 to about 9, about 4 to about 8, about 4 to about 7, about 4 to about 6, about 4 to about 5, about 5 to about 6, about 5 to about 7, about 5 to about 8, about 6 to about 7, about 6 to about 8, or about 7 to about 8.

Process for Handline of Undesirable Metals to Facilitate Recovery of Desirable Metals Direct extraction technologies can be used to recover desirable metals from liquid resources. In one embodiment, direct extraction technologies include ion exchange technologies, absorption technologies, solvent extraction technologies, membrane technologies, direct precipitation technologies, and combinations thereof. In one embodiment, desirable metals may include Li, Na, K, Rb, Cs, Fr, Be, Mg, Ca, Sr, Ba, Ra, Sc, Y, Ti, Zr, Hf, V, Nb, Ta, Cr, Mo, W, Mn, Tc, Fe, Fe, Ru, Os, Co, Rh, Ir, Ni, Pd Pt, Cu, Ag, Au, Zn, Cd, Hg, B, Al, Ga, In, Si, Ge, Sn, Pb, As, Sb, Bi, Se, Te, Po, Br, I, At, or other metals. In one embodiment, undesirable metals may include Li, Na, K, Rb, Cs, Fr, Be, Mg, Ca, Sr, Ba, Ra, Sc, Y, Ti, Zr, Hf, V, Nb, Ta, Cr, Mo, W, Mn, Tc, Fe, Fe, Ru, Os, Co, Rh, Ir, Ni, Pd Pt, Cu, Ag, Au, Zn, Cd, Hg, B, Al, Ga, In, Si, Ge, Sn, Pb, As, Sb, Bi, Se, Te, Po, Br, I, At, or other metals. In one embodiment, metals may be undesirable for a certain process but desirable for a different process.

In one embodiment, ion exchange materials may be used to recover lithium from a liquid resource. In one embodiment, metals such as iron, manganese, and/or other metals may interfere with the lithium recovery process, and may therefore be undesirable to have in the liquid resource during lithium recovery. In one embodiment, undesirable metals such as iron and manganese may be precipitated from the liquid resource and the resulting precipitates may be separated from the liquid resource to create a liquid resource that has reduced contraction of these undesirable metals to facilitate recovery of lithium and/or other desirable metals from the liquid resource. In one embodiment, the precipitated iron, manganese, and/or other undesirable metals may present a challenge related to low value and high disposal cost. In one embodiment, the precipitated iron, manganese, and/or other undesirable metals may be redissolved for disposal. In one embodiment, the precipitated iron, manganese, and/or other undesirable metals may be precipitated from the liquid resource by addition of base such as Ca(OH)$_2$ or NaOH. In one embodiment, the precipitated iron, manganese, and/or other undesirable metals may be redissolved for disposal using acid such as HCl or H$_2$SO$_4$.

In one embodiment, metals may be recovered from a liquid resource using multiple precipitation steps to remove desirable and undesirable metals from the liquid resource, and undesirable and desirable metals may be removed and recombined with the liquid resource. In one embodiment, desirable metals may be precipitated from a liquid resource while undesirable metals remain in the liquid resource. In one embodiment, desirable metals may be co-precipitated from a liquid resource with undesirable metals, and then the desirable or undesirable metals may be redissolved in the liquid resource. In one embodiment, multiple undesirable metals may be precipitate from a liquid resource in subsequent steps using a combination of base, oxidant, temperature, chemicals, membranes, and/or solid-liquid separation devices.

In one embodiment, metals such as iron, manganese, lead, zinc, or other metals are precipitated from the brine by adding base and optionally oxidant to the brine, the precipitated metals are separated from the brine, lithium is recovered from the brine, and then the precipitated metals are dissolved into the brine for reinjection.

In one embodiment, undesirable metals are removed from the brine using ion exchange materials. In one embodiment, the undesirable metals are eluted from ion exchange materials using acid, salt solution, or combinations thereof. In one embodiment, the undesirable metals are separated from the eluate using nano-filtration, membranes, precipitation, or combinations thereof. In one embodiment, metals are eluted from ion exchange materials using a solution of sodium chloride, the metals are removed from the eluate using nano-filtration membranes, and the eluate with metals removed can be reused to elute metals from the ion exchange materials. In one embodiment, nano-filtration membranes produce a retentate containing dissolved metals that can be separated and reinjection into a reservoir. In one embodiment, nano-filtration membranes produce a retentate containing dissolved metals that can be mixed with the brine.

In one embodiment, the metals are dissolved into the brine using acid. In one embodiment, the metals are dissolved into the brine using hydrochloric acid or sulfuric acid. In one embodiment, the metals are precipitated from the brine using base. In one embodiment, the metals are precipitated from the brine using sodium hydroxide, calcium oxide, or calcium hydroxide. In one embodiment, the acid is produced using an electrochemical cell, an electrochemical membrane cell, an electrolytic cell, or combinations thereof. In one embodiment, the acid is produced by combusting sulfur. In one embodiment, the base is produced using an electrochemical cell, an electrochemical membrane cell, an electrolytic cell, or combinations thereof. In one embodiment, the base is produced by roasting lime. In one embodiment, the acid and base are both produced using an electrochemical cell, an electrochemical membrane cell, an electrolytic cell, or combinations thereof.

In one embodiment, undesirable metals such as iron, manganese, lead, zinc, or other metals are precipitated from the brine by adding base and optionally oxidant to the brine, the precipitated metals are separated from the brine, desirable metals are recovered from the brine, and then the undesirable metals are dissolved into the brine for reinjection. In one embodiment, metals are precipitated using chemical precipitates such as hydroxide, phosphates, sulfides, or other chemicals. In one embodiment, oxidants are used to facilitate precipitation such as hydrogen peroxide, air, oxygen, or other oxidants. In one embodiment, flocculants are used to agglomerate precipitates to facilitate solid-liquid separation.

In some embodiments, the brine is processed to remove metals to facilitate recovery of other metals. In some embodiments, the brine is processed to remove metals to facilitate recovery of other metals such as lithium, manganese, zinc, lead, iron, gold, platinum, rubidium, or other metals. In some embodiments, the brine is processed to remove undesirable metals to facilitate recovery of desirable metals and after recovery of the desirable metals, the undesirable metals are redissolved in the brine. In some embodiments, the undesirable metals are redissolved in the brine and injected underground for disposal. In some embodiments, the undesirable metals are redissolved in the brine and injected underground for disposal into the reservoir from which they originated. In some embodiments, the undesirable metals are redissolved in the brine and injected underground for disposal into a reservoir different from the reservoir in which they originated.

In one embodiment, lithium is recovered from brine using an ion exchange material. In one embodiment of the ion exchange system, one or more ion exchange vessels are loaded with a packed or fluidized bed of ion exchange material. In one embodiment of the system, the ion exchange vessel is a cylindrical construct with entry and exit ports. In a further embodiment, the ion exchange vessel is optionally a non-cylindrical construct with entry and exit ports. In a further embodiment, the ion exchange vessel is a tank. In a further embodiment, the ion exchange vessel optionally has entry and exit ports for brine pumping, and additional doors or hatches for loading and unloading ion exchange material to and from the column. In a further embodiment, the ion exchange vessel is optionally equipped with one or more security devices to decrease the risk of loss, spilling, or theft of the ion exchange material. The material can reversibly absorb lithium from brine and release lithium in acid. In one embodiment, the ion exchange material is comprised of particles that are optionally protected with coating material such as an oxide or a polymer to limit dissolution or degradation of the ion exchange material. In one embodiment, the ion exchange material may be in the form of a powder. In one embodiment, the material may be in the form of beads. In one embodiment, the beads contain a structural component such as an acid-resistant polymer that binds the ion exchange materials. In one embodiment, the beads contain pores that facilitate penetration of brine, acid, aqueous, and other solutions into the beads to deliver lithium and hydrogen to and from the bead or to wash the bead. In one embodiment, the bead pores are structured to form a connected network of pores with a distribution of pore sizes and are structured by incorporating filler materials during bead formation and later removing that filler material in a liquid or gas.

In one embodiment of the ion exchange system, the system is a recirculating batch system, which comprises an ion exchange column that is connected to one or more tanks for mixing base into the brine, settling out any precipitates following base addition, and storing the brine prior to reinjection into the ion exchange column or the other tanks. In one embodiment of the recirculating batch system, the brine is loaded into one or more tanks, pumped through the ion exchange column, pumped through a series of tanks, and then returned to the ion exchange column in a loop. In one embodiment, the brine optionally traverses this loop repeatedly. In one embodiment, the brine is recirculated through the ion exchange column to enable optimal lithium uptake by the material. In one embodiment, base is added to the brine in such a way that pH is maintained at an adequate level for lithium uptake and in such a way that the amount of base-related precipitates in the ion exchange column is minimized.

In some embodiments, the ion exchange material comprises an oxide, a phosphate, an oxyfluoride, a fluorophosphate, or a combination thereof. In one embodiment, the ion exchange material is selected from the group consisting of $LiFePO_4$, $LiMnPO_4$, $Li_2MO_3$ (M=Ti, Mn, Sn), $Li_4Ti_5O_{12}$, $Li_4Mn_5O_2$, $LiMn_2O_4$, $Li_{1.6}Mn_{1.6}O_4$, $LiMO_2$ (M=Al, Cu, Ti), $Li_4TiO_4$, $Li_7Ti11O_{24}$, $Li_3VO_4$, $Li_2Si_3O_7$, $Li_2CuP_2O_7$, $Al(OH)_3$, $LiCl.xAl(OH)_3.yH_2O$, $SnO_2.xSb_2O_5.yH_2O$, $TiO_2.xSb_2O_5.yH_2O$, solid solutions thereof, related compositions doped with other elements, related compositions that are off stoichiometry, or a combination thereof; wherein x is from 0.1-10 and y is from 0.1-10.

In one embodiment, the ion exchange material comprises coated ion exchange particles, uncoated ion exchange particles or a combination thereof.

In some embodiments, uncoated ion exchange particles comprise ion exchange material (as described herein).

In some embodiments, coated ion exchange particles comprise ion exchange material (as described herein) and coating material. In some embodiments, the ion exchange material comprises an oxide, a phosphate, an oxyfluoride, a fluorophosphate, or a combination thereof. In one embodiment, the ion exchange material is selected from the group consisting of $LiFePO_4$, $LiMnPO_4$, $Li_2MO_3$ (M=Ti, Mn, Sn), $Li_4Ti_5O_{12}$, $Li_4Mn_5O_2$, $LiMn_2O_4$, $Li_{1.6}Mn_{1.6}O_4$, $LiMO_2$ (M=Al, Cu, Ti), $Li_4TiO_4$, $Li_7Ti11O_{24}$, $Li_3VO_4$, $Li_2Si_3O_7$, $Li_2CuP_2O_7$, $Al(OH)_3$, $LiCl.xAl(OH)_3.yH_2O$, $SnO_2.xSb_2O_5.yH_2O$, $TiO_2.xSb_2O_5.yH_2O$, solid solutions thereof, related compositions doped with other elements, related compositions that are off stoichiometry, or a combination thereof; wherein x is from 0.1-10 and y is from 0.1-10.

In some embodiments, the coating material comprises a carbide, a nitride, an oxide, a phosphate, a fluoride, a polymer, carbon, a carbonaceous material, or a combination thereof. In some embodiments, the coating material comprises $Nb_2O_5$, $Ta_2O_5$, $MoO_2$, $TiO_2$, $ZrO_2$, $MoO_2$, $SnO_2$, $SiO_2$, $Li_2O$, $Li_2TiO_3$, $Li_2ZrO_3$, $Li_2MoO_3$, $LiNbO_3$, $LiTaO_3$, $Li_2SiO_3$, $Li_2Si_2O_5$, $Li_2MnO_3$, $ZrSiO_4$, $AlPO_4$, $LaPO_4$, $ZrP_2O_7$, $MoP_2O_7$, $Mo_2P_3O_{12}$, $BaSO_4$, $AlF_3$, SiC, TiC, ZrC, $Si_3N_4$, ZrN, BN, carbon, graphitic carbon, amorphous carbon, hard carbon, diamond-like carbon, solid solutions thereof, or combinations thereof. In some embodiments, the coating material comprises polyvinylidene difluoride, polyvinyl chloride, a fluoro-polymer, a chloro-polymer, or a fluoro-chloro-polymer. In some embodiments, the coating material comprises $TiO_2$, $ZrO_2$, $SiO_2$ $MoO_2$, $Li_2TiO_3$, $Li_2ZrO_3$, $Li_2MnO_3$, $ZrSiO_4$, or $LiNbO_3$, $AlF_3$, SiC, $Si_3N_4$, graphitic carbon, amorphous carbon, diamond-like carbon, or a combination thereof. In some embodiments, the coating material comprises $TiO_2$, $SiO_2$, or $ZrO_2$. In some embodiments, the coating material comprises $TiO_2$. In some embodiments, the coating material comprises $SiO_2$. In some embodiments, the coating material comprises $ZrO_2$.

In a further one aspect, a coating material comprises a polymer. In an embodiment, the coating material comprises a chloro-polymer, a fluoro-polymer, a chloro-fluoro-polymer, a hydrophilic polymer, a hydrophobic polymer, co-polymers thereof, mixtures thereof, or combinations thereof.

In a further aspect, a coating material comprises a co-polymer, a block co-polymer, a linear polymer, a branched polymer, a cross-linked polymer, a heat-treated polymer, a solution processed polymer, co-polymers thereof, mixtures thereof, or combinations thereof.

In a further aspect, a coating material comprises polyethylene, low density polyethylene, high density polyethylene, polypropylene, polyester, polytetrafluoroethylene (PTFE), types of polyamide, polyether ether ketone (PEEK), polysulfone, polyvinylidene fluoride (PVDF), poly (4-vinyl pyridine-co-styrene) (PVPCS), polystyrene (PS), polybutadiene, acrylonitrile butadiene styrene (ABS), polyvinyl chloride (PVC), ethylene tetrafluoroethylene polymer (ETFE), poly (chlorotrifluoroethylene) (PCTFE), ethylene chlorotrifluoro ethylene (Halar), polyvinylfluoride (PVF), fluorinated ethylene-propylene (FEP), perfluorinated elastomer, chlorotrifluoroethylene vinylidene fluoride (FKM), perfluoropolyether (PFPE), perfluorosulfonic acid (Nafion), polyethylene oxide, polyethylene glycol, sodium polyacrylate, polyethylene-block-poly(ethylene glycol), polyacrylonitrile (PAN), polychloroprene (neoprene), polyvinyl butyral (PVB), expanded polystyrene (EPS), polydivinylbenzene, co-polymers thereof, mixtures thereof, or combinations thereof.

In a further aspect, a coating material comprises polyvinylidene fluoride (PVDF), polyvinyl chloride (PVC), ethylene chlorotrifluoro ethylene (Halar), poly (4-vinyl pyridine-co-styrene) (PVPCS), polystyrene (PS), acrylonitrile butadiene styrene (ABS), expanded polystyrene (EPS), polyphenylene sulfide, sulfonated polymer, carboxylated polymer, other polymers, co-polymers thereof, mixtures thereof, or combinations thereof.

In one embodiment, the ion exchange material is a porous ion exchange material. In one embodiment, the ion exchange material is in the form of porous beads. In one embodiment, the ion exchange material is in a powder form. In one embodiment, the acid solution is a solution of $H_2SO_4$ or HCl.

In some embodiments, lithium or other metals are recovered from the brine using a porous structure for ion exchange comprising: a) a structural support; and b) a plurality of particles selected from coated ion exchange particles, uncoated ion exchange particles, and a combination thereof. In some embodiments, the structural support comprises a polymer, an oxide, a phosphate, or combinations thereof. In some embodiments, the structural support comprises a polymer. In some embodiments, the polymer is polyvinylidene fluoride, polyvinyl fluoride, polyvinyl chloride, polyvinylidene chloride, a chloro-polymer, a fluoro-polymer, a fluoro-chloro-polymer, polyethylene, polypropylene, polyphenylene sulfide, polytetrafluoroethylene, sulfonated polytetrafluoroethylene, polystyrene, polydivinylbenzene, polybutadiene, a sulfonated polymer, a carboxylated polymer, polyacrylonitrile, Nafion®, copolymers thereof, or combinations thereof.

In some embodiments, lithium or other metals are recovered from the brine using a batch, semi-batch, semi-continuous, or continuous process. In some embodiments, ion exchange beads are moved through the system in an opposite direction of the brine.

Solid-Liquid Separation

In one embodiment, the precipitated metals are separated from the brine using utilizing filtration, gravity sedimentation, centrifugal sedimentation, magnetic fields, other methods of solid-liquid separation, or combinations thereof. In some embodiments, precipitated metals are removed from the brine using a filter. In some embodiments, the filter is a belt filter, plate-and-frame filter press, pressure vessel containing filter elements, rotary drum filter, rotary disc filter, cartridge filter, a centrifugal filter with a fixed or moving bed, a metal screen, a perforate basket centrifuge, a three-point centrifuge, a peeler type centrifuge, or a pusher centrifuge. In some embodiments, the filter may use a scroll or a vibrating device. In some embodiments, the filter is horizontal, vertical, or may use a siphon.

In some embodiments, a filter cake is prevented, limited, or removed by using gravity, centrifugal force, an electric field, vibration, brushes, liquid jets, scrapers, intermittent reverse flow, vibration, crow-flow filtration, or pumping suspensions across the surface of the filter. In some embodiments, the precipitated metals and a liquid is moved tangentially to the filter to limit cake growth. In some embodiments, gravitational, magnetic, centrifugal sedimentation, or other means of solid-liquid separation are used before, during, or after filtering to prevent cake formation.

In some embodiments, a filter comprises a screen, a metal screen, a sieve, a sieve bend, a bent sieve, a high frequency electromagnetic screen, a resonance screen, or combinations thereof. In some embodiments, one or more particle traps are a solid-liquid separation apparatus.

In some embodiments, one or more solid-liquid separation apparatuses may be used in series or parallel. In some embodiments, a dilute slurry is removed from the tank, transferred to an external solid-liquid separation apparatus, and separated into a concentrated slurry and a solution with low or no suspended solids. In some embodiments, the concentrated slurry is returned to the tank or transferred to a different tank. In some embodiments, precipitate metals are transferred from a brine tank to another brine tank, from an acid tank to another acid tank, from a washing tank to another washing tank, from a brine tank to a washing tank, from a washing tank to an acid tank, from an acid tank to a washing tank, or from an acid tank to a brine tank.

In some embodiments, solid-liquid separation apparatuses may use gravitational sedimentation. In some embodiments, solid-liquid separation apparatuses may include a settling tank, a thickener, a clarifier, a gravity thickener. In some embodiments, solid-liquid separation apparatuses are operated in batch mode, semi-batch mode, semi-continuous mode, or continuous mode. In some embodiments, solid-liquid separation apparatuses include a circular basin thickener with slurry entering through a central inlet such that the slurry is dispersed into the thickener with one or more raking components that rotate and concentrate the ion exchange particles into a zone where the particles can leave through the bottom of the thickener.

In some embodiments, solid-liquid separation apparatuses include a deep cone, a deep cone tank, a deep cone compression tank, or a tank wherein the slurry is compacted by weight. In some embodiments, solid-liquid separation apparatuses include a tray thickener with a series of thickeners oriented vertically with a center axle and raking components. In some embodiments, solid-liquid separation apparatuses include a lamella type thickener with inclined plates or tubes that may be smooth, flat, rough, or corrugated. In some embodiments, solid-liquid separation apparatuses include a gravity clarifier that may be a rectangular basin with feed at one end and overflow at the opposite end optionally with paddles and/or a chain mechanism to move particles. In some embodiments, the solid-liquid separation apparatuses may be a particle trap.

In some embodiments, the solid-liquid separation apparatuses use centrifugal sedimentation. In some embodiments, solid-liquid separation apparatuses may include a tubular centrifuge, a multi-chamber centrifuge, a conical basket centrifuge, a scroll-type centrifuge, a sedimenting centrifuge, or a disc centrifuge. In some embodiments, precipitated metals are discharged continuously or intermittently from the centrifuge. In some embodiments, the solid-liquid separation apparatus is a hydrocyclone. In some embodiments, solid-liquid separation apparatus is an array of hydrocyclones or centrifuges in series and/or in parallel. In some embodiments, sumps are used to resluny the precipitated metals. In some embodiments, the hydrocyclones may have multiple feed points. In some embodiments, a hydrocyclone is used upside down. In some embodiments, liquid is injected near the apex of the cone of a hydrocyclone to improve sharpness of cut. In some embodiments, a weir rotates in the center of the particle trap with a feed of slurried precipitated metals entering near the middle of the apparatus, and precipitated metals get trapped at the bottom and center of the apparatus due to a "teacup effect".

Base and Acid Generation

In one embodiment, base is used to precipitate undesirable metals from the liquid resource, the precipitate metals are separated from the liquid resource, and then the precipitated metals are redissolved using acid. In one embodiment, acid and base are generated using an electrochemical cell. In one embodiment, acid and base are generated using electrodes. In one embodiment, acid and base are generated using a membrane.

In one embodiment, said ion-conducting membrane is a cation-conducting membrane, an anion-conducting membrane or combinations thereof. In one embodiment, said ion-conducting membrane comprises sulfonated tetrafluoroethylene-based fluoropolymer-copolymer, sulfonated tetrafluoroethylene, sulfonated fluoropolymer, MK-40, co-polymers, or combinations thereof.

In one embodiment, said anion-conducting membrane comprises a functionalized polymer structure.

In one embodiment, said functionalized polymer structure comprises polyarylene ethers, polysulfones, polyether ketones, polyphenylenes, perfluorinated polymers, polybenzimidazole, polyepichlorohydrins, unsaturated polypropylene, polyethylene, polystyrene, polyvinylbenzyl chlorides, polyphosphazenes, polyvinyl alcohol, polytetrafluoroethylene, polyvinyl chloride, polyvinylidene fluoride, alterations of these polymers or other kinds of polymers, or composites thereof. In one embodiment, said cation-conducting membrane allows for transfer of lithium ions but prevents transfer of anion groups. In one embodiment, said ion-conducting membrane has a thickness from about 1 µm to about 1000 µm. In one embodiment, said ion-conducting membrane has a thickness from about 1 mm to about 10 mm.

In one embodiment, said electrodes are comprised of titanium, niobium, zirconium, tantalum, magnesium, titanium dioxide, oxides thereof, or combinations thereof. In one embodiment, said electrodes further comprise a coating of platinum, $TiO_2$, $ZrO_2$, $Nb_2O_5$, $Ta_2O_5$, $SnO_2$, $IrO_2$, $RuO_2$, mixed metal oxides, graphene, derivatives thereof, or combinations thereof.

In one embodiment of an integrated system, a chlor-alkali setup is used to generate HCl and NaOH from an aqueous NaCl solution. In one embodiment, the HCl is used to elute lithium from an ion exchange system for selective lithium uptake to produce a lithium eluate solution. In one embodiment, the NaOH from the chlor-alkali setup is used to control the pH of the brine in the ion exchange system for selective lithium uptake. In one embodiment, the NaOH is used to precipitate impurities from a lithium eluate solution.

In one embodiment, the system includes one or more electrochemical or electrolysis systems. The terms "electrochemical" and "electrolysis" are used interchangeably in the present specification and these terms are synonymous unless specifically noted to the contrary. In one embodiment, an electrolysis system is comprised of one or more electrochemical cells. In one embodiment, an electrochemical system is used to produce HCl and NaOH. In one embodiment, an electrochemical system converts a salt solution into acid in base. In one embodiment, an electrochemical system converts a salt solution containing NaCl, KCl, and/or other chlorides into a base and an acid. In one embodiment, a salt solution precipitated or recovered from the brine is fed into an electrochemical system to produce acid and base. In one embodiment, an electrolysis system converts a lithium salt solution to form a lithium hydroxide solution, an acidified solution, and optionally a dilute lithium salt solution. In one embodiment, the lithium salt solution is or is derived from a lithium eluate solution, produced by an ion exchange system that has optionally been concentrated and/or purified. In one embodiment, acidified solution from an electrolysis system is returned to an ion exchange system to elute more lithium eluate solution.

In one embodiment of the integrated system, the integrated system includes one or more electrolysis systems. In one embodiment, an electrolysis system is comprised of one or more electrodialysis cells. In one embodiment, an electrolysis system converts a lithium salt solution to form a lithium hydroxide solution, an acidified solution, and optionally a dilute lithium salt solution. In one embodiment, the lithium salt solution is or is derived from a lithium eluate solution, produced by an ion exchange system that has optionally been concentrated and/or purified. In one embodiment, acidified solution from an electrolysis system is returned to an ion exchange system to elute more lithium eluate solution.

In one embodiment, a lithium salt solution contains unreacted acid from the ion exchange system. In one embodiment, unreacted acid in the lithium salt solution from an ion exchange system passes through an electrolysis system and is further acidified to form an acidified solution. In one embodiment, a lithium salt solution derived from an ion exchange system is purified to remove impurities without neutralizing the unreacted acid in the lithium salt solution and is then fed into an electrolysis system.

In one embodiment, an acidified solution produced by an electrolysis system contains lithium ions from the lithium salt solution fed into the electrolysis system. In one embodiment, an acidified solution containing lithium ions leaves the electrolysis system and is fed back to an ion exchange system to elute lithium and produce more lithium salt solution.

In one embodiment of an electrolysis system, the electrolysis cells are electrochemical cells. In one embodiment of a electrochemical cell, the membranes may be cation-conducting and/or anion-conducting membranes. In one embodiment, the electrochemical cell is a two-compartment cell with a cation-conducting membrane that allows for transfer of lithium ions between the chambers but prevents transfer of anion groups such as chloride, sulfate, and hydroxide groups.

In one embodiment of an electrolysis system, the electrolysis cells are electrodialysis cells. In one embodiment of a electrodialysis cell, the membranes may be cation-conducting and/or anion-conducting membranes. In one embodiment, the electrodialysis cell is a two-compartment cell with a cation-conducting membrane that allows for transfer of lithium ions between the chambers but prevents transfer of anion groups such as chloride, sulfate, and hydroxide groups.

In one embodiment of an electrolysis system, the electrolysis cells are membrane electrolysis cells. In one embodiment of a membrane electrolysis cell, the membranes may be cation-conducting and/or anion-conducting membranes. In one embodiment, the membrane electrolysis cell is a two-compartment cell with a cation-conducting membrane that allows for transfer of lithium ions between the chambers but prevents transfer of anion groups such as chloride, sulfate, and hydroxide groups.

In one embodiment, the membrane electrolysis cell is a three-compartment cell with a cation-conducting membrane that allows for transfer of lithium ions separating a compartment with an electrochemically reducing electrode from a central compartment and with an anion-conducting membrane that allows for transfer of anions ions separating a compartment with an electrochemically oxidizing electrode from the central compartment. In one embodiment, the cation-conducting membrane prevents transfer of anions such as chloride, sulfate, or hydroxide.

In one embodiment, the anion-conducting membrane prevents transfer of cations such as lithium, sodium, or protons.

In one embodiment of the membrane electrolysis cell, the membranes may be comprised of Nafion®, sulfonated tetrafluoroethylene, sulfonated fluoropolymer, MK-40, co-polymers, other membrane materials, composites, or combinations thereof. In one embodiment of the membrane electrolysis cell, the cation exchange membranes are comprised of a functionalized polymer structure which may be Nafion®, sulfonated tetrafluoroethylene, sulfonated fluoropolymer, co-polymers, different polymers, composites of polymers, or combinations thereof. In one embodiment of the membrane electrolysis cell, the polymer structures of the cation exchange membrane are functionalized with sulfone groups, carboxylic acid groups, phosphate groups, other negatively charged functional groups, or combinations thereof.

In one embodiment of the electrochemical cell, the membranes may be comprised of Nafion®, sulfonated tetrafluoroethylene, sulfonated fluoropolymer, MK-40, co-polymers, other membrane materials, composites, or combinations thereof. In one embodiment of the electrochemical cell, the cation exchange membranes are comprised of a functionalized polymer structure which may be Nafion®, sulfonated tetrafluoroethylene, sulfonated fluoropolymer, co-polymers, different polymers, composites of polymers, or combinations thereof. In one embodiment of the electrochemical cell, the polymer structures of the cation exchange membrane are functionalized with sulfone groups, carboxylic acid groups, phosphate groups, other negatively charged functional groups, or combinations thereof.

In one embodiment of the electrodialysis cell, the membranes may be comprised of Nafion®, sulfonated tetrafluoroethylene, sulfonated fluoropolymer, MK-40, co-polymers, other membrane materials, composites, or combinations thereof. In one embodiment of the electrodialysis cell, the cation exchange membranes are comprised of a functionalized polymer structure which may be Nafion®, sulfonated tetrafluoroethylene, sulfonated fluoropolymer, co-polymers, different polymers, composites of polymers, or combinations thereof. In one embodiment of the electrodialysis cell, the polymer structures of the cation exchange membrane are functionalized with sulfone groups, carboxylic acid groups, phosphate groups, other negatively charged functional groups, or combinations thereof.

In one embodiment of the membrane electrolysis cell, an anion exchange membrane is comprised of a functionalized polymer structure. The polymer structure may be comprised of polyarylene ethers, polysulfones, polyether ketones, polyphenylenes, perfluorinated polymers, polybenzimidazole, polyepichlorohydrins, unsaturated polypropylene, polyethylene, polystyrene, polyvinylbenzyl chlorides, polyphosphazenes, polyvinyl alcohol, polytetrafluoroethylene, polyvinyl chloride, polyvinylidene fluoride, alterations of these polymers or other kinds of polymers, or composites thereof. In one embodiment of the membrane, the functional groups are part of the polymer backbone. In one embodiment of the membrane, functional groups are added using plasma techniques, radiation-grafting, or by other functionalization reactions. In one embodiment of the membrane, the functional group may be benzyltrialkylammonium, alkyl-side-chain quaternary ammonium groups, crosslinking diammonium groups, quinuclidinium-based quaternary ammonium groups, imidazolium groups, pyridinium groups, pentamethylguanidinium groups, alkali stabilised quaternary phosphonium groups, metal containing cation groups, other cation containing groups, or combinations thereof.

In one embodiment of the electrochemical cell, an anion exchange membrane is comprised of a functionalized polymer structure. The polymer structure may be comprised of polyarylene ethers, polysulfones, polyether ketones, polyphenylenes, perfluorinated polymers, polybenzimidazole, polyepichlorohydrins, unsaturated polypropylene, polyethylene, polystyrene, polyvinylbenzyl chlorides, polyphosphazenes, polyvinyl alcohol, polytetrafluoroethylene, polyvinyl chloride, polyvinylidene fluoride, alterations of these polymers or other kinds of polymers, or composites thereof. In one embodiment of the membrane, the functional groups are part of the polymer backbone. In one embodiment of the membrane, functional groups are added using plasma techniques, radiation-grafting, or by other functionalization reactions. In one embodiment of the membrane, the functional group may be benzyltrialkylammonium, alkyl-side-chain quaternary ammonium groups, crosslinking diammonium groups, quinuclidinium-based quaternary ammonium groups, imidazolium groups, pyridinium groups, pentamethylguanidinium groups, alkali stabilised quaternary phosphonium groups, metal containing cation groups, other cation containing groups, or combinations thereof.

In one embodiment of the electrodialysis cell, an anion exchange membrane is comprised of a functionalized polymer structure. The polymer structure may be comprised of polyarylene ethers, polysulfones, polyether ketones, polyphenylenes, perfluorinated polymers, polybenzimidazole, polyepichlorohydrins, unsaturated polypropylene, polyethylene, polystyrene, polyvinylbenzyl chlorides, polyphosphazenes, polyvinyl alcohol, polytetrafluoroethylene, polyvinyl chloride, polyvinylidene fluoride, alterations of these polymers or other kinds of polymers, or composites thereof. In one embodiment of the membrane, the functional groups are part of the polymer backbone. In one embodiment of the membrane, functional groups are added using plasma techniques, radiation-grafting, or by other functionalization reactions. In one embodiment of the membrane, the functional group may be benzyltrialkylammonium, alkyl-side-chain quaternary ammonium groups, crosslinking diammonium groups, quinuclidinium-based quaternary ammonium groups, imidazolium groups, pyridinium groups, pentamethylguanidinium groups, alkali stabilised quaternary phosphonium groups, metal containing cation groups, other cation containing groups, or combinations thereof.

In one embodiment of the membrane electrolysis cell, the membrane may have a thickness of less than 10 µm, less than 50 µm, less than 200 µm, less than 400 µm, or less than 1,000 µm. In one embodiment of the membrane electrolysis cell, the membranes may have a thickness of greater than 1,000 µm. In one embodiment of the membrane electrolysis cell, the membrane may have a thickness of about 1 µm to about 1000 µm, about 1 µm to about 800 µm, about 1 µm to about 600 µm, about 1 µm to about 400 µm, about 1 µm to about 200 µm, about 1 µm to about 100 µm, about 1 µm to about 90 µm, about 1 µm to about 80 µm, about 1 µm to about 70 µm, about 1 µm to about 60 µm, about 1 µm to about 50 µm, about 1 µm to about 40 µm, about 1 µm to about 30 µm, about 1 µm to about 20 µm, about 1 µm to about 15 µm, or about 1 µm to about 10 µm.

In one embodiment of the electrochemical cell, the membrane may have a thickness of less than 10 µm, less than 50 µm, less than 200 µm, less than 400 µm, or less than 1,000 µm. In one embodiment of the electrochemical cell, the membranes may have a thickness of greater than 1,000 µm. In one embodiment of the electrochemical cell, the membrane may have a thickness of about 1 µm to about 1000 µm, about 1 µm to about 800 µm, about 1 µm to about 600 µm, about 1 µm to about 400 µm, about 1 µm to about 200 µm, about 1 µm to about 100 µm, about 1 µm to about 90 µm, about 1 µm to about 80 µm, about 1 µm to about 70 µm, about 1 µm to about 60 µm, about 1 µm to about 50 µm, about 1 µm to about 40 µm, about 1 µm to about 30 µm, about 1 µm to about 20 µm, about 1 µm to about 15 µm, or about 1 µm to about 10 µm.

In one embodiment of the electrodialysis cell, the membrane may have a thickness of less than 10 µm, less than 50 µm, less than 200 µm, less than 400 µm, or less than 1,000 µm. In one embodiment of the electrodialysis cell, the membranes may have a thickness of greater than 1,000 µm. In one embodiment of the electrodialysis cell, the membrane may have a thickness of about 1 µm to about 1000 µm, about 1 µm to about 800 µm, about 1 µm to about 600 µm, about 1 µm to about 400 µm, about 1 µm to about 200 µm, about 1 µm to about 100 µm, about 1 µm to about 90 µm, about 1 µm to about 80 µm, about 1 µm to about 70 µm, about 1 µm to about 60 µm, about 1 µm to about 50 µm, about 1 µm to about 40 µm, about 1 µm to about 30 µm, about 1 µm to about 20 µm, about 1 µm to about 15 µm, or about 1 µm to about 10 µm.

In one embodiment, an electrolysis system contains electrolysis cells that may be two-compartment electrolysis cells or three-compartment electrolysis cells.

In one embodiment of a two-compartment electrolysis cell, the cell contains a first compartment that contains an electrochemically oxidizing electrode. A lithium salt solution enters the first compartment and is converted into an acidified solution. In one embodiment of a two-compartment electrolysis cell, the cell contains a second compartment containing an electrochemically reducing electrode. This second compartment takes as an input a water or dilute LiOH solution, and produces as an output a more concentrated LiOH solution. In one embodiment, the compartments are separated by a cation-conducting membrane that limits transport of anions.

In one embodiment of a three-compartment electrolysis cell, the cell contains a first compartment containing an electrochemically oxidizing electrode. The first compartment takes as an input water or a dilute salt solution, and produces as an output an acidified solution. In one embodiment of a three-compartment electrolysis cell, the cell contains a second compartment containing an electrochemically reducing electrode. This second compartment takes as an input a water or dilute hydroxide solution, and produces as an output a more concentrated hydroxide solution. In one embodiment of a three-compartment electrolysis cell, the cell contains a third compartment containing no electrode, which is located between the first and second compartment, and takes as an input a concentrated lithium salt solution, and produces as an output a dilute lithium salt solution. In one embodiment, the first and the third compartments are separated by an anion-conducting membrane that limits transport of cations. In one embodiment, the second and the third compartments are separated by a cation-conducting membrane that limits transport of anions.

In one embodiment of the electrolysis cell, the electrodes may be comprised of titanium, niobium, zirconium, tantalum, magnesium, titanium dioxide, oxides thereof, or combinations thereof. In one embodiment of the electrolysis cell, the electrodes may be coated with platinum, $TiO_2$, $ZrO_2$, $Nb_2O_5$, $Ta_2O_5$, $SnO_2$, $IrO_2$, $RuO_2$, $PtO_x$, mixed metal oxides, graphene, derivatives thereof, or combinations thereof. In one embodiment of the electrolysis cell, the electrodes may be comprised of steel, stainless steel, nickel, nickel alloys, steel alloys, or graphite.

In one embodiment of the electrolysis system, the lithium salt solution is a LiCl solution optionally containing HCl. In one embodiment of the electrolysis system, the electrochemically oxidizing electrode oxides chloride ions to produce chlorine gas.

In one embodiment of the electrolysis system, the lithium salt solution is a $Li_2SO_4$ solution optionally containing $H_2SO_4$. In one embodiment of the electrolysis system, the electrochemically oxidizing electrode oxidizes water, hydroxide, or other species to produce oxygen gas.

In one embodiment of the electrolysis system, the electrochemically reducing electrode reduces hydrogen ions to produce hydrogen gas. In one embodiment of the electrolysis system, the chamber containing the electrochemically reducing electrode produces a hydroxide solution or increases the hydroxide concentration of a solution.

In one embodiment of the electrolysis system, chlorine and hydrogen gas are burned to produce HCl in an HCl burner. In one embodiment, the HCl burner is a column maintained at approximately 100-300 or 300-2,000 degrees Celsius. In one embodiment, HCl produced in the HCl burner is cooled through a heat exchange and absorbed into water in an absorption tower to produce aqueous HCl solution. In one embodiment, the HCl solution produced from the HCl burner is used to elute lithium from an ion exchange system.

In one embodiment, the pH of the acidified solution leaving the electrolysis cell may be 0 to 1, −2 to 0, 1 to 2, less than 2, less than 1, or less than 0. In some embodiments, the membrane electrolysis cell is an electrodialysis cell with multiple compartments. In some embodiments, the electrodialysis cell may have more than about two, more than about five, more than about 10, or more than about twenty compartments.

In one embodiment, the base added to precipitate metals from the liquid resource may be calcium hydroxide or sodium hydroxide. In one embodiment, the base may be added to the liquid resource as an aqueous solution with a base concentration that may be less than 1 N, 1-2 N, 2-4 N, 4-10 N, 10-20 N, or 20-40 N. In one embodiment, the base may be added to the liquid resource as a solid.

In one embodiment, the acid may be added to the precipitated metals to dissolve the precipitated metals before mixing the redissolved metals with the liquid resource. In one embodiment, the acid may be added to the liquid resource to acidify the liquid resource, and the precipitated metals may be combined with the acidified liquid resource to redissolve the precipitated metals.

In some embodiments, acid from the electrochemical cell may be used to elute lithium from the selective ion exchange material. In some embodiments, base from the electrochemical cell may be used to neutralize protons released from the selective ion exchange material.

Impurities Absorbed from Liquid Resource

In some embodiments, non-lithium impurities absorbed from the liquid resource, and eluted from lithium-enriched ion exchange material comprise multivalent impurities. In some embodiments, the multivalent impurities comprise multivalent cations. In some embodiments, the multivalent cations comprise barium, magnesium, strontium, other metals, or combinations thereof.

Acidic Solution

In one embodiment, the acidic solution comprises sulfuric acid, phosphoric acid, hydrochloric acid, hydrobromic acid, carbonic acid, nitric acid, or combinations thereof. In one embodiment, lithium is eluted from a lithium selective ion exchange material using sulfuric acid, phosphoric acid, hydrochloric acid, nitric acid, or combinations thereof. In one embodiment, lithium is eluted from a lithium selective ion exchange material using an acid solution comprising sulfate, phosphate, nitrate, borate, or combinations thereof.

In some embodiments, the acidic solution comprises dissolved species that may precipitate at certain concentrations. In some embodiments, the acidic solution comprises dissolved species that may be reduced in concentration to avoid precipitation. In some embodiments, the dissolved species in an acidic solution comprises sulfate anions, nitrate anions, phosphate anions, chloride anions, bromide anions, fluoride anions, borate anions, iodide anions, carbonate anions, or combinations thereof. In some embodiments, lithium and non-lithium impurities are eluted into the acidic solution from the first lithium-enriched ion exchange material, forming a impurities-enriched lithiated ("IEL") acidic solution, wherein the eluted impurities react with one or more said anions in the acidic solution to form insoluble salts, which may precipitate. In some embodiments, the concentrations of said anions and non-lithium impurities in the IEL acidic solution are independently limited so as to reduce or inhibit precipitation of insoluble salts. In one embodiment, the acidic solution comprises sulfate anions.

In some embodiments, the acidic solution further comprises water, salt, chelating compounds, ethylenediaminetetraacetic acid, salt of ethylenediaminetetraacetate, compounds of ethylenediaminetetraacetate, anti-scalants, or combinations thereof. In some embodiments, dilution water is added to the acidic solution to limit and/or prevent formation of insoluble precipitates.

Removal of Impurities

In some embodiments, impurities are removed from an IEL eluate and/or new IEL eluate using an impurities selective ion exchange material, nanofiltration, chemical precipitation, electrochemical separation, temperature reduction precipitation, other methods of removing impurities, or combinations thereof. In some embodiments, impurities are removed using combinations of impurities selective ion exchange material, nanofiltration, chemical precipitation, electrochemical separation, temperature reduction precipitation, other methods of removing multivalent impurities, or combinations thereof, in parallel, in series, or combinations thereof.

Impurities Selective Ion Exchange Material

In some embodiments, for any lithium extraction process or system described herein, impurities are at least removed by contacting an impurities-enriched lithiated (IEL) acidic solution with an impurities selective ion exchange material. In some embodiments, impurities selective ion exchange material comprises multivalent impurities selective ion exchange material. In some embodiments, the multivalent impurities selective ion exchange material comprises multivalent cation selective (MCS) ion exchange material. In some embodiments, MCS ion exchange material is provided in a packed bed. In some embodiments, MCS ion exchange material is provided in a fluidized bed. In some embodiments, MCS ion exchange material is located in a MCS vessel. In some embodiments, MCS ion exchange material is arranged in a network of MCS vessels. In some embodiments, MCS ion exchange material is arranged in a network of MCS vessels, wherein IEL acidic solution is sequentially passed through the network of MCS vessels, such that multivalent cations are absorbed from the IEL acidic solution as it passes through each MCS vessel. In some embodiments, the amount of multivalent cations absorbed from a IEL acidic solution passing through a network of MCS vessels decreases from a first MCS vessel in the sequence of IEL acidic solution flow to a last MCS vessel in said sequence. In some embodiments, the last MCS vessel in said sequence absorbs trace amounts of multivalent cations. In some embodiments, the sequence of the plurality of MCS vessels is rearranged based on the saturation of the MCS ion exchange material in each MCS vessel. In some embodiments, MCS ion exchange material is arranged in a lead-lag configuration. In some embodiments, the MCS ion exchange material is arranged in a variation of a lead-lag setup. In some embodiments, the MCS ion exchange material is eluted using a second acidic solution. In some embodiments, the MCS ion exchange material is eluted using hydrochloric acid. In some embodiments, the MCS ion exchange material is regenerated using sodium hydroxide, potassium hydroxide, or a combination thereof. In some embodiments, the MCS ion exchange material is provided in one or more stirred tank reactors, tanks, columns, fluidized beds, packed beds, or combinations thereof, and arranged in series and/or parallel.

In one embodiment, a multivalent cation selective (MCS) ion exchange material is selective for cations with a charge of 2+, 3+, 4+, 5+, 6+, or combinations thereof.

In one embodiment, the multivalent selective cation exchange material is comprised of polystyrene, polybutadiene, mixtures thereof, modifications thereof, or combinations thereof. In one embodiment, the multivalent selective cation exchange material is comprised of polystyrene, polystyrene functionalized with sulfonate, polystyrene-polybutadiene copolymer functionalized with sulfonate group and/or phosphonate group, poly(2-acrylamido-2-methyl-1-propanesulfonic acid) (PolyAMPS), poly(styrene-co-divinylbenzene) copolymer functionalized with sulfonate group, phosphonate group, iminodiacetic group, carboxylic acid group, mixtures thereof, modifications thereof, or combinations thereof. In one embodiment, the ion exchange material for impurity removal is comprised of polystyrene, polybutadiene, mixtures thereof, modifications thereof, or combinations thereof. In one embodiment, the ion exchange material for impurity removal is comprised of polystyrene, polybutadiene, poly divinyl benzene, divinyl benzene, polystyrene functionalized with sulfonate, polystyrene-polybutadiene copolymer functionalized with sulfonate group and/or phosphonate group, poly(2-acrylamido-2-methyl-1-propanesulfonic acid) (PolyAMPS), poly(styrene-co-divinylbenzene) copolymer functionalized with sulfonate group, phosphonate group, iminodiacetic group, carboxylic acid group, mixtures thereof, modifications thereof, or combinations thereof. In one embodiment, the multivalent selective cation exchange material is comprised of a zeolite, clinoptilolite, bentonite, glauconite, mixtures thereof, modifications thereof, or combinations thereof. In one embodiment, the ion exchange material for impurity removal is comprised a strong acidic cation exchange resin. In one embodiment, a strong acidic cation exchange resin is used to remove multivalent cations from an acidic solution containing lithium. In one embodiment, the ion exchange material for impurity removal is comprised a gel-type strong acidic cation exchange resin. In one embodiment, a gel-type strong acidic cation exchange resin is used to remove multivalent cations from an acidic solution containing lithium. In one embodiment, the ion exchange material for impurity removal is comprised a gel-type strong acidic cation exchange resin with a gaussian, narrow, or other particle size distribution. In one embodiment, the ion exchange material for impurity removal is operated in co-flow or counter-flow. In one embodiment, the ion exchange material for impurity removal is contacted with alternating flows of acidic eluate solution containing lithium and impurities, and flows of hydrochloric acid solution. In one embodiment, the ion exchange material for impurity removal is contacted with alternating flows of acidic eluate solution containing lithium and impurities, and flows of hydrochloric acid solution in the same or opposite directions.

In one embodiment, the ion exchange material for impurity removal from the acidic lithium solution (e.g., impurities-enriched lithiated (IEL) acidic solution, as described herein) is a styrene divinylbenzene copolymer. In one embodiment, the ion exchange material for impurity removal from the acidic lithium solution is a styrene divinylbenzene copolymer with sulfonic acid functional groups. In one embodiment, the ion exchange material for impurity removal from the acidic lithium solution is a styrene copolymer with sulfonic acid functional groups. In one embodiment, the ion exchange material for impurity removal from the acidic lithium solution is a styrene butadiene copolymer with sulfonic acid functional groups. In one embodiment, the ion exchange material for impurity removal comprises beads with a mean diameter of about 10-50 microns, 50-100 microns, 100-200 microns, 200-400 microns, 300-500 microns, 400-600 microns, 600-800 microns, 200-500 microns, 400-800 microns, 500-1000 microns, 800-1600 microns, or 1000-2000 microns. In one embodiment, the ion exchange material for selective lithium extraction from the liquid resources comprises beads with a mean diameter of about 10-50 microns, 50-100 microns, 100-200 microns, 200-400 microns, 300-500 microns, 400-600 microns, 600-800 microns, 200-500 microns, 400-800 microns, 500-1000 microns, 800-1600 microns, or 1000-2000 microns.

In one embodiment, the ion exchange material for impurity removal from the acidic lithium solution is a copolymer of styrene, divinylbenzene, butadiene, or combinations thereof. In one embodiment, the ion exchange material for impurity removal from the acidic lithium solution is a mixture of styrene, divinylbenzene, butadiene, or combinations thereof.

In one embodiment, the ion exchange material for impurity removal from the acidic lithium solution is a copolymer of styrene, divinylbenzene, butadiene, or combinations thereof functionalized with sulfonic-acid groups. In one embodiment, the ion exchange material for impurity removal from the acidic lithium solution is a mixture of styrene, divinylbenzene, butadiene, or combinations thereof functionalized with sulfonic-acid groups.

In one embodiment, the ion exchange material for impurity removal from the acidic lithium solution is a copolymer of styrene, divinylbenzene, butadiene, or combinations thereof functionalized with phosphonic-acid groups. In one embodiment, the ion exchange material for impurity removal from the acidic lithium solution is a mixture of styrene, divinylbenzene, butadiene, or combinations thereof functionalized with phosphonic-acid groups.

In one embodiment, the ion exchange material for impurity removal from the acidic lithium solution is a copolymer functionalized with sulfonic-acid groups. In one embodiment, the ion exchange material for impurity removal from the acidic lithium solution is a polymer functionalized with sulfonic-acid groups.

In one embodiment, the ion exchange material for impurity removal from the acidic lithium solution is a copolymer functionalized with phosphonic-acid groups. In one embodiment, the ion exchange material for impurity removal from the acidic lithium solution is a polymer functionalized with phosphonic-acid groups.

In one embodiment, the ion exchange material for impurity removal from the acidic lithium solution is a styrene-divinylbenzene copolymer functionalized with sulfonic acid groups. In one embodiment, the ion exchange material for impurity removal from the acidic lithium solution is a styrene-butadiene copolymer functionalized with sulfonic acid groups. In one embodiment, the ion exchange material for impurity removal from the acidic lithium solution is a divinylbenzene-butadiene copolymer functionalized with sulfonic acid groups. In one embodiment, the ion exchange material for impurity removal from the acidic lithium solution is a styrene-butadiene-divinylbenzene copolymer functionalized with sulfonic acid groups.

In one embodiment, the ion exchange material for impurity removal from the acidic lithium solution is a styrene-divinylbenzene copolymer functionalized with phosphonic acid groups. In one embodiment, the ion exchange material for impurity removal from the acidic lithium solution is a styrene-butadiene copolymer functionalized with phosphonic acid groups. In one embodiment, the ion exchange material for impurity removal from the acidic lithium solution is a divinylbenzene-butadiene copolymer functionalized with phosphonic acid groups. In one embodiment, the ion exchange material for impurity removal from the acidic lithium solution is a styrene-butadiene-divinylbenzene copolymer functionalized with phosphonic acid groups.

In one embodiment, the ion exchange material for impurity removal from the acidic lithium solution is a vinylbenzene copolymer functionalized with sulfonic acid or phosphonic acid groups. In one embodiment, the ion exchange material for impurity removal from the acidic lithium solution is a vinylbenzene chloride copolymer functionalized with sulfonic acid or phosphonic acid groups. In one embodiment, the ion exchange material for impurity removal from the acidic lithium solution is a vinylidene copolymer functionalized with sulfonic acid or phosphonic acid groups. In one embodiment, the ion exchange material for impurity removal from the acidic lithium solution is an acrylonitrile copolymer functionalized with sulfonic acid or phosphonic acid groups.

In some embodiments, the ion exchange material for impurity removal from the acidic lithium solution is a polymer functionalized with phosphoric or phosphinic acid groups.

Nanofiltration

In some embodiments, for any lithium extraction process or system described herein, impurities are at least removed by passing an impurities-enriched lithiated (IEL) acidic solution through one or more nanofiltration membrane units arranged in series and/or parallel. In some embodiments, the one or more nanofiltration membrane units comprises nanofiltration membrane material.

In one embodiment, impurities are removed from an acidic solution using a nanofiltration membrane material. In one embodiment, the nanofiltration membrane material is comprised of cellulose, cellulose acetate, cellulose diacetate, cellulose triacetate, polyamide, poly(piperazine-amide), mixtures thereof, modifications thereof, or combinations thereof. In one embodiment, the nanofiltration membrane material is comprised of a thin-film composite. In one embodiment, the nanofiltration membrane material is comprised of polyamide with a support comprised of polyacrylonitrile (PAN), polyethersulfone, polysulfone, polyphenylene sulfone, cellulose acetate, polyimide, polypropylene, polyketone, polyethylene terephthalate, mixtures thereof, modifications thereof, or combinations thereof. In one embodiment, the nanofiltration membrane material is comprised of polyethylene terephthalate. In one embodiment, the nanofiltration membrane material is comprised of ceramic material. In one embodiment, the nanofiltration membrane material is comprised of alumina, zirconia, yttria stabilized zirconia, titania, silica, mixtures thereof, modifications thereof, or combinations thereof. In one embodiment, the nanofiltration membrane material is comprised of carbon, carbon nanotubes, graphene oxide, mixtures thereof, modifications thereof, or combinations thereof. In one embodiment, the nanofiltration membrane material is comprised of zeolite mixed matrix membrane with polyamide and/or polysulfone support, alumina filled polyvinyl alcohol mixed matrix membrane materials, mixtures thereof, modifications thereof, or combinations thereof.

In some embodiments, anti-scalants, chelants, and/or other means of anti-scaling are used to avoid scaling in the nanofiltration membrane units. In some embodiments, anti-scalants are flowed through nanofiltration membrane units or ion exchange vessels to avoid formation of scalants.

Precipitation

In one embodiment, impurities are removed from the acidic solution using precipitation. In one embodiment, impurities are removed from the acidic solution using electrochemical precipitation. In one embodiment, impurities are removed from the acidic solution using chemical, carbonate precipitation, hydroxide precipitation, phosphate precipitation, or combinations thereof. In one embodiment, impurities are removed from the acidic solution by adding phosphate to precipitate calcium phosphate, magnesium phosphate, barium phosphate, and/or other phosphate compounds. In one embodiment, impurities are removed from the acidic solution by adding sodium phosphate, potassium phosphate, phosphoric acid, or other phosphate compounds to precipitate calcium phosphate, magnesium phosphate, barium phosphate, and/or other phosphate compounds. In one embodiment, residual phosphate is removed from the acidic solution. In one embodiment, residual phosphate is removed from the acidic solution using ion exchange or precipitation. In one embodiment, residual phosphate is removed from the acidic solution using precipitation with aluminum or iron.

In some embodiments, for any lithium extraction process or system described herein, impurities are at least removed from an impurities-enriched lithiated (IEL) acidic solution using chemically induced precipitation. In some embodiments, multivalent impurities are removed from the IEL acidic solution through carbonate precipitation, hydroxide precipitation, phosphate precipitation, or combinations thereof. In some embodiments, multivalent impurities are removed from the IEL acidic solution by adding phosphate to precipitate calcium phosphate, magnesium phosphate, barium phosphate, and/or other phosphate compounds. In some embodiments, multivalent impurities are removed from the IEL acidic solution by adding sodium phosphate, potassium phosphate, phosphoric acid, and/or other phosphate compounds to precipitate calcium phosphate, magnesium phosphate, barium phosphate, and/or other phosphate compounds. In some embodiments, residual phosphate is removed from the IEL acidic solution. In some embodiments, residual phosphate is removed from the IEL acidic solution using ion exchange or precipitation. In some embodiments, residual phosphate is removed from the IEL acidic solution using precipitation with aluminum or iron.

In some embodiments, multivalent impurities are removed from the IEL acidic solution by adding phosphoric acid to precipitate phosphate compounds. In some embodiments, adding phosphoric acid removes Ca, Mg, Sr, and/or Ba from the IEL acidic solution through precipitation of Ca, Mg, Sr, and/or Ba phosphate compounds.

In some embodiments, multivalent impurities are removed from the IEL acidic solution by adding an oxalate, oxalic acid, citrate, citric acid, or combinations thereof. In some embodiments, the oxalate, oxalic acid, citrate, citric acid, or combinations thereof are added as a precipitant, such that multivalent impurities are precipitated. In some embodiments, the precipitant concentration in the IEL acidic solution is subsequently decreased through precipitation by adding cation precipitants to the IEL acidic solution. In some embodiments, multivalent impurities are removed from the IEL acidic solution by adding oxalate to the IEL acidic solution to precipitate the multivalent impurities. In some embodiments, residual oxalate anions are precipitated and removed from the resulting lithium enriched acidic solution by adding cation precipitants. In some embodiments, cation precipitants comprise zinc, iron, manganese, other transition metals, other cations, or combinations thereof. In some embodiments, multivalent impurities are removed from the IEL acidic solution by adding citrate to the IEL acidic solution to precipitate the multivalent impurities. In some embodiments, residual citrate anions are precipitated and removed from the resulting lithium enriched acidic solution by adding cation precipitants. In some embodiments, cation precipitants comprise zinc, iron, manganese, other transition metals, other cations, or combinations thereof. In some embodiments, multivalent impurities are removed from the IEL acidic solution by adding anion precipitants to the IEL acidic solution to precipitate the multivalent impurities. In some embodiments, residual anions are precipitated and removed from the resulting lithium enriched acidic solution by adding cation precipitants. In some embodiments, cation precipitants comprise zinc, iron, manganese, other transition metals, other cations, or combinations thereof.

Electrodialysis Separation

In some embodiments, for any lithium extraction process or system described herein, impurities are at least removed from an impurities-enriched lithiated (IEL) acidic solution by passing through one or more electrodialysis membranes to separate multivalent impurities.

In some embodiments, electrodialysis is used to remove impurities from an acidic lithium solution. In some embodiments, electrodialysis is a membrane separation technology in which certain charged species are allowed to pass through a membrane with assistance from an applied electric field. In some embodiments, electrodialysis is used to remove impurities from an acidic lithium solution where water is retained in the feed phase while charged ions pass through selective ion exchange membranes. In some embodiments, electrodialysis is used to remove impurities from an acidic lithium solution where selective cation exchange membranes are used to obtain separation of monovalent and multivalent ions by means of different transport kinetics through the membrane. In some embodiments, electrodialysis is used to remove impurities from an acidic lithium solution using a polymer-based membrane with functional groups. In some embodiments, electrodialysis is used to remove impurities from an acidic lithium solution using cation exchange membranes that are functionalized with negatively charged functional groups such as sulfonic, carboxyl, other functional groups, or combinations thereof which allows cations to pass through while preventing anions from passing. In some embodiments, electrodialysis is used to remove impurities from an acidic lithium solution with a rinse solution or additional membranes near the electrodes to wash out ions near the electrodes to prevent the generation of chlorine or hydrogen gas on the electrodes. In some embodiments, electrodialysis is used to remove impurities from an acidic lithium solution where divalent or multivalent cations would move through a membrane slower than monovalent ions.

Temperature Reduction Precipitation

In some embodiments, for any lithium extraction process or system described herein, impurities are at least removed from an impurities-enriched lithiated (IEL) acidic solution by reducing the temperature of the IEL acidic solution to precipitate multivalent impurities. In some embodiments, the temperature of the IEL acidic solution is reduced using a heat exchanger. In some embodiments, the temperature is reduced by passing the IEL acidic solution through a heat exchanger. In some embodiments, the temperature of the lithium-enriched eluate, following reduction of the temperature to precipitate multivalent impurities, is heated or allowed to warm.

Modifying pH of Lithium-Enriched Acidic Solution and/or Impurities-Enriched Lithiated Acidic Solution As disclosed herein, in some embodiments, and for any process of lithium extraction disclosed herein, the pH of the lithium-enriched acidic solution is regulated to control elution of lithium and/or non-lithium impurities. In some embodiments, pH of the lithium-enriched acidic solution is regulated by adding protons, such as an acid and/or an acidic solution, to the lithium-enriched acidic solution. In some embodiments, pH of the lithium-enriched acidic solution is regulated by adding protons, such as an acid and/or an acidic solution, to the impurities-enriched lithiated acidic solution prior to removing impurities.

In some embodiments, the acid comprises sulfuric acid, phosphoric acid, hydrochloric acid, hydrobromic acid, carbonic acid, nitric acid, or combinations thereof. In some embodiments, the acidic solution is the same as the acidic solution originally contacted with the first lithium-enriched ion exchange material. In some embodiments, the acidic solution is the different from the acidic solution originally contacted with the first lithium-enriched ion exchange material.

In some embodiments, more protons are added to the lithium-enriched acidic solution, forming a protonated lithium-enriched acidic solution that is again contacted with a lithium-enriched ion exchange material to elute more lithium into the protonated lithium-enriched acidic solution. In some embodiments, more protons are added to the lithium-enriched acidic solution by adding an acid or acidic solution thereto to form the protonated lithium-enriched acidic solution. In some embodiments, protons are added to a lithium-enriched acidic solution before passing through each vessel in a network of lithium-selective ion exchange vessels, as described herein.

Lithium Extraction in a Vessel and Network of Vessels

In some embodiments the process of lithium extraction disclosed herein comprises lithium-selective ion exchange material disposed within a vessel. In some embodiments, the vessel is a tank, stirred tank reactor, or a column. As disclosed herein, in some embodiments, the lithium-selective ion exchange is configured as a fluidized bed, packed bed, or combinations thereof. In some embodiments, a process of lithium extraction comprises 1) contacting a liquid resource with a lithium-selective ion exchange material loaded in a first vessel to absorb lithium from the liquid resource into the lithium-selective ion exchange material, thereby forming lithium-enriched ion exchange material 2) optionally washing the lithium-enriched ion exchange material to remove residual liquid resource, 3) contacting the lithium-enriched ion exchange material with an acidic solution to elute lithium into the acidic solution, to form a IEL acidic solution; and 4) removing non-lithium impurities from the IEL eluate to reduce or inhibit the formation of precipitates by said non-lithium impurities, and form a lithium-enriched eluate. In some embodiments, the lithium-enriched acidic solution is circulated back to the first vessel to again contact the lithium-enriched ion exchange material after non-lithium impurities have been removed. In some embodiments, as described herein, a second IEL acidic solution is formed, wherein impurities are removed and forming a second lithium enriched acidic solution. In some embodiments, said each formed lithium enriched acidic solution is circulated back to the vessel a plurality of times, forming a corresponding IEL acidic solution with each circulation, which is subject to impurities removal. As such, each lithium-enriched acidic solution accumulates its lithium content with each circulation, while maintaining a low or eliminated non-lithium impurities content.

In some embodiments, as described herein, the lithium-enriched eluate is sent to a second vessel containing a second lithium-enriched ion exchange material after non-lithium impurities have been removed. In some embodiments, a second IEL acidic solution is formed from the second vessel, wherein impurities are again removed, forming a second lithium-enriched acidic solution. In some embodiments, the process of lithium extraction comprises flowing a lithium-enriched acidic solution through a network of vessels containing lithium-enriched ion exchange material for elution of lithium and non-lithium impurities, forming a corresponding IEL acidic solution from each vessel. In some embodiments, the network of vessels comprises a plurality of vessels arranged in series, parallel, or combination thereof. In some embodiments, the plurality of vessels comprises lithium-enriched ion exchange material as a packed bed, fluidized bed, or combinations thereof. In some embodiments, the plurality of vessels are arranged sequentially wherein an acidic solution flows through a first vessel in the sequence, followed by an IEL acidic solution flowing through each subsequent vessel in the sequence. In some embodiments, impurities are removed from each IEL acidic solution formed from a corresponding vessel, thereby forming a lithium-enriched acidic solution. In some embodiments, each formed lithium-enriched acidic solution is sent to the successive vessel(s) in the sequence. In some embodiments, the lithium-enriched acidic solution formed following removal of impurities of a corresponding IEL acidic solution from the last vessel in the sequence is further processed, as disclosed herein, to produce a lithium salt solution. In some embodiments, lithium-enriched eluate formed downstream of the last vessel in the sequence is optionally flowed through the sequence of vessels again, starting with the first vessel. In some embodiments, the sequence of the plurality of vessels is rearranged based on the saturation of the lithium-enriched ion exchange material in each vessel. In some embodiments, impurities are removed from each IEL acidic solution a common impurities removal unit receives the IEL eluate from each vessel(s) in the sequence and sends the lithium-enriched eluate to the successive vessel(s) in the sequence.

Embodiments for Limiting or Eliminating Precipitation of Impurities in the Eluate Solution In one embodiment, lithium and non-lithium impurities are absorbed from a lithium resource into an ion exchange material. In one embodiment, lithium and non-lithium impurities are eluted from an ion exchange material into an acidic solution. In one embodiment, lithium and non-lithium impurities are eluted from an ion exchange material into an acidic solution containing dissolved species that may precipitate at certain concentrations. In one embodiment, lithium and non-lithium impurities are eluted from an ion exchange material into an acidic solution containing dissolved species that may be reduced in concentration to avoid precipitation. In one embodiment, lithium and non-lithium impurities are eluted from an ion exchange material into an acidic solution where said non-lithium impurities may precipitate at certain concentrations.

In one embodiment, lithium and multivalent impurities are absorbed from a lithium resource into an ion exchange material. In one embodiment, lithium and multivalent impurities are eluted from an ion exchange material into an acidic solution. In one embodiment, lithium and multivalent impurities are eluted from an ion exchange material into an acidic solution containing sulfate anions. In one embodiment, lithium and multivalent impurities are eluted from an ion exchange material into an acidic solution containing sulfate anions such that the multivalent impurities and sulfate anions may react to form insoluble salts that can precipitate. In one embodiment, lithium and multivalent impurities are eluted from an ion exchange material into a solution containing sulfate anions such that the multivalent impurities and sulfate anions that may react to form insoluble salts that can precipitate. In one embodiment, lithium and multivalent cations are eluted from an ion exchange material into a solution containing sulfate anions wherein the concentrations of sulfate anions and multivalent cations are limited to avoid precipitation of insoluble sulfate compounds.

In one embodiment, lithium and multivalent cations are eluted from an ion exchange material into a solution containing sulfate anions wherein the concentrations of multivalent cations are limited to avoid precipitation of insoluble sulfate compounds. In one embodiment, lithium and multivalent cations are eluted from an ion exchange material into a solution containing sulfate anions wherein the concentrations of multivalent cations are limited using nanofiltration to avoid precipitation of insoluble sulfate compounds. In one embodiment, lithium and multivalent cations are eluted from a first ion exchange material into a solution containing sulfate anions wherein the concentrations of multivalent cations are decreased using a second ion exchange material to avoid precipitation of insoluble sulfate compounds. In one embodiment, lithium and multivalent cations are eluted from a first ion exchange material into a solution containing sulfate anions wherein the concentrations of multivalent cations are limited using a second ion exchange material that is selective for multivalent cations to avoid precipitation of insoluble sulfate compounds.

In one embodiment, lithium and multivalent cations are eluted from an ion exchange material into a solution containing sulfate anions wherein the concentrations of multivalent cations are decreased to avoid precipitation of insoluble sulfate compounds. In one embodiment, lithium and multivalent cations are eluted from an ion exchange material into a solution containing sulfate anions and the concentration of multivalent cations in the sulfate solution is decreased to avoid precipitation of insoluble sulfate compounds.

In one embodiment, a sulfate solution is contacted with an ion exchange material to elute lithium along with impurities, the sulfate solution is processed to reduce the concentration of impurities, and the sulfate solution is again contacted with an ion exchange material to elute more lithium along with impurities. In one embodiment, a sulfate solution is contacted with an ion exchange material to elute lithium along with impurities, the sulfate solution is processed to reduce the concentration of multivalent cations, and the sulfate solution is again contacted with an ion exchange material to elute more lithium along with impurities. In one embodiment, a sulfate solution is contacted with an ion exchange material to elute lithium along with impurities, the sulfate solution is processed to reduce the concentration of multivalent cations, the sulfate solution is again contacted with an ion exchange material to elute more lithium along with impurities, and the concentration of multivalent cations is maintained at a sufficiently low level to avoid precipitation of insoluble salts.

In one embodiment, a sulfate solution is contacted with an ion exchange material to elute a target metal along with impurities, the sulfate solution is processed to reduce the concentration of impurities, and the sulfate solution is again contacted with an ion exchange material to elute more of the target metal along with impurities. In one embodiment, a sulfate solution is contacted with an ion exchange material to elute a target metal along with impurities, the sulfate solution is processed to reduce the concentration of multivalent cations, and the sulfate solution is again contacted with an ion exchange material to elute more of the target metal along with impurities. In one embodiment, a sulfate solution is contacted with an ion exchange material to elute a target metal along with impurities, the sulfate solution is processed to reduce the concentration of multivalent cations, the sulfate solution is again contacted with an ion exchange material to elute more of the target metal along with impurities, and the concentration of multivalent cations is maintained at a sufficiently low level to avoid precipitation of insoluble salts.

In one embodiment, an acidic sulfate solution is contacted with an ion exchange material to elute lithium along with impurities, the acidic sulfate solution is processed to reduce the concentration of impurities, and the acidic sulfate solution is again contacted with an ion exchange material to elute more lithium along with more impurities. In one embodiment, the pH of the acidic sulfate solution is regulated to control elution of lithium and/or impurities. In one embodiment, pH of the acidic sulfate solution is regulated by measuring pH with a pH probe and adding sulfuric acid and/or a solution containing sulfuric acid to the acidic sulfate solution. In one embodiment, pH of the acidic sulfate solution is regulated adding sulfuric acid and/or a solution containing sulfuric acid to the acidic sulfate solution.

In one embodiment, the sulfate solution used to elute lithium from the ion exchange material is replaced with a different solution. In one embodiment, the sulfate solution used to elute lithium from the ion exchange material is replaced with a solution comprising sulfate, nitrate, phosphate, chloride, bromide, fluoride, borate, iodide, carbonate, or combinations thereof. In one embodiment, a solution comprising anions is contacted with an ion exchange material to elute lithium along with impurities, the solution is processed to reduce the concentration of impurities, and the solution is again contacted with an ion exchange material to elute more lithium along with impurities, where the anions are selected from a list including sulfate, nitrate, phosphate, chloride, bromide, fluoride, borate, iodide, carbonate, or combinations thereof.

In one embodiment, a fluidized bed of ion exchange material is contacted with brine to absorb lithium from the brine into the ion exchange material, the fluidized bed of ion exchange material is optionally washed to remove residual brine from the ion exchange material, the fluidized bed of ion exchange material is contacted with an acidic solution to elute lithium into the acidic solution, and multivalent impurities are removed from the acidic solution to avoid the formation of precipitates. In one embodiment, a fluidized bed of ion exchange material is contacted with brine to absorb lithium from the brine into the ion exchange material, the fluidized bed of ion exchange material is optionally washed to remove residual brine from the ion exchange material, the fluidized bed of ion exchange material is contacted with an acidic sulfate solution to elute lithium into the acidic solution, and multivalent impurities are removed from the acidic solution to avoid the formation of sulfate precipitates.

In one embodiment, a fluidized bed of ion exchange material is contacted with brine to absorb lithium from the brine into the ion exchange material, the fluidized bed of ion exchange material is optionally washed to remove residual brine from the ion exchange material, the fluidized bed of ion exchange material is contacted with an acidic solution to elute lithium into the acidic solution, and multivalent impurities are removed from the acidic solution by circulating the acidic solution from the fluidized bed to a unit for removing multivalent impurities before the acidic solution is returned to the fluidized bed. In one embodiment, a fluidized bed of ion exchange material is contacted with brine to absorb lithium from the brine into the ion exchange material, the fluidized bed of ion exchange material is optionally washed to remove residual brine from the ion exchange material, the fluidized bed of ion exchange material is contacted with an acidic solution to elute lithium into the acidic solution, and multivalent impurities are removed from the acidic solution by circulating the acidic solution from the fluidized bed to a nanofiltration unit for selective removal of multivalent impurities, and then the acidic solution is returned to the fluidized bed. In one embodiment, a fluidized bed of ion exchange material is contacted with brine to absorb lithium from the brine into the ion exchange material, the fluidized bed of ion exchange material is optionally washed to remove residual brine from the ion exchange material, the fluidized bed of ion exchange material is contacted with an acidic solution to elute lithium into the acidic solution, and multivalent impurities are removed from the acidic solution by circulating the acidic solution from the fluidized bed to a second ion exchange unit containing a second ion exchange material that is selective for removing multivalent impurities, and then the acidic solution is returned to the fluidized bed.

In one embodiment, a fluidized bed of ion exchange material is contacted with brine to absorb lithium from the brine into the ion exchange material, the fluidized bed of ion exchange material is optionally washed to remove residual brine from the ion exchange material, the fluidized bed of ion exchange material is contacted with an acidic solution to elute lithium into the acidic solution, and multivalent impurities are removed from the acidic solution by circulating the acidic solution from the fluidized bed to a unit for removing multivalent impurities before the acidic solution is passed to a second fluidized bed of ion exchange material for elution of more lithium into the acidic solution. In one embodiment, a fluidized bed of ion exchange material is contacted with brine to absorb lithium from the brine into the ion exchange material, the fluidized bed of ion exchange material is optionally washed to remove residual brine from the ion exchange material, the fluidized bed of ion exchange material is contacted with an acidic solution to elute lithium into the acidic solution, and multivalent impurities are removed from the acidic solution by circulating the acidic solution from the fluidized bed to a nanofiltration unit for selective removal of multivalent impurities, and then the acidic solution is passed to a second fluidized bed of ion exchange material for elution of more lithium into the acidic solution. In one embodiment, a fluidized bed of ion exchange material is contacted with brine to absorb lithium from the brine into the ion exchange material, the fluidized bed of ion exchange material is optionally washed to remove residual brine from the ion exchange material, the fluidized bed of ion exchange material is contacted with an acidic solution to elute lithium into the acidic solution, and multivalent impurities are removed from the acidic solution by circulating the acidic solution from the fluidized bed to a second ion exchange unit containing a second ion exchange material that is selective for removing multivalent impurities, and then the acidic solution is passed to a second fluidized bed of ion exchange material for elution of more lithium into the acidic solution. In one embodiment, the acidic solution flows through multiple fluidized beds of ion exchange material for elution of lithium and impurities, and impurities are removed from the acidic solution between the multiple fluidized beds. In one embodiment, the acidic solution flows through multiple fluidized beds of ion exchange material for elution of lithium and impurities, and impurities are removed from the acidic solution between the multiple fluidized beds using nanofiltration. In one embodiment, the acidic solution flows through multiple fluidized beds of a first ion exchange material which is lithium-selective for elution of lithium and impurities, and impurities are removed from the acidic solution between the multiple fluidized beds using a second ion exchange material that is selective for multivalent ions.

In one embodiment, a packed bed of ion exchange material is contacted with brine to absorb lithium from the brine into the ion exchange material, the packed bed of ion exchange material is optionally washed to remove residual brine from the ion exchange material, the packed bed of ion exchange material is contacted with an acidic solution to elute lithium into the acidic solution, and multivalent impurities are removed from the acidic solution to avoid the formation of precipitates. In one embodiment, a packed bed of ion exchange material is contacted with brine to absorb lithium from the brine into the ion exchange material, the packed bed of ion exchange material is optionally washed to remove residual brine from the ion exchange material, the packed bed of ion exchange material is contacted with an acidic sulfate solution to elute lithium into the acidic solution, and multivalent impurities are removed from the acidic solution to avoid the formation of sulfate precipitates.

In one embodiment, a packed bed of ion exchange material is contacted with brine to absorb lithium from the brine into the ion exchange material, the packed bed of ion exchange material is optionally washed to remove residual brine from the ion exchange material, the packed bed of ion exchange material is contacted with an acidic solution to elute lithium into the acidic solution, and multivalent impurities are removed from the acidic solution by circulating the acidic solution from the packed bed to a unit for removing multivalent impurities before the acidic solution is returned to the packed bed. In one embodiment, a packed bed of ion exchange material is contacted with brine to absorb lithium from the brine into the ion exchange material, the packed bed of ion exchange material is optionally washed to remove residual brine from the ion exchange material, the packed bed of ion exchange material is contacted with an acidic solution to elute lithium into the acidic solution, and multivalent impurities are removed from the acidic solution by circulating the acidic solution from the packed bed to a nanofiltration unit for selective removal of multivalent impurities, and then the acidic solution is returned to the packed bed. In one embodiment, a packed bed of ion exchange material is contacted with brine to absorb lithium from the brine into the ion exchange material, the packed bed of ion exchange material is optionally washed to remove residual brine from the ion exchange material, the packed bed of ion exchange material is contacted with an acidic solution to elute lithium into the acidic solution, and multivalent impurities are removed from the acidic solution by circulating the acidic solution from the packed bed to a second ion exchange unit containing a second ion exchange material that is selective for removing multivalent impurities, and then the acidic solution is returned to the packed bed.

In one embodiment, a packed bed of ion exchange material is contacted with brine to absorb lithium from the brine into the ion exchange material, the packed bed of ion exchange material is optionally washed to remove residual brine from the ion exchange material, the packed bed of ion exchange material is contacted with an acidic solution to elute lithium into the acidic solution, and multivalent impurities are removed from the acidic solution by circulating the acidic solution from the packed bed to a unit for removing multivalent impurities before the acidic solution is passed to a second packed bed of ion exchange material for elution of more lithium into the acidic solution. In one embodiment, a packed bed of ion exchange material is contacted with brine to absorb lithium from the brine into the ion exchange material, the packed bed of ion exchange material is optionally washed to remove residual brine from the ion exchange material, the packed bed of ion exchange material is contacted with an acidic solution to elute lithium into the acidic solution, and multivalent impurities are removed from the acidic solution by circulating the acidic solution from the packed bed to a nanofiltration unit for selective removal of multivalent impurities, and then the acidic solution is passed to a second packed bed of ion exchange material for elution of more lithium into the acidic solution. In one embodiment, a packed bed of ion exchange material is contacted with brine to absorb lithium from the brine into the ion exchange material, the packed bed of ion exchange material is optionally washed to remove residual brine from the ion exchange material, the packed bed of ion exchange material is contacted with an acidic solution to elute lithium into the acidic solution, and multivalent impurities are removed from the acidic solution by circulating the acidic solution from the packed bed to a second ion exchange unit containing a second ion exchange material that is selective for removing multivalent impurities, and then the acidic solution is passed to a second packed bed of ion exchange material for elution of more lithium into the acidic solution. In one embodiment, the acidic solution flows through multiple packed beds of ion exchange material for elution of lithium and impurities, and impurities are removed from the acidic solution between the multiple packed beds. In one embodiment, the acidic solution flows through multiple packed beds of ion exchange material for elution of lithium and impurities, and impurities are removed from the acidic solution between the multiple packed beds using nanofiltration. In one embodiment, the acidic solution flows through multiple packed beds of a first ion exchange material which is lithium-selective for elution of lithium and impurities, and impurities are removed from the acidic solution between the multiple packed beds using a second ion exchange material that is selective for multivalent ions.

In some embodiments, the packed beds may be partially or occasionally fluidized. In some embodiments, the fluidized beds may be partially or occasionally packed. In some embodiments, the packed or fluidized beds may be washed before and/or after contracting with brine and/or acid using water or washing solutions containing water, salt, chelating compounds, ethylenediaminetetraacetic acid, salt of ethylenediaminetetraacetate, compounds of ethylenediaminetetraacetate, and/or anti-scalants. In some embodiment, the acidic solution used to elute lithium from the lithium-selective ion exchange material may contain water, salt, chelating compounds, ethylenediaminetetraacetic acid, salt of ethylenediaminetetraacetate, compounds of ethylenediaminetetraacetate, and/or anti-scalants. In some embodiments, dilution water is used to limit and/or prevent formation of insoluble precipitates.

In some embodiments, multivalent impurities may be removed from a lithium salt solution using precipitation. In some embodiments, multivalent impurities may be removed from a lithium salt solution using precipitation through addition of base. In some embodiments, multivalent impurities may be removed from a lithium salt solution using precipitation through addition of sodium hydroxide, sodium carbonate, and/or other compounds.

In some embodiments, a lithium selective ion exchange material is contacted with a liquid resource to load lithium onto the lithium selective ion exchange material, the lithium selective ion exchange material is optionally washed to remove residual liquid resource from the selective ion exchange material, and the lithium selective ion exchange material is contacted with an acidic solution to elute lithium into the acidic solution. In some embodiments, a lithium selective ion exchange material is contacted with a liquid resource to load lithium onto the lithium selective ion exchange material, the lithium selective ion exchange material is optionally washed to remove residual liquid resource from the selective ion exchange material, the lithium selective ion exchange material is contacted with an acidic solution to elute lithium into the acidic solution, more protons are added to the acidic solution, and the acidic solution is again contacted with the lithium selective ion exchange material to elute more lithium into the acidic solution. In some embodiments, a lithium selective ion exchange material is contacted with a liquid resource to load lithium onto the lithium selective ion exchange material, the lithium selective ion exchange material is optionally washed to remove residual liquid resource from the selective ion exchange material, the lithium selective ion exchange material is contacted with an acidic solution to elute lithium into the acidic solution, more acid is added to the acidic solution, and the acidic solution is again contacted with the lithium selective ion exchange material to elute more lithium into the acidic solution. In some embodiments, a lithium selective ion exchange material is contacted with a liquid resource to load lithium onto the lithium selective ion exchange material, the lithium selective ion exchange material is optionally washed to remove residual liquid resource from the selective ion exchange material, the lithium selective ion exchange material is contacted with an acidic solution to elute lithium into the acidic solution in a first vessel, more protons are added to the acidic solution, and the acidic solution is again contacted with lithium selective ion exchange material to elute more lithium into the acidic solution in a second vessel. In some embodiments, a lithium selective ion exchange material is contacted with a liquid resource to load lithium onto the lithium selective ion exchange material, the lithium selective ion exchange material is optionally washed to remove residual liquid resource from the selective ion exchange material, the lithium selective ion exchange material is contacted with an acidic solution to elute lithium into the acidic solution in a vessel, more protons are added to the acidic solution, and the acidic solution is again contacted with lithium selective ion exchange material to elute more lithium into the acidic solution in the vessel.

In some embodiments, a lithium selective ion exchange material is contacted with a liquid resource to load lithium onto the lithium selective ion exchange material, the lithium selective ion exchange material is optionally washed to remove residual liquid resource from the selective ion exchange material, lithium selective ion exchange material is contacted with an acidic solution to elute lithium into the acidic solution, impurities are removed from the acidic solution, more protons are added to the acidic solution, and the acidic solution is again contacted with lithium selective ion exchange material to elute more lithium into the acidic solution. In some embodiments, a lithium selective ion exchange material is contacted with a liquid resource to load lithium onto the lithium selective ion exchange material, the lithium selective ion exchange material is optionally washed to remove residual liquid resource from the selective ion exchange material, lithium selective ion exchange material is contacted with an acidic solution to elute lithium into the acidic solution, more protons are added to the acidic solution, impurities are removed from the acidic solution, and the acidic solution is again contacted with lithium selective ion exchange material to elute more lithium into the acidic solution.

In some embodiments, a lithium selective ion exchange material is contacted with a liquid resource to load lithium onto the lithium selective ion exchange material, the lithium selective ion exchange material is optionally washed to remove residual liquid resource from the selective ion exchange material, lithium selective ion exchange material is contacted with an acidic solution to elute lithium into the acidic solution, impurities are removed from the acidic solution using nanofiltration or multivalent-selective ion exchange materials, more protons are added to the acidic solution, and the acidic solution is again contacted with lithium selective ion exchange material to elute more lithium into the acidic solution. In some embodiments, a lithium selective ion exchange material is contacted with a liquid resource to load lithium onto the lithium selective ion exchange material, the lithium selective ion exchange material is optionally washed to remove residual liquid resource from the selective ion exchange material, lithium selective ion exchange material is contacted with an acidic solution to elute lithium into the acidic solution, more protons are added to the acidic solution, impurities are removed from the acidic solution using nanofiltration or multivalent-selective ion exchange materials, and the acidic solution is again contacted with lithium selective ion exchange material to elute more lithium into the acidic solution.

In some embodiments, an acidic solution is contacted with a lithium selective ion exchange material that has previously been loaded with lithium by contacting the lithium selective ion exchange material with a liquid resource, the acidic solution is treated to remove multivalent impurities, and the acidic solutions is again contacted with a lithium selective ion exchange material that has previously been loaded with lithium by contacting the lithium selective ion exchange material with a liquid resource. In some embodiments, an acidic solution is contacted with a lithium selective ion exchange material to elute lithium, the acidic solution is treated to remove multivalent impurities, and the acidic solutions is again contacted with a lithium selective ion exchange material to elute lithium. In some embodiments, an acidic solution is contacted with a lithium selective ion exchange material to elute lithium, the acidic solution is treated to remove multivalent impurities, more protons are added to the acidic solution, and the acidic solutions is again contacted with a lithium selective ion exchange material to elute lithium. In some embodiments, an acidic solution is contacted with a lithium selective ion exchange material to elute lithium, more protons are added to the acidic solution, the acidic solution is treated to remove multivalent impurities, and the acidic solutions is again contacted with a lithium selective ion exchange material to elute lithium. In some embodiments, an acidic solution is contacted with a lithium selective ion exchange material to elute lithium in a vessel, the acidic solution is treated to remove multivalent impurities, and the acidic solutions is contacted with a lithium selective ion exchange material to elute lithium in said vessel. In some embodiments, an acidic solution is contacted with a lithium selective ion exchange material to elute lithium in a first vessel, the acidic solution is treated to remove multivalent impurities, and the acidic solutions is contacted with a lithium selective ion exchange material to elute lithium in a second vessel. In some embodiments, multivalent impurities are removed with a multivalent cation selective ion exchange material. In some embodiments, multivalent impurities are removed using nanofiltration membranes. In some embodiments, the lithium selective ion exchange materials is in a tank, a column, or a stirred tank reactor. In some embodiments, the lithium selective ion exchange material is in a fixed or fluidized bed.

In some embodiments, an acidic solution is flowed through multiple vessels loaded with a lithium selective ion exchange material to elute lithium. In some embodiments, an acidic solution is flowed through multiple vessels loaded with a lithium selective ion exchange material to elute lithium and multivalent cation impurities are removed between the vessels. In some embodiments, an acidic solution is flowed through multiple vessels loaded with a lithium selective ion exchange material to elute lithium. In some embodiments, an acidic solution is flowed through multiple vessels loaded with a lithium selective ion exchange material to elute lithium, multivalent cation impurities are removed between the multiple vessels, and more protons are added to the acid solution between the multiple vessels. In some embodiments, an acidic solution is recirculated through a vessel loaded a lithium selective ion exchange material to elute lithium. In some embodiments, an acidic solution is recirculated through a vessel loaded a lithium selective ion exchange material to elute lithium and multivalent cation impurities are removed between the recirculations. In some embodiments, an acidic solution is recirculated through a vessel loaded a lithium selective ion exchange material to elute lithium, multivalent cation impurities are removed between the recirculations, and more protons are added to the acid solution between the recirculations.

In some embodiment, a lithium selective ion exchange material is contacted with a liquid resource to load lithium onto the lithium selective ion exchange material, the lithium selective ion exchange material is optionally washed to remove residual liquid resource from the selective ion exchange material, the lithium selective ion exchange material is contacted with an acidic solution to elute lithium into the acidic solution, and the acidic solution is prepared in an acidic solution mixing unit. In one embodiment, the acidic solution mixing unit is a tank, an in-line mixing device, a stirred tank reactor, another mixing unit, or combinations thereof. In one embodiment, the acid solution mixing tank is used to service one vessel containing lithium selective ion exchange material. In one embodiment, the acid solution mixing tank is used to service multiple vessels containing lithium selective ion exchange material in parallel or series. In one embodiment, the acid solution mixing tank is used to service multiple vessels containing lithium selective ion exchange material in sequence.

In one embodiment, the acidic solution is comprised of sulfuric acid, phosphoric acid, hydrochloric acid, hydrobromic acid, carbonic acid, nitric acid, or combinations thereof. In one embodiment, lithium is eluted from a lithium selective ion exchange material using sulfuric acid, phosphoric acid, hydrochloric acid, nitric acid, or combinations thereof. In one embodiment, lithium is eluted from a lithium selective ion exchange material using an acid solution comprising sulfate, phosphate, nitrate, borate, or combinations thereof.

In some embodiment, a lithium selective ion exchange material is contacted with a liquid resource to load lithium onto the lithium selective ion exchange material, the lithium selective ion exchange material is optionally washed to remove residual liquid resource from the selective ion exchange material, the lithium selective ion exchange material is contacted with an acidic solution to elute lithium into the acidic solution, impurities are removed using a combination of nanofiltration, multivalent cation selective ion exchange material, other methods of removing multivalent impurities, or combinations thereof. In one embodiment, impurities are removed from an acidic lithium solutions using combinations of nanofiltration, multivalent cation selective ion exchange material, other methods of removing multivalent impurities in parallel, series, or combinations thereof.

In some embodiment, a lithium selective ion exchange material is contacted with a liquid resource to load lithium onto the lithium selective ion exchange material, the lithium selective ion exchange material is optionally washed to remove residual liquid resource from the selective ion exchange material, the lithium selective ion exchange material is contacted with an acidic solution to elute lithium into the acidic solution, impurities are removed from the acidic solution using nanofiltration membrane units arranged in series and/or parallel, more protons are added to the acidic solution, and the acid solutions is contacted with lithium selective ion exchange material to elute more lithium into the acidic solution. In one embodiment, anti-scalants, chelants, or other means of anti-scaling are used to avoid scaling in the nanofiltration membrane units.

In some embodiment, a lithium selective ion exchange material is contacted with a liquid resource to load lithium onto the lithium selective ion exchange material, the lithium selective ion exchange material is optionally washed to remove residual liquid resource from the selective ion exchange material, the lithium selective ion exchange material is contacted with an acidic solution to elute lithium into the acidic solution, impurities are removed from the acidic solution using multivalent cation selective ion exchange materials, more protons are added to the acidic solution, and the acid solutions is contacted with lithium selective ion exchange material to elute more lithium into the acidic solution. In some embodiment, a lithium selective ion exchange material is contacted with a liquid resource to load lithium onto the lithium selective ion exchange material, the lithium selective ion exchange material is optionally washed to remove residual liquid resource from the selective ion exchange material, the lithium selective ion exchange material is contacted with an acidic solution to elute lithium into the acidic solution, impurities are removed from the acidic solution using multivalent cation selective ion exchange material in a packed bed, more protons are added to the acidic solution, and the acid solutions is contacted with lithium selective ion exchange material to elute more lithium into the acidic solution. In some embodiment, a lithium selective ion exchange material is contacted with a liquid resource to load lithium onto the lithium selective ion exchange material, the lithium selective ion exchange material is optionally washed to remove residual liquid resource from the selective ion exchange material, the lithium selective ion exchange material is contacted with an acidic solution to elute lithium into the acidic solution, impurities are removed from the acidic solution using multivalent cation selective ion exchange material arranged in a network of columns, more protons are added to the acidic solution, and the acid solutions is contacted with lithium selective ion exchange material to elute more lithium into the acidic solution. In some embodiment, a lithium selective ion exchange material is contacted with a liquid resource to load lithium onto the lithium selective ion exchange material, the lithium selective ion exchange material is optionally washed to remove residual liquid resource from the selective ion exchange material, the lithium selective ion exchange material is contacted with an acidic solution to elute lithium into the acidic solution, impurities are removed from the acidic solution using multivalent cation selective ion exchange material arranged in a network of columns with a first absorption column position for absorbing impurities and a last absorption column position for absorbing trace amounts of impurities, more protons are added to the acidic solution, and the acid solutions is contacted with lithium selective ion exchange material to elute more lithium into the acidic solution. In some embodiment, a lithium selective ion exchange material is contacted with a liquid resource to load lithium onto the lithium selective ion exchange material, the lithium selective ion exchange material is optionally washed to remove residual liquid resource from the selective ion exchange material, the lithium selective ion exchange material is contacted with an acidic solution to elute lithium into the acidic solution, impurities are removed from the acidic solution using multivalent cation selective ion exchange material arranged in a lead-lag configuration, and the acid solutions is contacted with lithium selective ion exchange material to elute more lithium into the acidic solution. In one embodiment, a multivalent cation selective ion exchange material is arranged in a variation of a lead-lag setup. In one embodiment, a multivalent cation selective ion exchange material is eluted using a second acidic solution. In one embodiment, a multivalent cation selective ion exchange material is eluted using hydrochloric acid. In one embodiment, a multivalent cation selective ion exchange material is regenerated using sodium hydroxide. In one embodiment, a multivalent cation selective ion exchange material is operated in stirred tank reactors, fluidized beds, or packed beds arranged in series and/or parallel. In one embodiment, a lithium selective ion exchange material is operated in stirred tank reactors, fluidized beds, or packed beds arranged in series and/or parallel.

In one embodiment, a lithium selective ion exchange material is contacted with a liquid resource to load lithium onto the lithium selective ion exchange material, the lithium selective ion exchange material is optionally washed to remove residual liquid resource from the selective ion exchange material, the lithium selective ion exchange material is contacted with an acidic solution to elute lithium into the acidic solution, impurities are removed from the acidic solution by adding phosphate to precipitate phosphate compounds, more protons are added to the acidic solution, and the acid solutions is contacted with lithium selective ion exchange material to elute more lithium into the acidic solution. In one embodiment, a lithium selective ion exchange material is contacted with a liquid resource to load lithium onto the lithium selective ion exchange material, the lithium selective ion exchange material is optionally washed to remove residual liquid resource from the selective ion exchange material, the lithium selective ion exchange material is contacted with an acidic solution to elute lithium into the acidic solution, impurities are removed from the acidic solution by adding phosphoric acid to precipitate phosphate compounds, more protons are added to the acidic solution, and the acid solutions is contacted with lithium selective ion exchange material to elute more lithium into the acidic solution. In one embodiment, a lithium selective ion exchange material is contacted with a liquid resource to load lithium onto the lithium selective ion exchange material, the lithium selective ion exchange material is optionally washed to remove residual liquid resource from the selective ion exchange material, the lithium selective ion exchange material is contacted with an acidic solution to elute lithium into the acidic solution, Ca, Mg, Sr, and/or Ba are removed from the acidic solution by adding phosphoric acid to precipitate Ca, Mg, Sr, and/or Ba phosphate compounds, more protons are added to the acidic solution, and the acid solutions is contacted with lithium selective ion exchange material to elute more lithium into the acidic solution.

In one embodiment, a lithium selective ion exchange material is contacted with a liquid resource to load lithium onto the lithium selective ion exchange material, the lithium selective ion exchange material is optionally washed to remove residual liquid resource from the selective ion exchange material, the lithium selective ion exchange material is contacted with an acidic solution to elute lithium into the acidic solution, multivalent impurities are precipitated from the acidic solution by adding oxalate, oxalic acid, citrate, citric acid, or combinations thereof, more protons are added to the acidic solution, and the acid solutions is contacted with lithium selective ion exchange material to elute more lithium into the acidic solution. In one embodiment, a lithium selective ion exchange material is contacted with a liquid resource to load lithium onto the lithium selective ion exchange material, the lithium selective ion exchange material is optionally washed to remove residual liquid resource from the selective ion exchange material, the lithium selective ion exchange material is contacted with an acidic solution to elute lithium into the acidic solution, multivalent impurities are precipitated from the acidic solution by adding a precipitant comprising oxalate, oxalic acid, citrate, citric acid, or combinations thereof, the precipitant concentration is decreased by adding cations to the acidic solution, more protons are added to the acidic solution, and the acid solutions is contacted with lithium selective ion exchange material to elute more lithium into the acidic solution.

In one embodiment, a lithium selective ion exchange material is contacted with a liquid resource to load lithium onto the lithium selective ion exchange material, the lithium selective ion exchange material is optionally washed to remove residual liquid resource from the selective ion exchange material, the lithium selective ion exchange material is contacted with an acidic solution to elute lithium into the acidic solution, multivalent impurities are precipitated and removed from the acidic solution by adding oxalate, oxalate anions are precipitated and removed from the acidic solution by adding zinc, iron, manganese, other transition metals, other cations, or combinations thereof, more protons are added to the acidic solution, and the acid solutions is contacted with lithium selective ion exchange material to elute more lithium into the acidic solution. In one embodiment, a lithium selective ion exchange material is contacted with a liquid resource to load lithium onto the lithium selective ion exchange material, the lithium selective ion exchange material is optionally washed to remove residual liquid resource from the selective ion exchange material, the lithium selective ion exchange material is contacted with an acidic solution to elute lithium into the acidic solution, multivalent impurities are precipitated and removed from the acidic solution by adding citrate, citrate anions are precipitated and removed from the acidic solution by adding cations, more protons are added to the acidic solution, and the acid solutions is contacted with lithium selective ion exchange material to elute more lithium into the acidic solution.

In one embodiment, a lithium selective ion exchange material is contacted with a liquid resource to load lithium onto the lithium selective ion exchange material, the lithium selective ion exchange material is optionally washed to remove residual liquid resource from the selective ion exchange material, the lithium selective ion exchange material is contacted with an acidic solution to elute lithium into the acidic solution, cation impurities are precipitated from the acidic solution by adding anion precipitants, more protons are added to the acidic solution, and the acid solutions is contacted with lithium selective ion exchange material to elute more lithium into the acidic solution. In one embodiment, a lithium selective ion exchange material is contacted with a liquid resource to load lithium onto the lithium selective ion exchange material, the lithium selective ion exchange material is optionally washed to remove residual liquid resource from the selective ion exchange material, the lithium selective ion exchange material is contacted with an acidic solution to elute lithium into the acidic solution, cation impurities are precipitated and removed from the acidic solution by adding anion precipitants, the anions precipitants are precipitated and removed from the acidic solution by adding cation precipitants, more protons are added to the acidic solution, and the acid solutions is contacted with lithium selective ion exchange material to elute more lithium into the acidic solution.

In one embodiment, a lithium selective ion exchange material is contacted with a liquid resource to load lithium onto the lithium selective ion exchange material, the lithium selective ion exchange material is optionally washed to remove residual liquid resource from the selective ion exchange material, the lithium selective ion exchange material is contacted with an acidic solution to elute lithium into the acidic solution, impurities are precipitated by temporarily reducing the temperature of the acidic solution, more protons are added to the acidic solution, and the acid solutions is contacted with lithium selective ion exchange material to elute more lithium into the acidic solution. In one embodiment, a lithium selective ion exchange material is contacted with a liquid resource to load lithium onto the lithium selective ion exchange material, the lithium selective ion exchange material is optionally washed to remove residual liquid resource from the selective ion exchange material, the lithium selective ion exchange material is contacted with an acidic solution to elute lithium into the acidic solution, impurities are precipitated by changing the temperature of the acidic solution, more protons are added to the acidic solution, and the acid solutions is contacted with lithium selective ion exchange material to elute more lithium into the acidic solution. In one embodiment, a lithium selective ion exchange material is contacted with a liquid resource to load lithium onto the lithium selective ion exchange material, the lithium selective ion exchange material is optionally washed to remove residual liquid resource from the selective ion exchange material, the lithium selective ion exchange material is contacted with an acidic solution to elute lithium into the acidic solution, impurities are precipitated by decreasing the temperature of the acidic solution, protons are added to the acidic solution and the acidic solution is heated or allowed to warm, and the acid solutions is contacted with lithium selective ion exchange material to elute more lithium into the acidic solution.

In one embodiment, a chelating agent or anti-scalant is used to form a soluble complex to avoid precipitation in an acidic lithium solution. In one embodiment, a chelating agent or anti-scalant is used to form a soluble complex to avoid or redissolve precipitates. In one embodiment, a chelating agent or anti-scalants is used to limit or reduce precipitation of multivalent cations and the chelating agent or antiscalant is selected from the list of ethylenediaminetetraacetic acid (EDTA), disodium EDTA, calcium disodium EDTA, tetrasodium EDTA, citric acid, maleic acid, silicate compounds, amorphous silicate compounds, crystalline layered silicate compounds, phosphonic acid compounds, aminotris(methylenephosphonic acid) (ATMP), nitrilotrimethylphosphonic acid (NTMP), ethylenediamine tetra (methylene phosphonic acid) (EDTMP), diethylenetriamine penta(methylene phosphonic acid) (DTPMP), polyphosphonate, polyacrylate, polyacrylic acid, nitrilotriacetic acid (NTA), sodium hexametaphosphate (SHMP), or combinations thereof. In one embodiment, a threshold inhibitor is used to block development of nuclei in an acidic lithium solution. In one embodiment, a retarded is used to block the growth of precipitates in an acidic lithium solution. In one embodiment, compounds are used to limit, control, eliminate, or redissolve precipitates including phosphinopolycarboxylic acid, sulfonated polymer, polyacrylic acid, p-tagged sulfonated polymer, diethylenetriamine penta, bis-hexamethylene triamine, compounds thereof, modifications thereof, or combinations thereof.

In one embodiment, the acidic solution comprises lithium sulfate, lithium hydrogen sulfate, sulfuric acid, or combinations thereof. In one embodiment, the acidic solution comprises lithium sulfate, lithium hydrogen sulfate, sulfuric acid, lithium chloride, hydrochloric acid, lithium nitrate, nitric acid, lithium phosphate, lithium hydrogen phosphate, lithium dihydrogen phosphate, phosphoric acid, lithium bromide, bromic acid, or combinations thereof.

In some embodiments, lithium and other metals are recovered from the liquid resource. In some embodiments, the methods described for lithium recovery are applied to recover other metals.

Downstream Processing

In one embodiment, metals recovered from a liquid resource may be further processed downstream to produce high purity liquids and solids. In one embodiment, metals recovered from the liquid resource may be purified with ion exchange, solvent extraction, membranes, filtration, or other purification technologies. In one embodiment, metals may be converted from a dissolved form to a solid form. In one embodiment, metals may be converted using precipitation, electrolysis, electrowinning, chelation, or crystallization.

In one embodiment, lithium may be converted from lithium chloride or lithium sulfate to lithium carbonate or lithium hydroxide. In one embodiment, lithium may be purified by precipitating multivalent metals using sodium carbonate, by removing multivalent metals using ion exchange, by removing boron using ion exchange, by removing impurities using membranes, by removing impurities using solvent extraction, or combinations thereof. In one embodiment, lithium may be converted from lithium chloride or lithium sulfate solution to a lithium carbonate solid by addition of sodium carbonate, sodium carbonate solution, carbon dioxide, sodium hydroxide, or combinations thereof. In one embodiment, lithium may be converted from lithium sulfate to lithium hydroxide by addition of sodium hydroxide, crystallization of sodium sulfate, and then crystallization of lithium hydroxide. In one embodiment, lithium may be converted from lithium carbonate to lithium hydroxide by addition of calcium hydroxide. In one embodiment, lithium chloride, lithium sulfate, or other lithium compounds may be converted to lithium hydroxide using an electrochemical cell. In one embodiment, lithium chloride, lithium sulfate, or other lithium compounds may be converted to lithium hydroxide using an electrochemical cell with two, three, or more compartments.

EXAMPLES

Example 1: Removal of Scalants During Lithium Sulfate Elution from Fluidized Bed with Recirculation With reference to FIG. 1, brine is pumped from a natural reservoir. The brine contains 80,000 mg/L Na, 2,000 mg/L Ca, 2,000 mg/L Mg, 300 mg/L Li, 200 mg/L Ba, and other dissolved metals. A lithium-selective ion exchange material is loaded into a first vessel (101) of a stirred tank reactor which fluidizes the lithium-selective ion exchange material in various fluids. Brine is flowed into the first vessel and the lithium is absorbed from the brine into the lithium-selective ion exchange material as the lithium-selective ion exchange material releases protons into the brine. The protons that are released into the brine are neutralized with a pH modulating system (not shown) that measures pH and adds NaOH solution to the brine to maintain the pH of the brine near 7. After the lithium-selective ion exchange material is loaded with lithium, residual brine is washed from the lithium-selective ion exchange material. An acidic sulfate solution is flowed into the first vessel to elute lithium from the lithium-selective ion exchange material while the lithium-selective ion exchange material absorbs protons. The lithium-selective ion exchange material releases lithium and also releases Ca, Ba, and Mg impurities into the acidic sulfate solution. The acidic sulfate solution (e.g., IEL eluate or IEL acidic solution as described herein) is removed from the first vessel and flowed through a lead-lag-elute network (102) of vessels containing packed beds of a strong acidic cation exchange resin which removes Ca, Ba, and Mg impurities from the acidic sulfate solution. The acidic sulfate solution flows through a second vessel (103) and then through a third vessel (104) in the network both containing a strong acidic cation exchange resin (as described herein). The lead-lag-elute network also includes a fourth vessel (105) containing a strong acidic cation exchange resin that was previously saturated with impurities and is eluted with hydrochloric acid. The vessels in the lead-lag-elute network are reindexed as the strong acidic cation resin is saturated with impurities and requires elution. More protons (e.g., $H_2SO_4$) are added to the acidic sulfate solution. The acidic sulfate solution is returned to the first vessel to elute more lithium. The acidic sulfate solution is continually circulated between the first vessel and the second vessel. Lithium accumulates in the acidic sulfate solution at a lithium concentration of 1,000 mg/L and precipitation of insoluble calcium, barium, and magnesium sulfate compounds is avoided.

Figure 2:
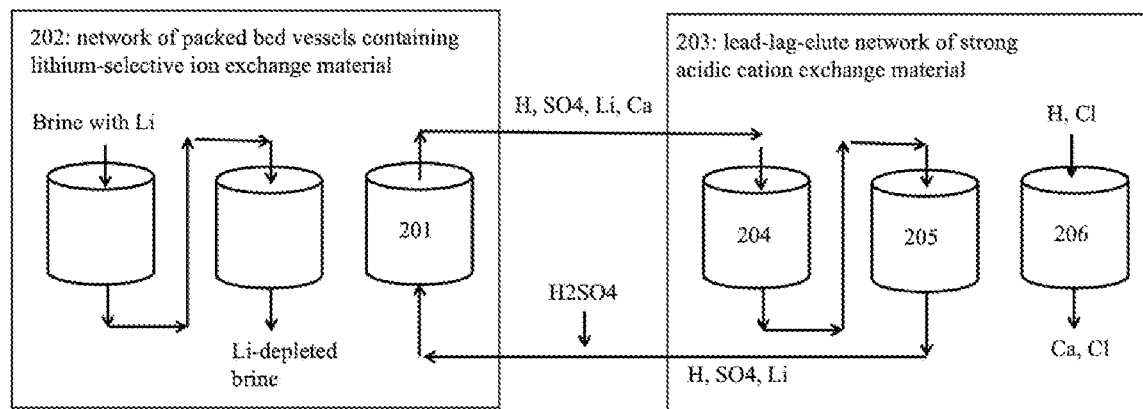
FIG. 2 illustrates a non-limiting example of a system comprising a first network of packed bed columns containing lithium selective ion exchange material and a second network of packed bed columns containing a strong acidic cation exchange material for absorbing multivalent cations where an acidic sulfate solution is contacted with the lithium selective ion exchange material to elute lithium and then contacted with the strong acidic cation exchange material to remove multivalent cations before being returned to the lithium selective ion exchange material to elute more lithium while avoiding formation of precipitates.

Example 2: Removal of Scalants During Lithium Sulfate Elution from Packed Bed with Recirculation With reference to FIG. 2, brine is pumped from a natural reservoir. The brine contains 80,000 mg/L Na, 2,000 mg/L Ca, 2,000 mg/L Mg, 300 mg/L Li, 200 mg/L Ba, and other dissolved metals. A lithium-selective ion exchange material is loaded as a packed bed into a first vessel (201) which is part of a network of vessels (202) loaded with lithium-selective ion exchange material. Brine is flowed into the first vessel and the lithium is absorbed from the brine into the lithium-selective ion exchange material as the lithium-selective ion exchange material releases protons into the brine. The protons that are released into the brine are neutralized with a pH modulating system (not shown) that measures pH and adds NaOH solution to the brine to maintain the pH of the brine near 7. After the lithium-selective ion exchange material is loaded with lithium, residual brine is washed from the lithium-selective ion exchange material. An acidic sulfate solution is flowed into the first vessel to elute lithium from the lithium-selective ion exchange material while the lithium-selective ion exchange material absorbs protons. The lithium-selective ion exchange material releases lithium and also releases Ca, Ba, and Mg impurities into the acidic sulfate solution. The acidic sulfate solution (e.g., IEL eluate or IEL acidic solution as described herein) is removed from the first vessel (201) and flowed through a lead-lag-elute network (203) of vessels containing packed beds of a strong acidic cation exchange resin which removes Ca, Ba, and Mg impurities from the acidic sulfate solution. The acidic sulfate solution flows through a second vessel (204) and then through a third vessel (205) in the network both containing a strong acidic cation exchange resin (as described herein). The lead-lag-elute network also includes a fifth vessel (206) containing a strong acidic cation exchange resin that was previously saturated with impurities and is eluted with hydrochloric acid. The vessels in the lead-lag-elute network are reindexed as the strong acidic cation resin is saturated with impurities and requires elution. More protons (e.g., $H_2SO_4$) are added to the acidic sulfate solution. The acidic sulfate solution is returned to the first vessel to elute more lithium. The acidic sulfate solution is continually circulated between the first vessel and the second vessel. Lithium accumulates in the acidic sulfate solution at a lithium concentration of 1,500 mg/L and precipitation of insoluble calcium, barium, and magnesium sulfate compounds is avoided.

Figure 3:
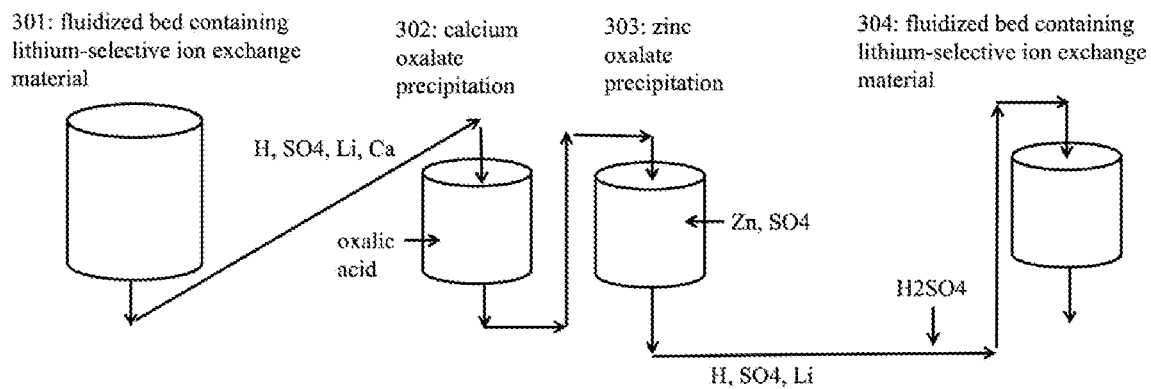
FIG. 3 illustrates a non-limiting example of a system for eluting lithium from a first fluidized bed of lithium-selective ion exchange material into an acidic sulfate solution that is treated with oxalate to precipitate calcium oxalate and then treated with zinc to precipitate zinc oxalate before being contacted with a second fluidized bed of lithium-selective ion exchange material.

Example 3: Removal of Scalants During Lithium Sulfate Elution Between Fluidized Beds With reference to FIG. 3, brine is pumped from a natural reservoir. The brine contains 40,000 mg/L Na, 20,000 mg/L Ca, 2,000 mg/L Mg, 300 mg/L Li, 500 mg/L Ba, and other dissolved metals. A lithium-selective ion exchange material is loaded into a fluidized bed in a first vessel (301) which is part of a network of vessels loaded with fluidized beds lithium-selective ion exchange material. Brine is flowed into the first vessel and the lithium is absorbed from the brine into the lithium-selective ion exchange material as the lithium-selective ion exchange material releases protons into the brine. The protons that are released into the brine are neutralized with a pH modulating system (not shown) that measures pH and adds NaOH solution to the brine to maintain the pH of the brine near 7. After the lithium-selective ion exchange material is loaded with lithium, residual brine is washed from the lithium-selective ion exchange material. An acidic sulfate solution is flowed into the first vessel to elute lithium from the lithium-selective ion exchange material while the lithium-selective ion exchange material absorbs protons. The lithium-selective ion exchange material releases lithium and also releases Ca, Ba, and Mg impurities into the acidic sulfate solution. The acidic sulfate solution (e.g., IEL eluate or IEL acidic solution as described herein) is removed from the first vessel (301) and flowed into a second vessel (302) where oxalic acid is added to the acidic sulfate solution to precipitate Ca, Ba, and Mg oxalate compounds which are removed from the acidic sulfate solution. The acidic sulfate solution is flowed into a third vessel (303) where a solution of Zn sulfate is added to the acidic sulfate solution to precipitate residual oxalate as zinc oxalate which is removed from the acidic sulfate solution. More protons (e.g., $H_2SO_4$) are added to the acidic sulfate solution using an inline mixer. The acidic sulfate solution is flowed into a fourth vessel (304) which is part of the network of vessels containing fluidized beds of lithium-selective ion exchange material to elute more lithium. Lithium accumulates in the acidic sulfate solution at a lithium concentration of 1,000 mg/L and precipitation of insoluble calcium, barium, and magnesium sulfate compounds is avoided.

Figure 4:
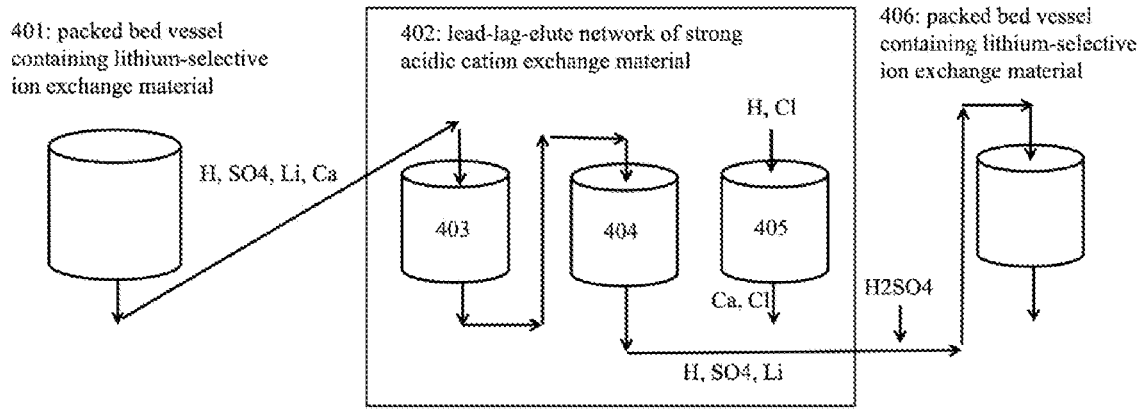
FIG. 4 illustrates a non-limiting example of a system for eluting lithium from a first packed bed of lithium-selective ion exchange material into an acidic sulfate solution that is contacted with a strong acidic cation exchange material to remove multivalent cations before being contacted with a second packed bed of lithium-selective ion exchange material.

Example 4: Removal of Scalants During Lithium Sulfate Elution Between Packed Beds With reference to FIG. 4, brine is pumped from a natural reservoir. The brine contains 60,000 mg/L Na, 10,000 mg/L Ca, 10,000 mg/L Mg, 300 mg/L Li, 200 mg/L Ba, and other dissolved metals. A lithium-selective ion exchange material is loaded into a packed bed in a first vessel (401) which is part of a network of vessels loaded with packed beds of lithium-selective ion exchange material. Brine is flowed into the first vessel and the lithium is absorbed from the brine into the lithium-selective ion exchange material as the lithium-selective ion exchange material releases protons into the brine. The protons that are released into the brine are neutralized with a pH modulating system (not shown) that measures pH and adds NaOH solution to the brine to maintain the pH of the brine near 7. After the lithium-selective ion exchange material is loaded with lithium, residual brine is washed from the lithium-selective ion exchange material. An acidic sulfate solution is flowed into the first vessel to elute lithium from the lithium-selective ion exchange material while the lithium-selective ion exchange material absorbs protons. The lithium-selective ion exchange material releases lithium and also releases Ca, Ba, and Mg impurities into the acidic sulfate solution. The acidic sulfate solution (e.g., IEL eluate or IEL acidic solution as described herein) is removed from the first vessel and flowed through a lead-lag-elute network (402) of vessels containing packed beds of a strong acidic cation exchange resin which removes Ca, Ba, and Mg impurities from the acidic sulfate solution. The acidic sulfate solution flows through a second vessel (403) and then through a third vessel (404) in the network both containing a strong acidic cation exchange resin (as described herein). The lead-lag-elute network also includes a fourth vessel (405) containing a strong acidic cation exchange resin that was previously saturated with impurities and is eluted with hydrochloric acid. The vessels in the lead-lag-elute network are reindexed as the strong acidic cation resin is saturated with impurities and requires elution. More protons (e.g., $H_2SO_4$) are added to the acidic sulfate solution. The acidic sulfate solution is flowed into a fifth vessel (406) which is part of the network of vessels containing packed beds of lithium-selective ion exchange material to elute more lithium. Lithium accumulates in the acidic sulfate solution at a lithium concentration of 1,000 mg/L and precipitation of insoluble calcium, barium, and magnesium sulfate compounds is avoided.

Example 5: Removal of Scalants During Lithium Sulfate Elution from Packed Bed with Recirculation Through Sulfonic-Acid-Functionalized Ion Exchange Resin A 1,000 liter sample of brine was taken from a natural reservoir. The brine contained 100,000 mg/L Na, 2,000 mg/L Ca, 2,000 mg/L Mg, 300 mg/L Li, and other dissolved metals. A lithium-selective ion exchange material comprising lithium manganate particles coated with titanium dioxide was loaded as a packed bed into a brine-processing vessel. Brine was flowed through the brine-processing vessel and the lithium was absorbed from the brine into the lithium-selective ion exchange material as the lithium-selective ion exchange material released protons into the brine. Impurities including Ca also loaded onto the lithium-selective ion exchange material. After the lithium-selective ion exchange material was loaded with lithium, residual brine was washed from the lithium-selective ion exchange material. An acidic sulfate solution was then flowed into the brine-processing vessel to elute lithium from the lithium-selective ion exchange material while the lithium-selective ion exchange material absorbed protons. The lithium-selective ion exchange material released lithium and also released Ca into the acidic sulfate solution. The acidic sulfate solution was removed from the brine-processing vessel and flowed through a calcium-removal vessel containing a packed bed of a sulfonic-acid-functionalized styrene-divinylbenzene resin which removed the calcium from the acidic sulfate solution. Aqueous sulfuric acid at 25 wt % was then added to the acidic sulfate solution, which was returned to the brine-processing vessel where more lithium was released into the acidic sulfate solution. Lithium accumulated in the acidic sulfate solution at a lithium concentration of 1,400 mg/L, while the concentration of calcium in the acidic sulfate solution was maintained below 10 mg/L, and precipitation of calcium sulfate compound was avoided.

Example 6: Removal of Scalants During Lithium Sulfate Elution from Packed Bed with Recirculation Through Phosphonic-Acid-Functionalized Ion Exchange Resin A 100 liter sample of brine was taken from a natural reservoir. The brine contained 90,000 mg/L Na, 10,000 mg/L Ca, 1,000 mg/L Mg, 500 mg/L Li, and other dissolved metals. A lithium-selective ion exchange material comprising $Li_2TiO_3$ particles coated with PVDF polymer was loaded as a packed bed into a brine-processing vessel. Brine was flowed through the brine-processing vessel and the lithium was absorbed from the brine into the lithium-selective ion exchange material as the lithium-selective ion exchange material released protons into the brine. Impurities including Ca also loaded onto the lithium-selective ion exchange material. After the lithium-selective ion exchange material was loaded with lithium, residual brine was washed from the lithium-selective ion exchange material. An acidic sulfate solution was then flowed into the brine-processing vessel to elute lithium from the lithium-selective ion exchange material while the lithium-selective ion exchange material absorbed protons. The lithium-selective ion exchange material released lithium and also released Ca into the acidic sulfate solution. The acidic sulfate solution was removed from the brine-processing vessel and flowed through a calcium-removal vessel containing a packed bed of a styrene-divinylbenzene copolymer functionalized with phosphonic acid groups which removed the calcium from the acidic sulfate solution. Aqueous sulfuric acid at 30 wt % was then added to the acidic sulfate solution, which was returned to the brine-processing vessel where more lithium was released into the acidic sulfate solution. Lithium accumulated in the acidic sulfate solution at a lithium concentration of 1,600 mg/L, while the concentration of calcium in the acidic sulfate solution was maintained below 10 mg/L, and precipitation of calcium sulfate compound was avoided.

Example 7: Removal of Scalants During Lithium Sulfate Elution from Packed Bed with Recirculation Through Sulfonic-Acid-Functionalized Ion Exchange Resin A 1,000 liter sample of brine was taken from a natural reservoir. The brine contained 100,000 mg/L Na, 2,000 mg/L Ca, 2,000 mg/L Mg, 300 mg/L Li, and other dissolved metals. A lithium-selective ion exchange material comprising lithium manganate particles was loaded as a packed bed into a brine-processing vessel. Brine was flowed through the brine-processing vessel and the lithium was absorbed from the brine into the lithium-selective ion exchange material as the lithium-selective ion exchange material released protons into the brine. Impurities including Ca also loaded onto the lithium-selective ion exchange material. After the lithium-selective ion exchange material was loaded with lithium, residual brine was washed from the lithium-selective ion exchange material. An acidic sulfate solution was then flowed into the brine-processing vessel to elute lithium from the lithium-selective ion exchange material while the lithium-selective ion exchange material absorbed protons. The lithium-selective ion exchange material released lithium and also released Ca into the acidic sulfate solution. The acidic sulfate solution was removed from the brine-processing vessel and flowed through a calcium-removal vessel containing a packed bed of a sulfonic-acid-functionalized styrene-divinylbenzene resin which removed the calcium from the acidic sulfate solution. Aqueous sulfuric acid at 20 wt % was then added to the acidic sulfate solution, which was returned to the brine-processing vessel where more lithium was released into the acidic sulfate solution. Lithium accumulated in the acidic sulfate solution at a lithium concentration of 1,300 mg/L, while the concentration of calcium in the acidic sulfate solution was maintained below 10 mg/L, and precipitation of calcium sulfate compound was avoided.

Numbered Embodiments

The following embodiments recite nonlimiting permutations of combinations of features disclosed herein. Other permutations of combinations of features are also contemplated. In particular, each of these numbered embodiments is contemplated as depending from or relating to every previous or subsequent numbered embodiment, independent of their order as listed.

Embodiment 1: A process for extracting lithium from a liquid resource comprising: a) contacting a lithium-selective ion exchange material with a liquid resource comprising lithium to allow said lithium-selective ion exchange material to absorb lithium from said liquid resource, thereby forming a lithium-enriched ion exchange material; b) optionally contacting said lithium-enriched ion exchange material with a wash solution to remove said liquid resource from said lithium-enriched ion exchange material; c) contacting said lithium-enriched ion exchange material with first acidic solution such that lithium and impurities are eluted from said lithium-enriched ion exchange material to form a first impurities-enriched lithiated (IEL) acidic solution and a partially-eluted ion exchange material; and d) removing at least some of the impurities from said first impurities-enriched lithiated acidic solution to form a lithium-enriched acidic solution.

Embodiment 2: The process of Embodiment 1, wherein the lithium-enriched acidic solution is contacted with the partially-eluted ion exchange material such that lithium and impurities are further eluted from the partially-eluted ion exchange material to form a second impurities-enriched lithiated acidic solution having an accumulated lithium concentration.

Embodiment 3: The process of Embodiment 2, wherein removing at least some of the impurities at step (d) of Embodiment 1 and contacting the lithium-enriched eluate with the partially-eluted ion exchange material at Embodiment 2 are repeated in an iterative manner, thereby accumulating the lithium concentration with each iteration of forming a lithium-enriched eluate.

Embodiment 4: A process for extracting lithium from a liquid resource into an acidic solution, comprising: a) contacting a first lithium-selective ion exchange material with a liquid resource comprising lithium to allow said first lithium-selective ion exchange material to absorb lithium from said liquid resource, thereby forming a first lithium-enriched ion exchange material; b) optionally contacting said first lithium-enriched ion exchange material with a wash solution to remove said liquid resource from said first lithium-enriched ion exchange material; c) contacting said first lithium-enriched ion exchange material with a first acidic solution such that lithium and impurities are eluted from said first lithium-enriched ion exchange material, to form a first impurities-enriched lithiated (IEL) acidic solution and a first partially-eluted ion exchange material; d) removing at least some of the impurities from said first impurities-enriched lithiated acidic solution to form a lithium-enriched acidic solution; and e) contacting said lithium-enriched acidic solution with a second lithium-enriched ion exchange material such that lithium and impurities are eluted from said second lithium-enriched ion exchange material to form 1) a second impurities-enriched lithiated acid solution having an accumulated lithium concentration, and 2) a second partially-eluted ion exchange material.

Embodiment 5: The process of Embodiment 4, wherein removing at least some of the impurities at step (d) and contacting the lithium-enriched eluate with the second partially-eluted lithium ion exchange material at step (e) are repeated in an iterative manner, thereby accumulating the lithium concentration with each iteration of forming a lithium-enriched eluate.

Embodiment 6: The process of any one of Embodiments 1-5, wherein the impurities comprise non-lithium impurities.

Embodiment 7: The process of any one of Embodiments 1-6, wherein the impurities comprise multivalent impurities.

Embodiment 8: The process of any one of Embodiments 1-7, wherein the impurities comprise multivalent cations.

Embodiment 9: The process of any one of Embodiments 1-8, wherein the impurities comprise barium, magnesium, strontium, other metals, or a combination thereof.

Embodiment 10: The process of any one of Embodiments 1-9, wherein the first acidic solution comprises sulfuric acid, phosphoric acid, hydrochloric acid, hydrobromic acid, carbonic acid, nitric acid, or a combination thereof.

Embodiment 11: The process of any one of Embodiments 1-9, wherein the first acidic solution comprises sulfate anions, nitrate anions, phosphate anions, chloride anions, bromide anions, fluoride anions, borate anions, iodide anions, carbonate anions, or a combination thereof.

Embodiment 12: The process of any of Embodiments 1-9, wherein the first acidic solution comprises an acidic sulfate solution.

Embodiment 13: The process of any one of Embodiments 1-12, wherein the first acidic solution further comprises water, salt, chelating compounds, ethylenediaminetetraacetic acid, salt of ethylenediaminetetraacetate, compounds of ethylenediaminetetraacetate, anti-scalants, or a combination thereof.

Embodiment 14: The process of any one of Embodiments 1-13, further comprising pH modulation of the lithium-enriched eluate so as to further enhance elution of lithium and impurities from a partially-eluted ion exchange material.

Embodiment 15: The process of Embodiment 14, wherein pH modulation of the lithium enriched-eluate comprises adding protons to the lithium-enriched eluate after removing the impurities.

Embodiment 16: The process of Embodiment 15, wherein the protons are added by mixing an acid, the first acidic solution, a second acidic solution, or a combination thereof, to the lithium-enriched eluate.

Embodiment 17: The process of Embodiment 16, wherein the acid comprises sulfuric acid, phosphoric acid, hydrochloric acid, hydrobromic acid, carbonic acid, nitric acid, or a combination thereof.

Embodiment 18: The process of Embodiment 16, wherein the second acidic solution comprises sulfuric acid, phosphoric acid, hydrochloric acid, hydrobromic acid, carbonic acid, nitric acid, or a combination thereof.

Embodiment 19: The process of any of Embodiments 16, wherein the second acidic solution comprises sulfate anions, nitrate anions, phosphate anions, chloride anions, bromide anions, fluoride anions, borate anions, iodide anions, carbonate anions, or a combination thereof.

Embodiment 20: The process of any one of Embodiments 1-19, wherein the impurities comprise calcium, barium, strontium, or a combination thereof.

Embodiment 21: The process of any one of Embodiments 1-20, wherein removing the impurities comprises using a multivalent impurities-selective (MVIS) ion exchange material.

Embodiment 22: The process of Embodiment 21, wherein the MVIS ion exchange material is provided in one or more vessels.

Embodiment 23: The process of Embodiment 22, wherein the MVIS ion exchange material is provided in network of a plurality of vessels.

Embodiment 24: The process of any one of Embodiments 21-22, wherein the MVIS ion exchange material is provided as a packed bed in the one or more vessels.

Embodiment 25: The process of any one of Embodiments 23-24, wherein the IEL acidic solution flows through the network of plurality of vessels and contacts each MVIS ion exchange material within a corresponding vessel, wherein multivalent impurities are absorbed by the MVIS ion exchange material from the IEL acidic solution.

Embodiment 26: The process of Embodiment 25, wherein the IEL flows through the network of the plurality of vessels according to a sequence.

Embodiment 27: The process of any one of Embodiments 22-26, wherein the plurality of vessels are arranged in series.

Embodiment 28: The process of any one of Embodiments 22-26, wherein the plurality of vessels are arranged in parallel.

Embodiment 29: The process of any one of Embodiments 22-28, wherein the plurality of vessels are arranged according in a lead-lag manner.

Embodiment 30: The process of any one of Embodiments 22-29, wherein impurities are eluted from the MVIS ion exchange material using the first acidic solution, the second acidic solution, a third acidic solution, or a combination thereof.

Embodiment 31: The process of any one of Embodiments 22-30, wherein the plurality of vessels comprises stirred tank reactors, tanks, columns, or a combination thereof.

Embodiment 32: The process of any one of Embodiments 21-31, wherein the MVIS ion exchange material comprises polystyrene, polystyrene functionalized with sulfonate, polystyrene-polybutadiene copolymer functionalized with sulfonate group and/or phosphonate group, poly(2-acrylamido-2-methyl-1-propanesulfonic acid) (PolyAMPS), poly(styrene-co-divinylbenzene) copolymer functionalized with sulfonate group, phosphonate group, iminodiacetic group, carboxylic acid group, mixtures thereof, modifications thereof, or a combination thereof.

Embodiment 33: The process of any one of Embodiments 21-32, wherein the MVIS ion exchange material comprises polystyrene, polybutadiene, mixtures thereof, modifications thereof, or a combination thereof.

Embodiment 34: The process of any one of Embodiments 21-33, wherein the MVIS ion exchange material comprises zeolite, clinoptilolite, bentonite, glauconite, mixtures thereof, modifications thereof, or a combination thereof.

Embodiment 35: The process of any one of Embodiments 21-34, wherein the MVIS ion exchange material comprises styrene divinylbenzene copolymer.

Embodiment 36: The process of any one of Embodiments 21-34, wherein the MVIS ion exchange material comprises styrene divinylbenzene copolymer.

Embodiment 37: The process of any one of Embodiments 21-36, wherein the MVIS ion exchange material comprises a styrene copolymer with sulfonic acid functional groups.

Embodiment 38: The process of any one of Embodiments 21-37, wherein the MVIS ion exchange material comprises styrene divinylbenzene copolymer with sulfonic acid functional groups.

Embodiment 39: The process of any one of Embodiments 21-37, wherein the MVIS ion exchange material comprises styrene butadiene copolymer with sulfonic acid functional groups.

Embodiment 40: The process of any one of Embodiments 21-39, wherein the MVIS ion exchange material comprises a multivalent-cation-selective ion exchange resin.

Embodiment 41: The process of Embodiment 40, wherein said multivalent-cation-selective ion exchange resin comprises a strong acidic cation exchange material.

Embodiment 42: The process of Embodiment 40, wherein said multivalent-cation-selective ion exchange resin comprises a gel-type strong acidic cation exchange resin.

Embodiment 43: The process of any one of Embodiments 21-42, wherein the multivalent cation-selective ion exchange resin is selective for cations with a charge of 2+, 3+, 4+, 5+, 6+, or a combination thereof.

Embodiment 44: The process of any one of Embodiments 21-43, wherein the MVIS ion exchange material comprise beads.

Embodiment 45: The process of any one of Embodiments 21-44, wherein the MVIS ion exchange material beads have a mean diameter of about 10-100 microns, 10-1000 microns, 100-1000 microns, 100-2000 microns, or a combination thereof.

Embodiment 46: The process of any one of Embodiments 1-20, wherein the removing the impurities comprises using one or more nanofiltration membrane units.

Embodiment 47: The process of Embodiment 46, wherein the one or more nanofiltration membranes units comprise nanofiltration membrane material.

Embodiment 48: The process of Embodiment 47, wherein the nanofiltration membrane material comprises cellulose, cellulose acetate, cellulose diacetate, cellulose triacetate, polyamide, poly(piperazine-amide), mixtures thereof, modifications thereof, or a combination thereof.

Embodiment 49: The process of Embodiment 47, wherein the nanofiltration membrane material comprises polyamide with a support comprised of polyacrylonitrile (PAN), polyethersulfone, polysulfone, polyphenylene sulfone, cellulose acetate, polyimide, polypropylene, polyketone, polyethylene terephthalate, mixtures thereof, modifications thereof, or a combination thereof.

Embodiment 50: The process of Embodiment 47, wherein the nanofiltration membrane material comprises polyethylene terephthalate.

Embodiment 51: The process of Embodiment 47, wherein the nanofiltration membrane material comprises ceramic material.

Embodiment 52: The process of Embodiment 47, wherein the nanofiltration membrane material comprises alumina, zirconia, yttria stabilized zirconia, titania, silica, mixtures thereof, modifications thereof, or a combination thereof.

Embodiment 53: The process of Embodiment 47, wherein the nanofiltration membrane material comprises carbon, carbon nanotubes, graphene oxide, mixtures thereof, modifications thereof, or a combination thereof.

Embodiment 54: The process of Embodiment 47, wherein the nanofiltration membrane material comprises zeolite mixed matrix membrane with polyamide and/or polysulfone support, alumina filled polyvinyl alcohol mixed matrix membrane materials, mixtures thereof, modifications thereof, or a combination thereof.

Embodiment 55: The process of any one of Embodiments 46-54, wherein the one or more nanofiltration membrane units comprise anti-scalants, chelants, and/or other means of anti-scaling.

Embodiment 56: The process of any one of Embodiments 1-20, wherein removing the impurities from the IEL acidic solution comprises carbonate precipitation, hydroxide precipitation, phosphate precipitation, or a combination thereof.

Embodiment 57: The process of Embodiment 56, wherein removing the impurities from the IEL acidic solution comprises adding a phosphate to the IEL acidic solution to precipitate phosphate compounds.

Embodiment 58: The process of Embodiment 57, wherein removing the impurities from the IEL acidic solution comprises adding sodium phosphate, potassium phosphate, phosphoric acid, and/or other phosphate compounds, such that calcium phosphate, magnesium phosphate, strontium phosphate barium phosphate, and/or other phosphate compounds are precipitated.

Embodiment 59: The process of any one of Embodiments 1-20, wherein removing the impurities comprises adding an anion precipitant to the IEL acidic solution, thereby precipitating the impurities using an anion precipitant.

Embodiment 60: The process of Embodiment 59, further comprising adding oxalate, oxalic acid, citrate, citric acid, or a combination thereof, to the IEL acidic solution.

Embodiment 61: The process of any one of Embodiments 59-60, wherein said anion precipitant comprises oxalate, oxalic acid, citrate, citric acid, or a combination thereof.

Embodiment 62: The process of any one of Embodiments 59-61, further comprising removing the anion precipitant from the lithium-enriched acidic solution after step (d) through precipitation with a cation precipitant.

Embodiment 63: The process of Embodiment 62, wherein the cation precipitant comprises zinc, iron, manganese, other transition metals, other cations, or a combination thereof.

Embodiment 64: The process of any one of Embodiments 1-20, wherein removing the impurities from the IEL acidic solution comprises reducing the temperature of the IEL acidic solution to precipitate said impurities.

Embodiment 65: The process of any one of Embodiments 1-20, wherein an antiscalant or chelating agent is used to limit formation of precipitates.

Embodiment 66: The process of any one of Embodiments 1-65, wherein the lithium-selective ion exchange material is loaded into a network of a plurality of lithium-enriched vessels.

Embodiment 67: The process of Embodiment 66, wherein the IEL acidic solution flows through the plurality of lithium-enriched vessels.

Embodiment 68: The process of Embodiment 67, wherein impurities are removed from the IEL acidic solution as it flows between the plurality of lithium-enriched ion vessels.

Embodiment 69: The process of any one of Embodiments 1-68, wherein step a) of Embodiment 1 or 4 further comprises pH modulation, wherein said pH modulation maintains an equilibrium in favor of said lithium-selective ion exchange material absorbing lithium ions from said liquid resource.

Embodiment 70: The process of Embodiment 69, wherein the pH of said liquid resource is increased before, during, or after contact with a lithium-selective ion exchange material.

Embodiment 71: The process of Embodiment 70, wherein the pH of said liquid resource is increased by addition of sodium hydroxide before, during, or after contact with a lithium-selective ion exchange material.

Embodiment 72: The process of any one of Embodiments 1-71, wherein the accumulated lithium is converted into lithium hydroxide using membrane electrolysis.

Embodiment 73: The process of any one of Embodiments 1-71, wherein the accumulated lithium is converted into lithium hydroxide by addition of sodium hydroxide.

Embodiment 74: The process of any one of Embodiments 1-73, wherein the accumulated lithium is converted into lithium carbonate by addition of sodium carbonate.

Embodiment 75: The process of any one of Embodiments 1-74, wherein said lithium-selective ion exchange material is contacted with said liquid resource in a fluidized bed.

Embodiment 76: The process of any one of Embodiments 1-75, wherein said lithium-selective ion exchange material is contacted with said liquid resource in a packed bed.

Embodiment 77: The process of any one of Embodiments 1-76, wherein said lithium-selective ion exchange material comprises an oxide, a phosphate, an oxyfluoride, a fluorophosphate, or a combination thereof.

Embodiment 78: The process of any of Embodiments 1-77, wherein said lithium selective-ion exchange material comprises $LiFePO_4$, $LiMnPO_4$, $Li_2MO_3$ (M=Ti, Mn, Sn), $Li_4Ti_5O_{12}$, $Li_4Mn_5O_{12}$, $LiMn_2O_4$, $Li_{1.6}Mn_{1.6}O_4$, $LiMO_2$ (M=Al, Cu, Ti), $Li_4TiO_4$, $Li_7Ti_{11}O_{24}$, $Li_3VO_4$, $Li_2Si_3O_7$, $Li_2CuP_2O_7$, modifications thereof, solid solutions thereof, or a combination thereof.

Embodiment 79: The process of any of Embodiments 1-77, wherein said lithium selective-ion exchange material comprises $LiFePO_4$, $LiMnPO_4$, $Li_2MO_3$ (M=Ti, Mn, Sn), $Li_4Ti_5O_{12}$, $Li_4Mn_5O_{12}$, $LiMn_2O_4$, $Li_{1.6}Mn_{1.6}O_4$, $LiMO_2$ (M=Al, Cu, Ti), $Li_4TiO_4$, $Li_7Ti11O_{24}$, $Li_3VO_4$, $Li_2Si_3O_7$, $Li_2CuP_2O_7$, $Al(OH)_3$, $LiCl.xAl(OH)_3.yH_2O$, $SnO_2.xSb_2O_5.yH_2O$, $TiO_2.xSb_2O_5.yH_2O$, solid solutions thereof, related compositions doped with other elements, related compositions that are off stoichiometry, or a combination thereof; wherein x is from 0.1-10 and y is from 0.1-10.

Embodiment 80: The process of any of Embodiments 1-79, wherein said lithium selective-ion exchange material comprises a coated lithium selective-ion exchange material with a coating that comprises an oxide, a polymer, or a combination thereof.

Embodiment 81: The process of any of Embodiments 1-79, wherein said lithium selective-ion exchange material comprises a coated lithium selective-ion exchange material with a coating comprising $SiO_2$, $TiO_2$, $ZrO_2$, polyvinylidene difluoride, polyvinyl chloride, polystyrene, polybutadiene, polydivinylbenzene, or a combination thereof.

Embodiment 82: The process of any one of Embodiments 1-79, wherein said lithium-selective ion exchange material comprises ion exchange particles that are coated, uncoated, or a combination thereof.

Embodiment 83: The process of Embodiment 82, wherein 1) the coated ion exchange particles comprise any lithium-selective ion exchange material of Embodiments 77-79 and a coating material, and/or 2) the uncoated particles comprise any lithium-selective ion exchange material of Embodiments 77-79.

Embodiment 84: The process of Embodiment 83, wherein the coating material comprises a carbide, a nitride, an oxide, a phosphate, a fluoride, a polymer, carbon, a carbonaceous material, or a combination thereof.

Embodiment 85: The process of Embodiment 83, wherein the coating material comprises $Nb_2O_5$, $Ta_2O_5$, $MoO_2$, $TiO_2$, $ZrO_2$, $MoO_2$, $SnO_2$, $SiO_2$, $Li_2O$, $Li_2TiO_3$, $Li_2ZrO_3$, $Li_2MoO_3$, $LiNbO_3$, $LiTaO_3$, $Li_2SiO_3$, $Li_2Si_2O_5$, $Li_2MnO_3$, $ZrSiO_4$, $AlPO_4$, $LaPO_4$, $ZrP_2O_7$, $MoP_2O_7$, $Mo_2P_3O_{12}$, $BaSO_4$, $AlF_3$, SiC, TiC, ZrC, $Si_3N_4$, ZrN, BN, carbon, graphitic carbon, amorphous carbon, hard carbon, diamond-like carbon, solid solutions thereof, or a combination thereof.

Embodiment 86: The process of Embodiment 83, wherein the coating material comprises polyvinylidene difluoride, polyvinyl chloride, a fluoro-polymer, a chloro-polymer, or a fluoro-chloro-polymer.

Embodiment 87: The process of Embodiment 83, wherein the coating material comprises $TiO_2$, $ZrO_2$, $SiO_2$ $MoO_2$, $Li_2TiO_3$, $Li_2ZrO_3$, $Li_2MnO_3$, $ZrSiO_4$, or $LiNbO_3$, $AlF_3$, SiC, $Si_3N_4$, graphitic carbon, amorphous carbon, diamond-like carbon, or a combination thereof.

Embodiment 88: The process of Embodiment 83, wherein the coating material comprises $TiO_2$, $SiO_2$, and/or $ZrO_2$.

Embodiment 89: The process of Embodiment 83, wherein the coating material comprises a chloro-polymer, a fluoro-polymer, a chloro-fluoro-polymer, a hydrophilic polymer, a hydrophobic polymer, a co-polymer thereof, a mixture thereof, or a combination thereof.

Embodiment 90: The process of Embodiment 83, wherein the coating material comprises a co-polymer, a block co-polymer, a linear polymer, a branched polymer, a cross-linked polymer, a heat-treated polymer, a solution processed polymer, a co-polymer thereof, a mixture thereof, or a combination thereof.

Embodiment 91: The process of Embodiment 83, wherein the coating material comprises polyethylene, low density polyethylene, high density polyethylene, polypropylene, polyester, polytetrafluoroethylene (PTFE), types of polyamide, polyether ether ketone (PEEK), polysulfone, polyvinylidene fluoride (PVDF), poly (4-vinyl pyridine-co-styrene) (PVPCS), polystyrene (PS), polybutadiene, acrylonitrile butadiene styrene (ABS), polyvinyl chloride (PVC), ethylene tetrafluoroethylene polymer (ETFE), poly (chlorotrifluoroethylene) (PCTFE), ethylene chlorotrifluoro ethylene (Halar), polyvinylfluoride (PVF), fluorinated ethylene-propylene (FEP), perfluorinated elastomer, chlorotrifluoroethylene vinylidene fluoride (FKM), perfluoropolyether (PFPE), perfluorosulfonic acid (Nafion), polyethylene oxide, polyethylene glycol, sodium polyacrylate, polyethylene-block-poly(ethylene glycol), polyacrylonitrile (PAN), polychloroprene (neoprene), polyvinyl butyral (PVB), expanded polystyrene (EPS), polydivinylbenzene, a co-polymer thereof, a mixture thereof, or a combination thereof.

Embodiment 92: The process of Embodiment 83, wherein the coating material comprises polyvinylidene fluoride (PVDF), polyvinyl chloride (PVC), ethylene chlorotrifluoro ethylene (Halar), poly (4-vinyl pyridine-co-styrene) (PVPCS), polystyrene (PS), acrylonitrile butadiene styrene (ABS), expanded polystyrene (EPS), polyphenylene sulfide, sulfonated polymer, carboxylated polymer, other polymers, or a combination thereof.

Embodiment 93: The process of any one of Embodiments 1-92, wherein said lithium-selective ion exchange material comprises a porous ion exchange material.

Embodiment 94: The process of any one of Embodiments 1-92, wherein said lithium-selective ion exchange material comprises porous beads.

Embodiment 95: The process of any of Embodiments 1-94, wherein said liquid resource comprises a natural brine, a pretreated brine, a dissolved salt flat, seawater, concentrated seawater, a desalination effluent, a concentrated brine, a processed brine, an oilfield brine, a liquid from an ion exchange process, a liquid from a solvent extraction process, a synthetic brine, a leachate from an ore or combination of ores, a leachate from a mineral or combination of minerals, a leachate from a clay or combination of clays, a leachate from recycled products, a leachate from recycled materials, or a combination thereof.

Additional Embodiments for Lithium Extraction in the Presence of Scalants

Disclosed herein, in some embodiments, is a process for extracting lithium from a liquid resource into an acidic solution while avoiding precipitation of impurities in said acidic solution, comprising: a) contacting a lithium-selective ion exchange material with a liquid resource containing lithium to allow said lithium-selective ion exchange material to absorb lithium from said liquid resource while releasing protons into said liquid resource; b) contacting said lithium-selective ion exchange material with a wash solution to remove said liquid resource from said lithium-selective ion exchange material; c) contacting said lithium-selective ion exchange material with an acidic solution to elute lithium from said lithium-selective ion exchange material while said lithium-selective ion exchange material absorbs protons from said acidic solution; d) removing multivalent cation impurities from said acidic solution; e) again contacting said acidic solution with said lithium-selective ion exchange material to elute lithium from said lithium-selective ion exchange material while said lithium-selective ion exchange material absorbs protons from said acidic solution; and f) accumulating lithium in said acidic solution while avoiding formation of precipitates in said acidic solution.

Disclosed herein, in some embodiments, is a process for extracting lithium from a liquid resource into an acidic solution while avoiding precipitation of impurities in said acidic solution, comprising: a) contacting a first lithium-selective ion exchange material with a liquid resource containing lithium to allow said first lithium-selective ion exchange material to absorb lithium from said liquid resource while releasing protons into said liquid resource; b) contacting said first lithium-selective ion exchange material with a wash solution to remove said liquid resource from said first lithium-selective ion exchange material; c) contacting said first lithium-selective ion exchange material with an acidic solution to elute lithium from said first lithium-selective ion exchange material while said first lithium-selective ion exchange material absorbs protons from said acidic solution; d) removing multivalent cation impurities from said acidic solution; and e) contacting said acidic solution with a second lithium-selective ion exchange material to elute lithium from said second lithium-selective ion exchange material while said second lithium-selective ion exchange material absorbs protons from said acidic solution; and f) accumulating lithium in said acidic solution while avoiding formation of precipitates in said acidic solution.

Disclosed herein, in some embodiments, is a process for extracting lithium from a liquid resource into an acidic solution while avoiding precipitation of impurities in said acidic solution, comprising: a) contacting a lithium-selective ion exchange material with a liquid resource containing lithium to allow said lithium-selective ion exchange material to absorb lithium from said liquid resource while releasing protons into said liquid resource; b) contacting said lithium-selective ion exchange material with a wash solution to remove said liquid resource from said lithium-selective ion exchange material; c) contacting said lithium-selective ion exchange material with an acidic solution to elute lithium from said lithium-selective ion exchange material while said lithium-selective ion exchange material absorbs protons from said acidic solution; d) removing multivalent cation impurities from said acidic solution; e) adding more protons to the acidic solution; f) again contacting said acidic solution with said lithium-selective ion exchange material to elute lithium from said lithium-selective ion exchange material while said lithium-selective ion exchange material absorbs protons from said acidic solution; and g) accumulating lithium in said acidic solution while avoiding formation of precipitates in said acidic solution.

Disclosed herein, in some embodiments, is a process for extracting lithium from a liquid resource into an acidic solution while avoiding precipitation of impurities in said acidic solution, comprising: a) contacting a first lithium-selective ion exchange material with a liquid resource containing lithium to allow said first lithium-selective ion exchange material to absorb lithium from said liquid resource while releasing protons into said liquid resource; b) contacting said first lithium-selective ion exchange material with a wash solution to remove said liquid resource from said first lithium-selective ion exchange material; c) contacting said first lithium-selective ion exchange material with an acidic solution to elute lithium from said first lithium-selective ion exchange material while said first lithium-selective ion exchange material absorbs protons from said acidic solution; d) removing multivalent cation impurities from said acidic solution; e) adding more protons to said acidic solution; f) contacting said acidic solution with a second lithium-selective ion exchange material to elute lithium from said second lithium-selective ion exchange material while said second lithium-selective ion exchange material absorbs protons from said acidic solution; and g) accumulating lithium in said acidic solution while avoiding formation of precipitates in said acidic solution.

Disclosed herein, in some embodiments, is a process for extracting lithium from a liquid resource into an acidic sulfate solution while avoiding precipitation of impurities in said acidic sulfate solution, comprising: a) contacting a lithium-selective ion exchange material with a liquid resource containing lithium to allow said lithium-selective ion exchange material to absorb lithium from said liquid resource while releasing protons into said liquid resource; b) contacting said lithium-selective ion exchange material with a wash solution to remove said liquid resource from said lithium-selective ion exchange material; c) contacting said lithium-selective ion exchange material with an acidic sulfate solution to elute lithium from said lithium-selective ion exchange material while said lithium-selective ion exchange material absorbs protons from said acidic sulfate solution; d) removing multivalent cation impurities from said acidic sulfate solution; e) again contacting said acidic sulfate solution with said lithium-selective ion exchange material to elute lithium from said lithium-selective ion exchange material while said lithium-selective ion exchange material absorbs protons from said acidic sulfate solution; and f) accumulating lithium in said acidic sulfate solution while avoiding formation of sulfate precipitates in said acidic sulfate solution.

Disclosed herein, in some embodiments, is a process for extracting lithium from a liquid resource into an acidic sulfate solution while avoiding precipitation of impurities in said acidic sulfate solution, comprising: a) contacting a first lithium-selective ion exchange material with a liquid resource containing lithium to allow said first lithium-selective ion exchange material to absorb lithium from said liquid resource while releasing protons into said liquid resource; b) contacting said first lithium-selective ion exchange material with a wash solution to remove said liquid resource from said first lithium-selective ion exchange material; c) contacting said first lithium-selective ion exchange material with an acidic sulfate solution to elute lithium from said first lithium-selective ion exchange material while said first lithium-selective ion exchange material absorbs protons from said acidic sulfate solution; d) removing multivalent cation impurities from said acidic sulfate solution; e) contacting said acidic sulfate solution with a second lithium-selective ion exchange material to elute lithium from said second lithium-selective ion exchange material while said second lithium-selective ion exchange material absorbs protons from said acidic sulfate solution; and f) accumulating lithium in said acidic sulfate solution while avoiding formation of sulfate precipitates in said acidic sulfate solution.

Disclosed herein, in some embodiments, is a process for extracting lithium from a liquid resource into an acidic sulfate solution while avoiding precipitation of impurities in said acidic sulfate solution, comprising: a) contacting a lithium-selective ion exchange material with a liquid resource containing lithium to allow said lithium-selective ion exchange material to absorb lithium from said liquid resource while releasing protons into said liquid resource; b) contacting said lithium-selective ion exchange material with a wash solution to remove said liquid resource from said lithium-selective ion exchange material; c) contacting said lithium-selective ion exchange material with an acidic sulfate solution to elute lithium from said lithium-selective ion exchange material while said lithium-selective ion exchange material absorbs protons from said acidic sulfate solution; d) removing calcium, barium, and/or strontium impurities from said acidic sulfate solution; e) again contacting said acidic sulfate solution with said lithium-selective ion exchange material to elute lithium from said lithium-selective ion exchange material while said lithium-selective ion exchange material absorbs protons from said acidic sulfate solution; and f) accumulating lithium in said acidic sulfate solution while avoiding formation of calcium, barium, and/or strontium sulfate precipitates in said acidic sulfate solution.

Disclosed herein, in some embodiments, is a process for extracting lithium from a liquid resource into an acidic sulfate solution while avoiding precipitation of impurities in said acidic sulfate solution, comprising: a) contacting a first lithium-selective ion exchange material with a liquid resource containing lithium to allow said first lithium-selective ion exchange material to absorb lithium from said liquid resource while releasing protons into said liquid resource; b) contacting said first lithium-selective ion exchange material with a wash solution to remove said liquid resource from said first lithium-selective ion exchange material; c) contacting said first lithium-selective ion exchange material with an acidic sulfate solution to elute lithium from said first lithium-selective ion exchange material while said first lithium-selective ion exchange material absorbs protons from said acidic sulfate solution; d) removing calcium, barium, and/or strontium impurities from said acidic sulfate solution; and e) contacting said acidic sulfate solution with a second lithium-selective ion exchange material to elute lithium from said second lithium-selective ion exchange material while said second lithium-selective ion exchange material absorbs protons from said acidic sulfate solution; and f) accumulating lithium in said acidic sulfate solution while avoiding formation of calcium, barium, and/or strontium sulfate precipitates in said acidic sulfate solution.

Disclosed herein, in some embodiments, is a process for extracting lithium from a liquid resource into an acidic sulfate solution while avoiding precipitation of impurities in said acidic sulfate solution, comprising: a) contacting a lithium-selective ion exchange material with a liquid resource containing lithium to allow said lithium-selective ion exchange material to absorb lithium from said liquid resource while releasing protons into said liquid resource; b) contacting said lithium-selective ion exchange material with a wash solution to remove said liquid resource from said lithium-selective ion exchange material; c) contacting said lithium-selective ion exchange material with an acidic sulfate solution to elute lithium from said lithium-selective ion exchange material while said lithium-selective ion exchange material absorbs protons from said acidic sulfate solution; d) removing multivalent cation impurities from said acidic sulfate solution using a multivalent-cation-selective ion exchange resin; e) again contacting said acidic sulfate solution with said lithium-selective ion exchange material to elute lithium from said lithium-selective ion exchange material while said lithium-selective ion exchange material absorbs protons from said acidic sulfate solution; and f) accumulating lithium in said acidic sulfate solution while avoiding formation of sulfate precipitates in said acidic sulfate solution. In some embodiments, said multivalent-cation-selective ion exchange resin is a strong acidic cation exchange material. In some embodiments, said multivalent-cation-selective ion exchange resin is a styrene divinylbenzene copolymer. In some embodiments, said multivalent-cation-selective ion exchange resin is a sulfonic-acid-functionalized styrene divinylbenzene copolymer. In some embodiments, said multivalent-cation-selective ion exchange resin is a phosphonic-acid-functionalized styrene divinylbenzene copolymer. In some embodiments, said impurities comprise calcium. In some embodiments, said precipitates comprise calcium sulfate. In some embodiments, said multivalent-cation-selective ion exchange resin is a styrene divinylbenzene copolymer and said impurities comprise calcium. In some embodiments, said multivalent-cation-selective ion exchange resin is a sulfonic-acid-functionalized styrene divinylbenzene copolymer and said impurities comprise calcium. In some embodiments, said multivalent-cation-selective ion exchange resin is a phosphonic-acid-functionalized styrene divinylbenzene copolymer and said impurities comprise calcium. In some embodiments, said multivalent-cation-selective ion exchange resin is a sulfonic-acid-functionalized styrene divinylbenzene polymer, said impurities comprise calcium, and said precipitates comprise calcium sulfate. In some embodiments, said multivalent-cation-selective ion exchange resin is a phosphonic-acid-functionalized styrene divinylbenzene polymer, said impurities comprise calcium, and said precipitates comprise calcium sulfate. In some embodiments, said multivalent-cation-selective ion exchange resin is a copolymer of styrene, divinylbenzene, butadiene, vinylbenzene chloride, acrylonitrile, or combinations thereof. In some embodiments, said multivalent-cation-selective ion exchange resin is a copolymer of styrene, divinylbenzene, butadiene, vinylbenzene chloride, acrylonitrile, or combinations thereof functionalized with sulfonic acid, phosphonic acid, phosphinic acid, phosphoric acid, or combinations thereof.

Disclosed herein, in some embodiments, is a process for extracting lithium from a liquid resource into an acidic sulfate solution while avoiding precipitation of impurities in said acidic sulfate solution, comprising: a) contacting a first lithium-selective ion exchange material with a liquid resource containing lithium to allow said first lithium-selective ion exchange material to absorb lithium from said liquid resource while releasing protons into said liquid resource; b) contacting said first lithium-selective ion exchange material with a wash solution to remove said liquid resource from said first lithium-selective ion exchange material; c) contacting said first lithium-selective ion exchange material with an acidic sulfate solution to elute lithium from said first lithium-selective ion exchange material while said first lithium-selective ion exchange material absorbs protons from said acidic sulfate solution; d) removing multivalent cation impurities from said acidic sulfate solution using a multivalent-cation-selective ion exchange resin; e) contacting said acidic sulfate solution with a second lithium-selective ion exchange material to elute lithium from said second lithium-selective ion exchange material while said second lithium-selective ion exchange material absorbs protons from said acidic sulfate solution; and f) accumulating lithium in said acidic sulfate solution while avoiding formation of sulfate precipitates in said acidic sulfate solution. In some embodiments, said multivalent-cation-selective ion exchange resin is a strong acidic cation exchange material. In some embodiments, said multivalent-cation-selective ion exchange resin is a strong acidic cation exchange material.

In some embodiments, said multivalent-cation-selective ion exchange resin is a styrene divinylbenzene copolymer. In some embodiments, said multivalent-cation-selective ion exchange resin is a sulfonic-acid-functionalized styrene divinylbenzene copolymer. In some embodiments, said multivalent-cation-selective ion exchange resin is a phosphonic-acid-functionalized styrene divinylbenzene copolymer. In some embodiments, said impurities comprise calcium. In some embodiments, said precipitates comprise calcium sulfate. In some embodiments, said multivalent-cation-selective ion exchange resin is a styrene divinylbenzene copolymer and said impurities comprise calcium. In some embodiments, said multivalent-cation-selective ion exchange resin is a sulfonic-acid-functionalized styrene divinylbenzene copolymer and said impurities comprise calcium. In some embodiments, said multivalent-cation-selective ion exchange resin is a phosphonic-acid-functionalized styrene divinylbenzene copolymer and said impurities comprise calcium. In some embodiments, said multivalent-cation-selective ion exchange resin is a sulfonic-acid-functionalized styrene divinylbenzene polymer, said impurities comprise calcium, and said precipitates comprise calcium sulfate. In some embodiments, said multivalent-cation-selective ion exchange resin is a phosphonic-acid-functionalized styrene divinylbenzene polymer, said impurities comprise calcium, and said precipitates comprise calcium sulfate. In some embodiments, said multivalent-cation-selective ion exchange resin is a copolymer of styrene, divinylbenzene, butadiene, vinylbenzene chloride, acrylonitrile, or combinations thereof. In some embodiments, said multivalent-cation-selective ion exchange resin is a copolymer of styrene, divinylbenzene, butadiene, vinylbenzene chloride, acrylonitrile, or combinations thereof functionalized with sulfonic acid, phosphonic acid, phosphinic acid, phosphoric acid, or combinations thereof.

Disclosed herein, in some embodiments, is a process for extracting lithium from a liquid resource into an acidic sulfate solution while avoiding precipitation of impurities in said acidic sulfate solution, comprising: a) contacting a lithium-selective ion exchange material with a liquid resource containing lithium to allow said lithium-selective ion exchange material to absorb lithium from said liquid resource while releasing protons into said liquid resource; b) contacting said lithium-selective ion exchange material with a wash solution to remove said liquid resource from said lithium-selective ion exchange material; c) contacting said lithium-selective ion exchange material with an acidic sulfate solution to elute lithium from said lithium-selective ion exchange material while said lithium-selective ion exchange material absorbs protons from said acidic sulfate solution; d) removing multivalent cation impurities from said acidic sulfate solution using a nanofiltration membrane; e) again contacting said acidic sulfate solution with said lithium-selective ion exchange material to elute lithium from said lithium-selective ion exchange material while said lithium-selective ion exchange material absorbs protons from said acidic sulfate solution; and f) accumulating lithium in said acidic sulfate solution while avoiding formation of sulfate precipitates in said acidic sulfate solution.

Disclosed herein, in some embodiments, is a process for extracting lithium from a liquid resource into an acidic sulfate solution while avoiding precipitation of impurities in said acidic sulfate solution, comprising: a) contacting a first lithium-selective ion exchange material with a liquid resource containing lithium to allow said first lithium-selective ion exchange material to absorb lithium from said liquid resource while releasing protons into said liquid resource; b) contacting said first lithium-selective ion exchange material with a wash solution to remove said liquid resource from said first lithium-selective ion exchange material; c) contacting said first lithium-selective ion exchange material with an acidic sulfate solution to elute lithium from said first lithium-selective ion exchange material while said first lithium-selective ion exchange material absorbs protons from said acidic sulfate solution; d) removing multivalent cation impurities from said acidic sulfate solution using a nanofiltration membrane; e) contacting said acidic sulfate solution with a second lithium-selective ion exchange material to elute lithium from said second lithium-selective ion exchange material while said second lithium-selective ion exchange material absorbs protons from said acidic sulfate solution; and f) accumulating lithium in said acidic sulfate solution while avoiding formation of sulfate precipitates in said acidic sulfate solution.

Disclosed herein, in some embodiments, is a process for extracting lithium from a liquid resource into an acidic sulfate solution while avoiding precipitation of impurities in said acidic sulfate solution, comprising: a) contacting a lithium-selective ion exchange material with a liquid resource containing lithium to allow said lithium-selective ion exchange material to absorb lithium from said liquid resource while releasing protons into said liquid resource; b) contacting said lithium-selective ion exchange material with a wash solution to remove said liquid resource from said lithium-selective ion exchange material; c) contacting said lithium-selective ion exchange material with an acidic sulfate solution to elute lithium from said lithium-selective ion exchange material while said lithium-selective ion exchange material absorbs protons from said acidic sulfate solution; d) removing multivalent cation impurities from said acidic sulfate solution by precipitation with an anion precipitant; e) again contacting said acidic sulfate solution with said lithium-selective ion exchange material to elute lithium from said lithium-selective ion exchange material while said lithium-selective ion exchange material absorbs protons from said acidic sulfate solution; and f) accumulating lithium in said acidic sulfate solution while avoiding formation of sulfate precipitates in said acidic sulfate solution. In some embodiments, said anion precipitant is oxalate or citrate.

Disclosed herein, in some embodiments, is a process for extracting lithium from a liquid resource into an acidic sulfate solution while avoiding precipitation of impurities in said acidic sulfate solution, comprising: a) contacting a first lithium-selective ion exchange material with a liquid resource containing lithium to allow said first lithium-selective ion exchange material to absorb lithium from said liquid resource while releasing protons into said liquid resource; b) contacting said first lithium-selective ion exchange material with a wash solution to remove said liquid resource from said first lithium-selective ion exchange material; c) contacting said first lithium-selective ion exchange material with an acidic sulfate solution to elute lithium from said first lithium-selective ion exchange material while said first lithium-selective ion exchange material absorbs protons from said acidic sulfate solution; d) removing multivalent cation impurities from said acidic sulfate solution by precipitation with an anion precipitant; e) contacting said acidic sulfate solution with a second lithium-selective ion exchange material to elute lithium from said second lithium-selective ion exchange material while said second lithium-selective ion exchange material absorbs protons from said acidic sulfate solution; and f) accumulating lithium in said acidic sulfate solution while avoiding formation of sulfate precipitates in said acidic sulfate solution. In some embodiments, said anion precipitant is oxalate or citrate.

Disclosed herein, in some embodiments, is a process for extracting lithium from a liquid resource into an acidic sulfate solution while avoiding precipitation of impurities in said acidic sulfate solution, comprising: a) contacting a lithium-selective ion exchange material with a liquid resource containing lithium to allow said lithium-selective ion exchange material to absorb lithium from said liquid resource while releasing protons into said liquid resource; b) contacting said lithium-selective ion exchange material with a wash solution to remove said liquid resource from said lithium-selective ion exchange material; c) contacting said lithium-selective ion exchange material with an acidic sulfate solution to elute lithium from said lithium-selective ion exchange material while said lithium-selective ion exchange material absorbs protons from said acidic sulfate solution; d) removing multivalent cation impurities from said acidic sulfate solution by precipitation with an anion precipitant; e) removing said anion precipitant from said acidic sulfate solution by precipitation with a cation precipitant; f) again contacting said acidic sulfate solution with said lithium-selective ion exchange material to elute lithium from said lithium-selective ion exchange material while said lithium-selective ion exchange material absorbs protons from said acidic sulfate solution; and g) accumulating lithium in said acidic sulfate solution while avoiding formation of sulfate precipitates in said acidic sulfate solution. In some embodiments, said anion precipitant is oxalate or citrate.

Disclosed herein, in some embodiments, is a process for extracting lithium from a liquid resource into an acidic sulfate solution while avoiding precipitation of impurities in said acidic sulfate solution, comprising: a) contacting a first lithium-selective ion exchange material with a liquid resource containing lithium to allow said first lithium-selective ion exchange material to absorb lithium from said liquid resource while releasing protons into said liquid resource; b) contacting said first lithium-selective ion exchange material with a wash solution to remove said liquid resource from said first lithium-selective ion exchange material; c) contacting said first lithium-selective ion exchange material with an acidic sulfate solution to elute lithium from said first lithium-selective ion exchange material while said first lithium-selective ion exchange material absorbs protons from said acidic sulfate solution; d) removing multivalent cation impurities from said acidic sulfate solution by precipitation with an anion precipitant; e) removing said anion precipitant from said acidic sulfate solution by precipitation with a cation precipitant; f) contacting said acidic sulfate solution with a second lithium-selective ion exchange material to elute lithium from said second lithium-selective ion exchange material while said second lithium-selective ion exchange material absorbs protons from said acidic sulfate solution; and g) accumulating lithium in said acidic sulfate solution while avoiding formation of sulfate precipitates in said acidic sulfate solution. In some embodiments, said anion precipitant is oxalate or citrate.

In some embodiments, in any process disclosed herein, an antiscalant or chelating agent is used to limit formation of precipitates. In some embodiments, in any process disclosed herein, lithium-selective ion exchange material is loaded into a network of vessels. In some embodiments, in any process disclosed herein, the pH of said liquid resource is increased before, during, or after contact with a lithium-selective ion exchange material. In some embodiments, in any process disclosed herein, the pH of said liquid resource is increased by addition of sodium hydroxide before, during, or after contact with a lithium-selective ion exchange material. In some embodiments, in any process disclosed herein, the lithium that is accumulated in said acidic solution or acidic sulfate solution is converted into lithium hydroxide using membrane electrolysis. In some embodiments, in any process disclosed herein, the lithium that is accumulated in said acidic solution or acidic sulfate solution is converted into lithium hydroxide by addition of sodium hydroxide. In some embodiments, in any process disclosed herein, the lithium that is accumulated in said acidic solution or acidic sulfate solution is converted into lithium carbonate by addition of sodium carbonate. In some embodiments, in any process disclosed herein, lithium-selective ion exchange material is contacted with said liquid resource in a fluidized bed. In some embodiments, in any process disclosed herein, lithium-selective ion exchange material is contacted with said liquid resource in a packed bed.

In some embodiments, in any process disclosed herein, said lithium selective-ion exchange material comprises $LiFePO_4$, $LiMnPO_4$, $Li_2MO_3$ (M=Ti, Mn, Sn), $Li_4Ti_5O_{12}$, $Li_4Mn_5O_{12}$, $LiMn_2O_4$, $Li_{1.6}Mn_{1.6}O_4$, $LiMO_2$ (M=Al, Cu, Ti), $Li_4TiO_4$, $Li_7Ti_{11}O_{24}$, $Li_3VO_4$, $Li_2Si_3O_7$, $Li_2CuP_2O_7$, modifications thereof, solid solutions thereof, or combinations thereof. In some embodiments, in any process disclosed herein, said lithium selective-ion exchange material comprises a coated lithium selective-ion exchange material with a coating that is selected from an oxide, a polymer, or combinations thereof. In some embodiments, in any process disclosed herein, said lithium selective-ion exchange material comprises a coated lithium selective-ion exchange material with a coating that comprises $SiO_2$, $TiO_2$, $ZrO_2$, polyvinylidene difluoride, polyvinyl chloride, polystyrene, polybutadiene, polydivinylbenzene, or combinations thereof.

In some embodiments, in any process disclosed herein, said liquid resources comprises a natural brine, a pretreated brine, a dissolved salt flat, seawater, concentrated seawater, a desalination effluent, a concentrated brine, a processed brine, an oilfield brine, a liquid from an ion exchange process, a liquid from a solvent extraction process, a synthetic brine, a leachate from an ore or combination of ores, a leachate from a mineral or combination of minerals, a leachate from a clay or combination of clays, a leachate from recycled products, a leachate from recycled materials, or combinations thereof.

While preferred embodiments of the present invention have been shown and described herein, it will be obvious to those skilled in the art that such embodiments are provided by way of example only. Numerous variations, changes, and substitutions will now occur to those skilled in the art without departing from the invention. It should be understood that various alternatives to the embodiments of the invention described herein is optionally employed in practicing the invention. It is intended that the following claims define the scope of the invention and that methods and structures within the scope of these claims and their equivalents be covered thereby.

What is claimed is:

1. A process for extracting lithium from a liquid resource comprising:
   a) contacting a lithium-selective ion exchange material with a liquid resource comprising lithium to allow said lithium-selective ion exchange material to absorb lithium from said liquid resource thereby forming a lithium-enriched ion exchange material;

b) optionally contacting said lithium-enriched ion exchange material with a wash solution to remove said liquid resource from said lithium-enriched ion exchange material;

c) contacting said lithium-enriched ion exchange material with an acidic solution such that lithium and impurities are eluted from said lithium-enriched ion exchange material to form a first impurities-enriched lithiated (IEL) acidic solution and a partially-eluted ion exchange material;

d) removing at least some of the impurities from said first impurities-enriched lithiated acidic solution to form a lithium-enriched acidic solution; and e) contacting the lithium-enriched acidic solution with the partially-eluted ion exchange material such that lithium and impurities are further eluted from the partially-eluted ion exchange material to form a second impurities-enriched lithiated acidic solution having an accumulated amount of lithium.

2. The process of claim 1, wherein steps (d) and (e) are repeated in an iterative manner, thereby accumulating the lithium concentration with each iteration of forming a subsequent lithium-enriched acidic solution.

3. The process of claim 1, wherein the acidic solution comprises a sulfate solution.

4. The process of claim 1, wherein the impurities comprise multivalent cations.

5. The process of claim 1, wherein protons are added to the lithium-enriched acidic solution after removing the at least some of the impurities.

6. The process of claim 1, wherein the impurities are removed using a nanofiltration membrane.

7. The process of claim 1, wherein the impurities are removed through precipitation using an anion precipitant.

8. The process of claim 7, further comprising removing the anion precipitant from the lithium-enriched acidic solution after step (d) of claim 1 through precipitation with a cation precipitant.

9. The process of claim 1, wherein the impurities are removed using a multivalent-cation-selective ion exchange resin.

10. The process of claim 9, wherein said multivalent-cation-selective ion exchange resin comprises a strong acidic cation exchange material.

11. The process of claim 9, wherein said multivalent-cation-selective ion exchange resin comprises a styrene divinylbenzene copolymer, a sulfonic-acid-functionalized styrene divinylbenzene copolymer, or a phosphonic-acid-functionalized styrene divinylbenzene copolymer.

12. The process of claim 9, wherein said multivalent-cation-selective ion exchange resin comprises a copolymer of styrene, divinylbenzene, butadiene, vinylbenzene chloride, acrylonitrile, or a combination thereof.

13. The process of claim 9, wherein said multivalent-cation-selective ion exchange resin comprises a copolymer of styrene, divinylbenzene, butadiene, vinylbenzene chloride, acrylonitrile, or a combination thereof, functionalized with sulfonic acid, phosphonic acid, phosphinic acid, phosphoric acid, or a combination thereof.

14. The process of claim 1, wherein said lithium selective-ion exchange material comprises $LiFePO_4$, $LiMnPO_4$, $Li_2MO_3$ (M=Ti, Mn, Sn), $Li_4Ti_5O_{12}$, $Li_4Mn_5O_{12}$, $LiMn_2O_4$, $Li_{1.6}Mn_{1.6}O_4$, $LiMO_2$ (M=Al, Cu, Ti), $Li_4TiO_4$, $Li_7Ti_{11}O_{24}$, $Li_3VO_4$, $Li_2Si_3O_7$, $Li_2CuP_2O_7$, modifications thereof, solid solutions thereof, or a combination thereof.

15. The process of claim 1, wherein said lithium selective-ion exchange material comprises a coated lithium selective-ion exchange material with a coating that comprises an oxide, a polymer, or a combination thereof.

16. The process of claim 1, wherein said lithium selective-ion exchange material comprises a coated lithium selective-ion exchange material with a coating comprising $SiO_2$, $TiO_2$, $ZrO_2$, polyvinylidene difluoride, polyvinyl chloride, polystyrene, polybutadiene, polydivinylbenzene, or a combination thereof.

17. A process for extracting lithium from a liquid resource into an acidic solution, comprising:

a) contacting a first lithium-selective ion exchange material with the liquid resource comprising lithium to allow said first lithium-selective ion exchange material to absorb lithium from said liquid resource, thereby forming a first lithium-enriched ion exchange material;

b) optionally contacting said first lithium-enriched ion exchange material with a wash solution to remove said liquid resource from said first lithium-enriched ion exchange material;

c) contacting said first lithium-enriched ion exchange material with an acidic solution such that lithium and impurities are eluted from said first lithium-enriched ion exchange material, to form a first impurities-enriched lithiated (IEL) acidic solution and a first partially-eluted ion exchange material;

d) removing at least some of the impurities from said first impurities-enriched lithiated acidic solution to form a lithium-enriched acidic solution; and e) contacting said lithium-enriched acidic solution with a second lithium-enriched ion exchange material such that lithium and impurities are eluted from said second lithium-enriched ion exchange material to form 1) a second impurities-enriched lithiated acid solution having an accumulated amount of lithium, and 2) a second partially-eluted ion exchange material.

18. The process of claim 17, wherein the impurities are removed using a multivalent-cation-selective ion exchange resin.

19. The process of claim 18, wherein said multivalent-cation-selective ion exchange resin comprises a copolymer of styrene, divinylbenzene, butadiene, vinylbenzene chloride, acrylonitrile, or a combination thereof.

20. The process of claim 18, wherein said multivalent-cation-selective ion exchange resin comprises a copolymer of styrene, divinylbenzene, butadiene, vinylbenzene chloride, acrylonitrile, or a combination thereof, functionalized with sulfonic acid, phosphonic acid, phosphinic acid, phosphoric acid, or a combination thereof.

* * * * *